US012709385B2

(12) United States Patent
Butterfield

(10) Patent No.: US 12,709,385 B2
(45) Date of Patent: Aug. 18, 2026

(54) VERTICAL TAKEOFF AND LANDING (VTOL) AIRCRAFT SYSTEMS AND METHODS

(71) Applicant: William Swindt Butterfield, Mountain View, CA (US)

(72) Inventor: William Swindt Butterfield, Mountain View, CA (US)

( * ) Notice: Subject to any disclaimer, the term of this patent is extended or adjusted under 35 U.S.C. 154(b) by 0 days.

(21) Appl. No.: 19/231,115

(22) Filed: Jun. 6, 2025

(65) Prior Publication Data

US 2026/0015081 A1 Jan. 15, 2026

Related U.S. Application Data

(63) Continuation of application No. 18/461,483, filed on Sep. 5, 2023, now Pat. No. 12,384,532, which is a continuation-in-part of application No. 17/480,890, filed on Sep. 21, 2021, now Pat. No. 11,970,264.

(51) Int. Cl.

*B64C 27/08* (2023.01)
*B64C 27/52* (2006.01)
*B64D 17/80* (2006.01)
*B64D 27/32* (2024.01)
*B64D 27/34* (2024.01)
*B64D 27/357* (2024.01)

(52) U.S. Cl.

CPC .............. *B64C 27/08* (2013.01); *B64C 27/52* (2013.01); *B64D 17/80* (2013.01); *B64D 27/32* (2024.01); *B64D 27/34* (2024.01); *B64D 27/357* (2024.01)

(58) Field of Classification Search

CPC ......... B64C 27/08; B64C 27/52; B64C 29/02; B64U 80/20; B64U 80/25; B64U 2101/61

See application file for complete search history.

(56) References Cited

U.S. PATENT DOCUMENTS

2016/0039541 A1 2/2016 Beardsley et al.
2023/0039483 A1 2/2023 Strobel

FOREIGN PATENT DOCUMENTS

CN 212195854 U 12/2020

OTHER PUBLICATIONS

Connecting Structure & Floding Piece & Folding Unmanned Machine (Year. 2020).

*Primary Examiner* — Timothy D Collins
*Assistant Examiner* — Terri L Filosi
(74) *Attorney, Agent, or Firm* — NIXON PEABODY LLP

(57) ABSTRACT

An electrically-powered VTOL aircraft has a fuselage with a cabin flexibly connected to a powerplane assembly that includes a plurality of electrically-powered rotors and booms. The powerplane assembly can pitch and roll relative to and independently of the cabin, thereby generating efficient fore, aft and lateral thrust while the cabin attitude remains unchanged. This provides a stable passenger experience and enhanced performance and controllability with reduced cost and complexity. In some embodiments, the fuselage is vertically elongated and the powerplane assembly mounts above the fuselage such that a person may walk beneath the rotors completely erect. A VTOL docking station is also disclosed that is configured to allow the aircraft to land without the use of landing gear. The docking station also includes electrical components configured to automatically provide charging to the aircraft when the aircraft is docked with the docking station.

17 Claims, 36 Drawing Sheets

60
Sensors
69
BRS
72
Flight Controller
63
Power Source
75
Motor Controller
65
Motor
66
Rotor
52

149
170
172
153
158
162
157
160
161
156
154
164

149
36'
36
36
165
142

173
157
156
154

149
36'
151
151
36
36
142
165

900

200
225
520
660
340
850
350
820
320
330
250
410
430
380
310
z

Rotor
520
Motor
660
Motor Controller
65
Sensors
69
Flight Controller
63
Power Source
75
Power Source Controller
77
BRS
72
600

VERTICAL TAKEOFF AND LANDING (VTOL) AIRCRAFT SYSTEMS AND METHODS

CROSS REFERENCE TO RELATED APPLICATIONS

The present application is a continuation of U.S. application Ser. No. 18/461,483 filed on Sep. 5, 2023, now U.S. Pat. No. 12,384,532, which is a continuation in part of U.S. patent application Ser. No. 17/480,890 filed on Sep. 21, 2021, now U.S. Pat. No. 11,970,264. The disclosures of these patents are incorporated herein by reference.

RELATED ART

Aircraft design and configuration vary according to mission objectives and constraints. Electrically-powered vertical takeoff and landing (VTOL) aircraft have many benefits that make them attractive for use in short-range transport, especially in urban, suburban or parkland settings where suitable landing zones for conventional aircraft may be limited. For example, the ability to take-off vertically, hover, and in some cases to perform tight aerial maneuvers, enable such aircraft to operate safely around structures and in congested environments that are inaccessible to many other types of aircraft. Furthermore, electric aircraft can be designed to operate more quietly than other aircraft, allowing electric aircraft to operate in populated areas without violating applicable noise regulations.

A wide range of electrically-powered VTOL aircraft designs have been introduced in recent years, primarily focused on passenger or small cargo transport in environments where ground-based traffic congestion makes such aircraft an attractive alternative. While designs vary greatly according to mission objectives, most fall into one of three broad categories: Multirotor (aka Multicopter) solutions are simple and cost-effective, but have limited range and generate horizontal thrust by tilting the airframe, which may be uncomfortable for some passengers. Lift+Cruise solutions increase range and payload by adding wings and a separate forward propulsion system, but in so doing may lose maneuverability and add weight, cost and complexity. Tilt Rotor solutions (aka Vectored Thrust) also add wings to increase range and payload, but use tilting rotors or wing/rotor assemblies to generate both vertical and horizontal thrust from individual propulsion units, again at the price of complexity, cost, and reliability concerns. In summary, it is challenging to design electrically-powered VTOL aircraft that combine performance, safety, and a stable and reassuring passenger experience in a cost-effective, maneuverable package suitable for use in congested environments. Thus, alternative or improved designs of eVTOL aircraft are generally desirable.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 35A depicts an exemplary VTOL aircraft having a low center of mass in a stationary position, FIG. 35B depicts the aircraft of FIG. 35A beginning lateral flight, FIG. 35C depicts the aircraft of FIG. 35A in lateral flight, and FIG. 35D shows a VTOL aircraft having a higher center of mass in lateral flight.

DETAILED DESCRIPTION

Figure 1A:
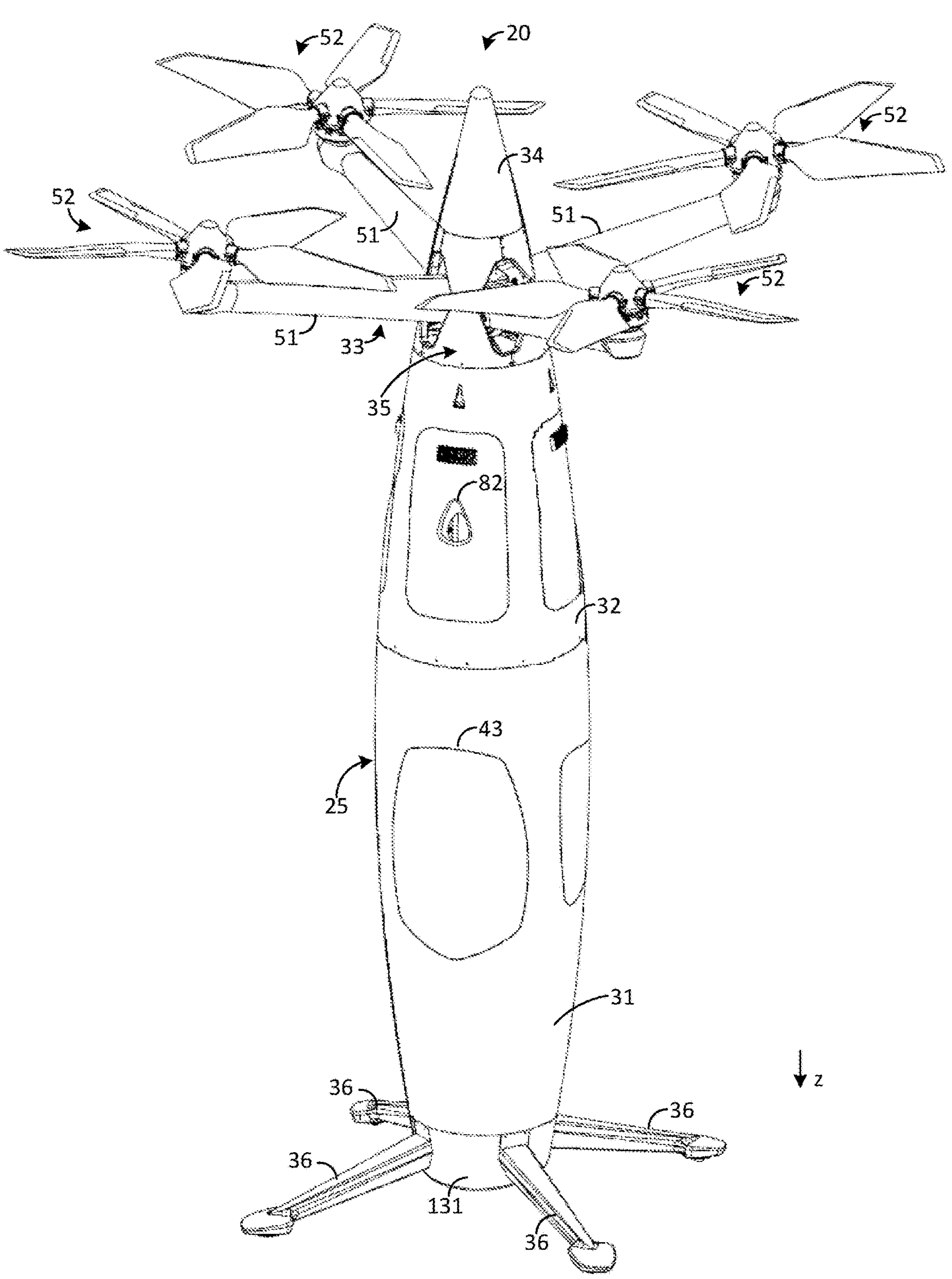
FIG. 1A depicts a perspective view of an embodiment of a vertical takeoff and landing (VTOL) aircraft.

The present disclosure generally relates to VTOL aircraft systems and methods, and various embodiments are described herein. In some embodiments of the present disclosure, an electrically-powered VTOL aircraft has a fuselage that is vertically elongated with a plurality of electrically-powered rotors mounted above the fuselage. The rotors are mounted sufficiently high above the ground such that a person may safely walk completely erect beneath the rotors without being struck by any of the rotors. Each rotor motor is mounted to one end of a boom, with the other end of the boom joined to a central connector, and together the rotors, motors, booms and central connector form a powerplane assembly. The powerplane assembly is joined to the fuselage by a pivotal coupling, which enables the powerplane assembly to pitch and roll independently of the fuselage.

The vertically elongated fuselage with elevated powerplane assembly offers a wide range of benefits including (but not limited to) fast, easy entry and exit; enhanced passenger and pedestrian safety during ground operations, maintenance, boarding and flight; minimal ground footprint independent of rotor or powerplane diameter; reduced rotor wash interaction with the ground, buildings or structures; reduced susceptibility to rotor damage due to ground handling or recirculated debris; a minimized planform silhouette which makes the flying vehicle less obtrusive to ground observers; and a 360° view for passengers.

In some embodiments disclosed herein, a multirotor VTOL aircraft comprises a fuselage that is pivotally coupled to a separate powerplane assembly having a plurality of electrically-powered rotors joined by booms and a boom mount so as to form a single structural unit. In some embodiments, the pivotal coupling comprises a biaxial joint which enables the fuselage to hang freely from the powerplane assembly in flight, so that the powerplane assembly is free to pitch and roll independently of the fuselage, but remains indexed to the fuselage in yaw. By this means the powerplane assembly is able to tilt and generate improved thrust efficiency in any compass direction of the x/y plane without the cost or complexity of an actuating mechanism, while also offering an improved passenger experience by maintaining a substantially constant fuselage attitude with respect to ground. In this regard, free movement of the powerplane assembly about the pitch and roll axis not only helps to reduce tilting of the fuselage, but it also allows the aircraft to move directly form one point to another along any combination of x, y, and z vectors without changing the cabin attitude or heading, and it allows the aircraft to precisely hold position in 3D space even in a gusty wind environment. Thus, cabin tilt and heading changes can be reduced during maneuvering, providing a more relaxing flight for the passenger, and the aircraft can safely and precisely follow complex, multi-segment 3D flight paths in obstacle-rich urban environments where dynamic wind conditions are common. Some additional benefits of this embodiment include isolation of the fuselage from powerplane-induced vibration; simplified structural loading of the fuselage by the elimination of rotor-induced bending loads; and quickened control system responsiveness resulting from the reduced mass and moments of inertia of the powerplane assembly compared with a complete, non-pivoting airframe. In addition, due to the separation of the powerplane assembly from the fuselage by the pivotal coupling, the vertical orientation of the fuselage is subject to tensile and compressive loads, with little bending input. This load regime simplifies weight optimization and is ideal for carbon fiber structures.

Thus, VTOL aircraft systems in some embodiments combine a simple, robust and reliable method of enhancing multirotor performance with a stable, reassuring passenger experience during take-off, transition, and cruise, thereby realizing a simple, efficient, short-range, electrically-powered VTOL aircraft that provides enhanced performance and a comfortable passenger experience with reduced manufacturing, operating, maintenance and logistics costs.

FIGS. 1A-1D depict an exemplary embodiment of a VTOL aircraft 20 that may be used to transport passengers or cargo. The aircraft 20 has a fuselage 25 that is vertically elongated (in the z-direction). For illustrative purposes, it will be assumed herein that the x-direction shown in the drawings is parallel to the roll axis, the z-direction shown in the drawings is parallel to the yaw axis, and the pitch axis (parallel to a y-direction) is perpendicular to both the x-direction and the z-direction shown in the drawings.

As an example, the fuselage 25 may be vertically elongated such that it has an aspect ratio ($h_f/w_f$), referred to hereafter as "fuselage aspect ratio," of about 2.0 or greater, where "$h_f$" is the maximum height of the fuselage 25 in the z-direction and "$w_f$" is the maximum width of the fuselage 25 in the x-direction. However, a greater fuselage aspect ratio may help to increase the height of the powerplane assembly 33, thereby realizing various benefits, as will be described in more detail below. To enhance at least some of these benefits, it may be desirable for the fuselage aspect ratio to be at least 3.0 or even 4.0 or more. For example, a greater fuselage aspect ratio may help to minimize or eliminate downwash ground effect interactions, thus simplifying control system workload and enhancing passenger comfort. Having a greater rotor height not only provides some performance benefits, as described in more detail below, but also may help to provide passengers with a greater sense of safety. It may also reduce the rotor wash felt by a passenger or other user while walking beneath the rotors 52.

The vertical orientation of the fuselage 25 also helps to optimize the shape of the fuselage 25 for streamwise aerodynamic efficiency and reduced VTOL drag. Some additional benefits include: provide more room to accommodate one or more standing passengers and provide easy entry and exit to the cabin for passengers; reduce the ground footprint, helping to facilitate maneuvers in confined or congested areas; and provide greater vertical cabin space to accommodate long, unwieldy cargo. In other embodiments, aspect ratios below 2.0 are possible, and it is unnecessary for the fuselage 25 to be vertically elongated. Indeed, although the vertical orientation of the fuselage 25 has many advantages, as described herein, it should be emphasized that such vertical orientation is unnecessary in all embodiments, and any shape of the fuselage 25 is possible in other embodiments.

The fuselage 25 has one or more modules, such as a cabin 31, a powerpack assembly 32, a powerplane section 35, and a nose 34 (which is tapered in the shape a cone, though other shapes are possible). The fuselage 25 is coupled to a powerplane assembly 33, which includes booms 51 and rotors 52, used to provide lift and controllability as will be described in more detail below. In some embodiments, the walls of the fuselage 25 are composed of a carbon fiber material helping to reduce weight. As shown by FIG. 1A, the aircraft 20 has landing gear comprising a plurality of legs 36 that extend from the bottom of the fuselage 25 and make contact with the ground when the aircraft 20 lands. In one embodiment, the aircraft 20 has four such legs 36, but other numbers of legs 36 less than or greater than four are possible in other embodiments. In the embodiment depicted by FIG. 1A, the aircraft 20 is dimensioned such that, when it is on the ground prior to takeoff, the bottom of the cabin 31 is about 1.2 feet above the ground, the bottom of the powerpack assembly 32 is about 9.1 feet above the ground, the bottom of the powerplane section 35 is about 16.6 feet above the ground, and the top of the nose 34 is about 18.1 feet above the ground such that the overall height of the fuselage 25 is about 18.1 feet above the ground.

In some embodiments, the aircraft 20 is designed to have a cruise speed of up to about 60 miles per hour with a weight of about 900 pounds and a targeted service range of about 10 miles (with reserve). In addition, the aircraft 20 is designed to produce noise during takeoff of less than 60 decibels (dB) from a distance of 50 feet. In other embodiments, other design and performance characteristics are possible.

The cabin 31 forms a compartment in which cargo, passengers, and/or other types of payloads may be situated for transport, and will sometimes be referred to hereafter as "passenger cabin." In the embodiment depicted by FIG. 1A, the cabin 31 is designed to accommodate a single passenger who stands on a floor 38 (FIG. 2) of the cabin 31 during operation. Also, the cabin 31 has a door 41 (FIG. 1D) through which the passenger may enter the cabin 31, and the cabin 31 has a plurality of windows 43 through which the passenger may see outside the cabin 31. In other embodiments, the cabin 31 may be designed to accommodate a greater number of passengers and/or other types of payloads, such as cargo (e.g., one or more packages to be delivered to one or more locations), and use of windows 43 is unnecessary. In addition, the cabin 31 may include one or more seats for permitting one or more passengers to sit as may be desired during transport.

The vertical orientation of the fuselage 25 and, in particular, the cabin 31 allows a passenger to stand or maintain an upright posture, which may be preferred or more enjoyable to the passenger, enables rapid entry and exit, and is easy to clean between flights. Further, as will be described in more detail below, the aircraft 20 may be designed such that the cabin 31 experiences very little or no movement about the pitch axis and roll axis in response to differential thrusting of the rotors 52, thereby reducing or eliminating perturbations or movements experienced by the passenger during flight. The vertical orientation is also conducive to a simple but effective ballistic recovery system (BRS) design, which will be described in more detail below. The BRS may be configured to deploy one or more parachutes in such a way that the orientation of the cabin 31 during parachute recovery remains substantially similar to its orientation during normal flight, thereby helping to reassure the passenger during an emergency event. Also, the BRS may be located above the powerplane assembly 33, helping to keep the parachute lines clear of the powerplane rotors 52. In addition, the parachute opening shock loads are fed into the airframe in pure tension, simplifying airframe structural design.

In some embodiments, the shape of the vertically elongated fuselage 25 is streamlined so as to reduce aerodynamic drag from air being blown over the fuselage 25 by the rotors 52. In the embodiment depicted by FIG. 1A, the fuselage 25 has a generally circular cross-section along its longitudinal axis (which is parallel to the z-direction in the exemplary embodiment of FIG. 1A), and the fuselage 25 may be tapered. As an example, and as shown by FIG. 1A, the fuselage's diameter or width may increase downward in the z-direction from the top of the fuselage 25 in order to provide greater area for the powerpack assembly 32 and the cabin 31. However, the diameter of the lower portion of the cabin 31 slightly decreases toward the base of the cabin 31.

In some embodiments, the maximum diameter or width of the cabin 31 is about 38 inches, but other maximum cabin widths are possible. In other embodiments, the fuselage 25 may have other types of profiles and contours, and as noted above, the pivotally-coupled powerplane assembly described herein is compatible with a wide range of vertically or horizontally elongated fuselage configurations.

The shape and dimensions of the cabin 31 are designed such that a single passenger may comfortably stand fully erect in the cabin 31 during flight. In some embodiments, the interior height of the cabin 31 from floor to ceiling is about 7.9 feet, though other heights are possible in other embodiments. Indeed, heights above about 6.5 to 7.0 feet will accommodate the heights of most passengers in order to allow them to stand fully erect in the cabin 31. In some embodiments, the cabin 31 may have one or more holding apparatuses, such as a handrail (not shown) or hand strap, mounted on an interior wall of the cabin 31, and a passenger may hold onto such holding apparatus during flight in order to help maintain balance. To provide more room for standing, the cabin 31 may be designed without a passenger seat, but it is possible for the cabin 31 to have one or more seats in which one or more passengers may sit during flight. Yet other designs and configurations of the cabin 31 are possible in other embodiments.

The powerplane assembly 33 comprises a plurality of booms 51 extending from a central mount and a plurality of rotors 52 respectively mounted on the booms 51. In the embodiment depicted by FIGS. 1A and 3, the powerplane assembly 33 has four booms 51 and four rotors 52 with five blades each, but the powerplane assembly 33 may have other numbers of booms 51, rotors 52, or rotor blades in other embodiments. In the embodiment depicted by FIGS. 1A and 3, the rotors 52 provide sufficient lift for the aircraft 20 without the need of other lift-generating apparatuses, such as wings. However, in other embodiments, the aircraft 20 may have winglets or other lift-generating apparatuses, which may help to increase the range of the aircraft 20.

Figure 4:
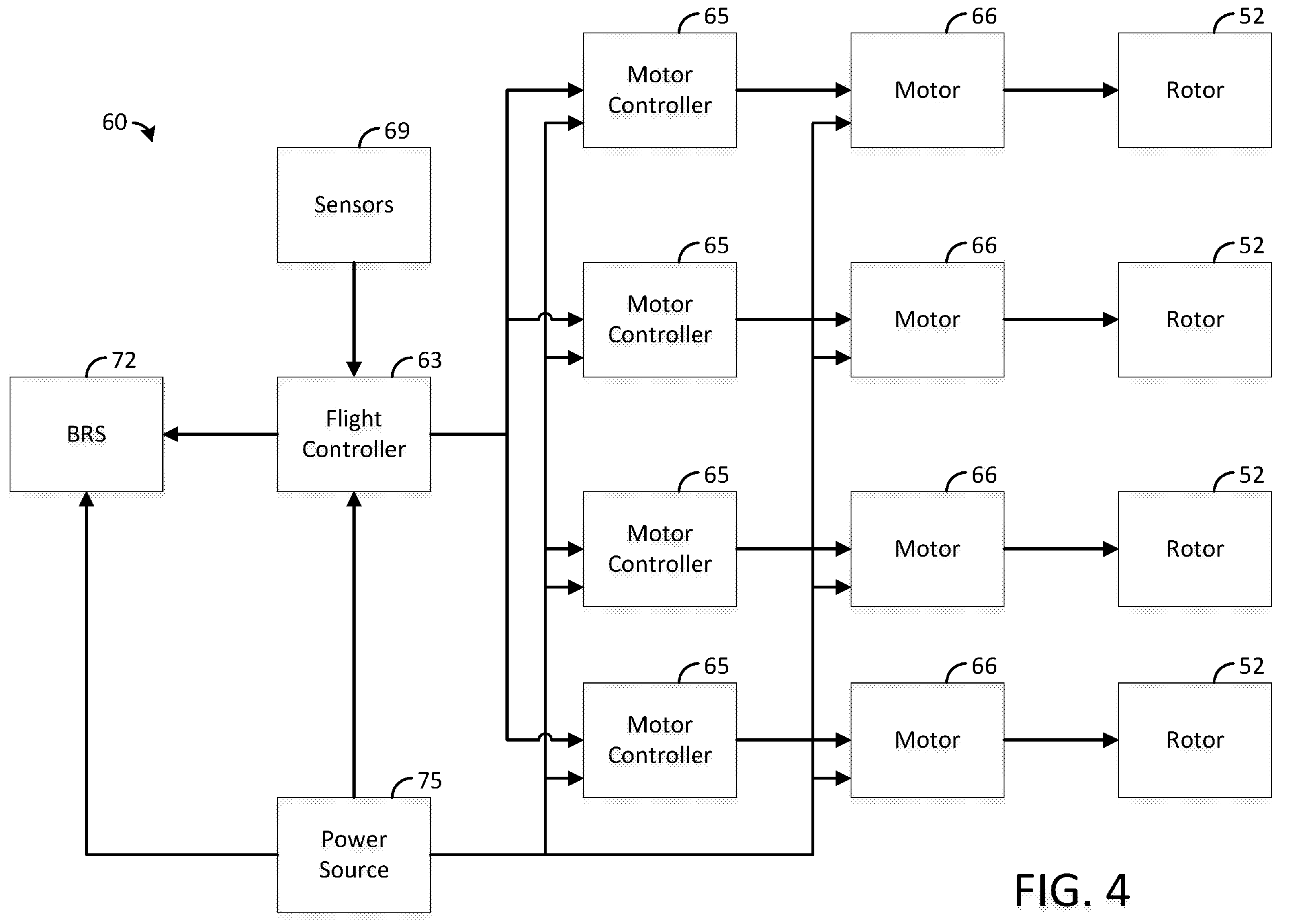
FIG. 4 is a block diagram illustrating an embodiment of a flight control system for controlling VTOL aircraft, such as is depicted by FIG. 1A.

The rotors 52 are driven by motors 66 (FIG. 2) that cause the rotors 52 to generate aerodynamic thrust to be used for generating lift and controlling powerplane pitch, roll, and yaw. In this regard, FIG. 4 shows an exemplary flight control system 60 of the aircraft 20 that can be used to control movement of the aircraft 20. In the embodiment depicted by FIG. 4, the system 60 comprises a flight controller 63 that is coupled to a plurality of motor controllers 65, which are configured to control motors 66 for driving the rotors 52. The flight controller 63 is also coupled to a plurality of sensors 69 that are configured to sense flight characteristics of the aircraft 20, such as horizontal airspeed, vertical airspeed, heading, powerplane attitude, and other flight characteristics that are typically used to control flight of conventional aircraft. The sensors 69 may also sense other parameters useful in controlling the aircraft 20, such as external objects for sensing and avoiding collision threats, temperature, etc. The flight controller 63 is further coupled to a power source 75, which may include one or more batteries for powering the electrical motors and components of the aircraft 20, and a ballistic recovery system (BRS) 72.

The flight controller 63 is configured to control the general operation of the aircraft, including flight, as will be described in more detail below. As an example, the flight controller 63 may be configured to provide control inputs to the motor controllers 65 for controlling the spinning speeds of the blades of the rotors 52 such that they generate thrust as appropriate for controlling the movement of the aircraft 20 in a desired manner. That is, the flight controller 63 instructs each motor controller 65 to operate its respective rotor 52 at a desired speed so that appropriate thrusts are generated for controlling the flight of the aircraft 20. As an example, the rotors 52 may be controlled to generate sufficient lift to counteract the weight of the aircraft 20 such that the aircraft 20 is flown to a desired altitude above ground. Further, differential thrusting of the rotors 52 may be used to control movement of the powerplane assembly 33 about the roll and pitch axes, as is known in the art for conventional multirotor VTOL aircraft, and also to provide horizontal movement of the aircraft 20 as may be desired. Further, differential torque from the rotors 52 may be used control movement of the powerplane assembly 33 about the yaw axis, as is known in the art for conventional multirotor VTOL aircraft.

In addition, in some embodiments, as will be described in more detail below, the powerplane assembly 33 may be coupled to the fuselage 25 via a pivotal coupling 152 (FIG. 15A) that permits the powerplane assembly 33 to pivot about at least two axes (e.g., pitch and roll axes) relative to the fuselage 25. In such an embodiment, the differential thrusting used to rotate the powerplane assembly 33 about the roll and pitch axes does not cause corresponding movement of the fuselage 25. That is, in some embodiments for which the pivotal coupling 152 couples the powerplane assembly 33 to the fuselage 25, the powerplane assembly 33 rolls and pitches independently of the fuselage 25. However, in some embodiments the powerplane assembly 33 and the fuselage 25 may be locked about the yaw axis such that the fuselage 25 and the powerplane assembly 33 rotate about the yaw axis together. An exemplary pivotal coupling 152 for achieving this effect will be described in more detail below with reference to FIGS. 15A and 16-19. However, it should be noted that use of such a pivotal coupling 152 is unnecessary, and other types of couplings are possible in other embodiments. As an example, if desired, the fuselage 25 may be designed such that the cabin 31 rotates with the powerplane assembly 33 about roll and/or pitch.

Figures 5, 6:
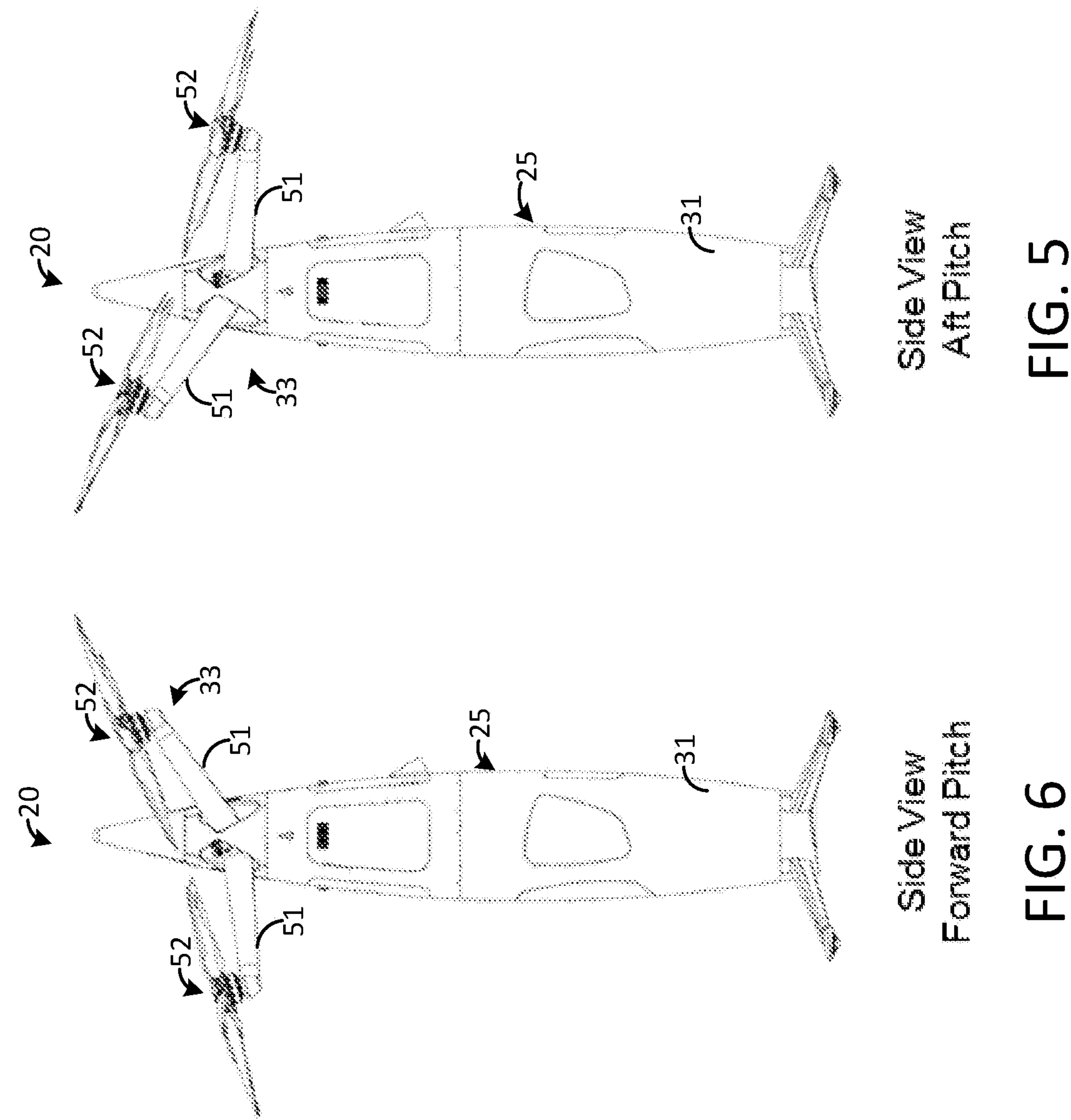
FIG. 5 depicts a side view of the VTOL aircraft of FIG. 1A with a powerplane assembly of the aircraft positioned with aft pitch.
FIG. 6 depicts a side view of the VTOL aircraft of FIG. 1A with a powerplane assembly of the aircraft positioned with forward pitch.

FIG. 6 shows a side view of an embodiment for which the powerplane assembly 33 is coupled to the fuselage 25 through a pivotal coupling 152 (not shown in FIG. 6) that permits the power plane assembly 33 to move independently about roll and pitch relative to the fuselage 25. In FIG. 6, the powerplane assembly 33 has forward pitch resulting from the rotors 52 at the back of the aircraft 20 being controlled to generate more thrust than the rotors 52 at the front of the aircraft 20. In such a configuration, a horizontal component of the thrust generated by the rotors 52 pushes the aircraft 20 forward. FIG. 5 shows a side view of an embodiment having aft pitch resulting from the rotors 52 at the front of the aircraft 20 being controlled to generate more thrust than the rotors 52 at the back of the aircraft 20. In such a configuration, a horizontal component of the thrust generated by the rotors 52 pushes the aircraft 20 backward.

Similarly, the powerplane assembly 33 may be controlled to tilt about the roll axis in a desired manner by controlling the rotors 52 on one side of the aircraft 20 to generate more thrust than the rotors 52 on the other side of the aircraft 20. In such a configuration, a horizontal component of the thrust generated by the rotors 52 pushes the aircraft 20 sideways.

Figure 7:
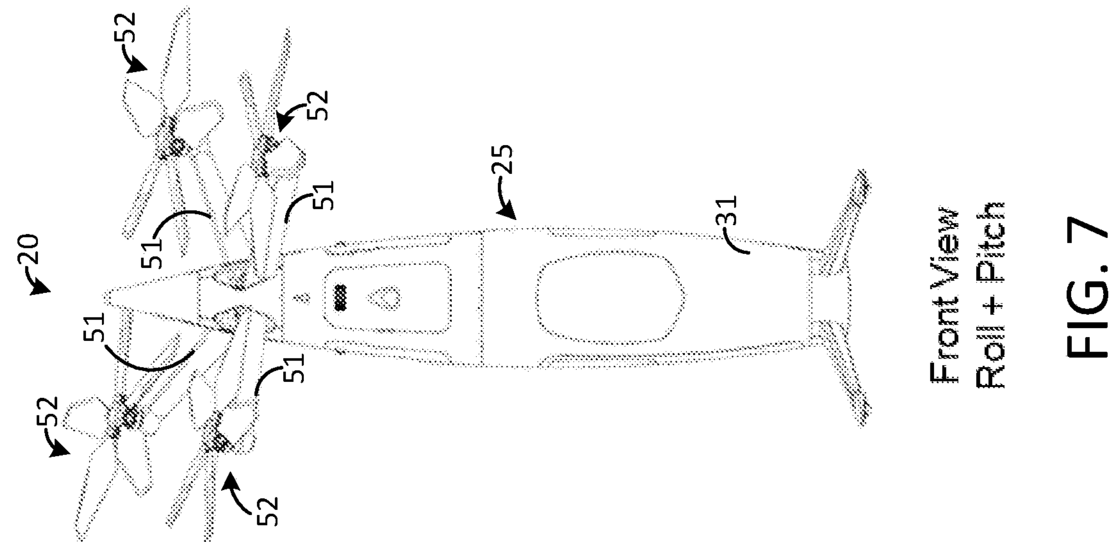
FIG. 7 depicts a front view of the VTOL aircraft of FIG. 1A with a powerplane assembly of the aircraft tilted about the aircraft's pitch axis and roll axis.

Moreover, through differential thrusting as described above, the thrusts generated by the rotors 52 may be controlled such that the powerplane assembly 33 may be simultaneously tilted about the pitch axis and roll axis as desired. For example, FIG. 7 shows the powerplane assembly 33 having about 20 degrees forward pitch and about 10 degrees of roll, thus generating a combined diagonal x/y thrust resultant. Notably, the powerplane assembly 33 is coupled to the fuselage 25 in the Z axis, so that motor torque differential may be used to control aircraft yaw as is known in the art.

The flight controller 63 may be implemented in hardware or a combination of hardware with software and/or firmware. As an example, the flight controller 63 may be implemented with hardware gate logic, such as a field programmable gate array (FPGA), or with application-specific integrated circuits (ASICs). In some embodiments, the flight controller 63 comprises at least one processor, such as a digital signal processor (DSP) or a central processor unit (CPU), that is configured to execute software and/or firmware for performing the functions described herein for the flight controller 63. In other embodiments, other types of controllers 63 may be used.

In some embodiments, the motors 66 are electrical and draw electrical power from the power source 75 during operation. The motors 66 may operate under the control of one or more motor controllers 65, which control the motors 66 in order to control the spinning speeds of the blades of the rotors 52 as instructed by the flight controller 63. In some embodiments, the aircraft 20 is autonomous, and the flight controller 63 controls flight of the vehicle 20, including both navigation and aviation, without the use of or inputs from a pilot. However, in other embodiments, a pilot onboard the aircraft 20 may provide control inputs for controlling flight. Such inputs may be received by the flight controller 63, which interprets such inputs to provide appropriate control signals to the motor controllers 65. If desired, such inputs may be received from a remote pilot via wireless communication. Yet other techniques and configurations for controlling the flight of the aircraft 20 are possible in other embodiments. It is also possible to drive the rotors 52 with other types of motors.

Figure 8C:
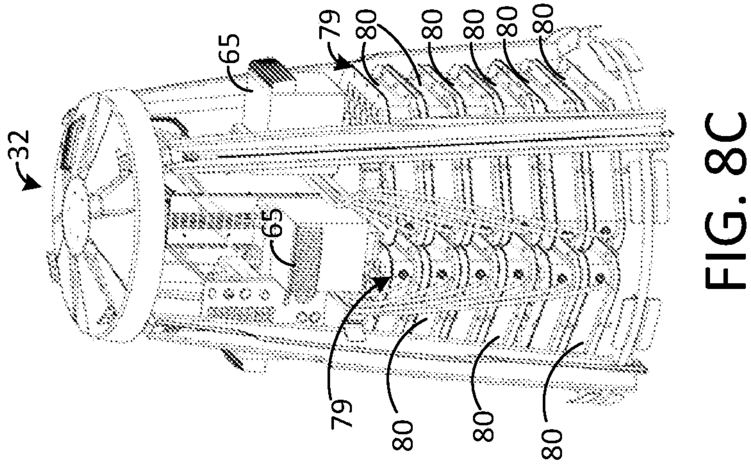
FIG. 8C depicts a perspective view of the power module depicted by FIG. 8A, showing internal components including batteries and motor controllers.
Figure 8B:
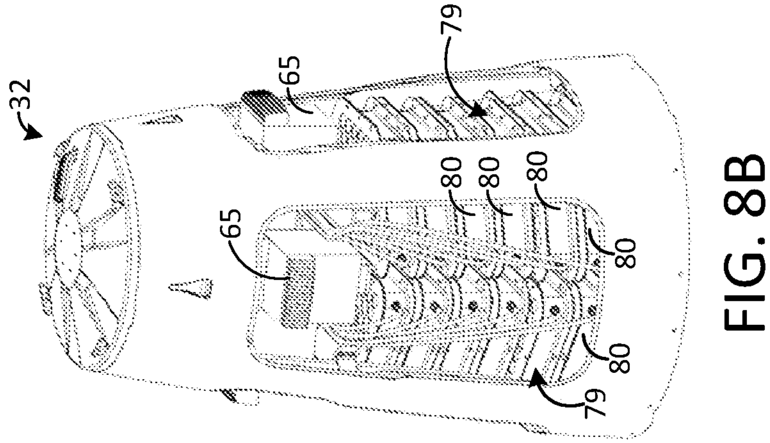
FIG. 8B depicts a perspective view of the power module depicted by FIG. 8A with access panels removed.
Figure 8A:
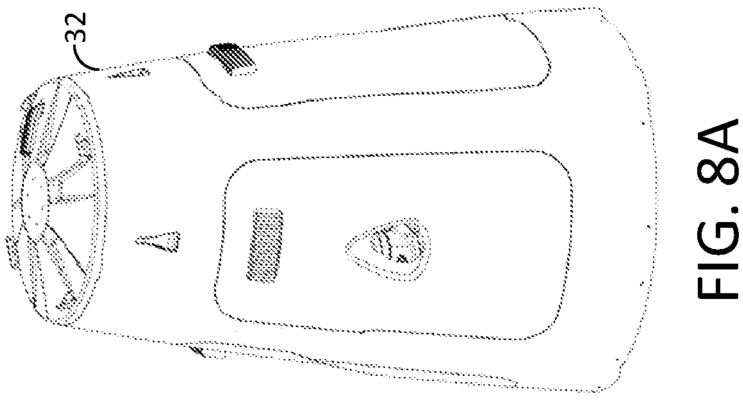
FIG. 8A depicts a perspective view of an embodiment of a power module.

The powerpack assembly 32 houses the power source 75 (FIG. 4) and motor controllers 65, as shown by FIGS. 8A and 8B. In one embodiment, the power source 75 comprises a plurality of battery packs 80 that are positioned just below the motor controllers 65, as shown by FIGS. 8B and 8C. In other embodiments, other types of power sources 75 may be used, and the relative positions of the battery packs 80 and the motor controllers 65 may be different. In the embodiment shown by FIGS. 2, 8A, and 8B, the powerpack assembly 32 is located below the powerplane assembly 33, including the motors 66 and rotors 52. By locating the battery packs 80 and motor controllers 65 just below the powerplane assembly 33, the lengths of electrical wiring between the battery packs 80, motor controllers 65, and rotor motors 66 can be kept relatively short, thereby helping to minimize the electrical resistance and weight of such wiring. Additionally, positioning the power source 75 near the powerplane pivotal coupling 152 helps to maintain a vertical cabin orientation during lateral acceleration, as will be further described with respect to FIG. 35. In some embodiments, the powerpack assembly 32, which comprises the battery packs 80, the motor controllers 65, and the flight controller 63, can be removed from the fuselage 25 and replaced with a new powerpack assembly 32.

In one embodiment, the powerpack assembly 32 comprises 812 battery cells providing a total power of approximately 71 kilowatt hours (kWh), although other numbers of cells and amounts of available power are possible. These cells are arranged in several interconnected battery packs 80 where each pack 80 comprises a plurality of cells. In the embodiment shown by FIG. 8C, the battery packs 80 are arranged into two vertically-stacked towers 79. The battery packs 80 may be stacked in other arrangements, and other numbers of battery pack towers 79 may be used in other embodiments.

In some embodiments, each battery pack tower 79 is electrically connected to each motor 66 for driving the rotors 52 so that each motor 66 may receive power from either or both of the towers 79. In addition, each battery pack tower 79 is able to generate sufficient power to drive simultaneously all of the motors 66 without power from the other tower 79, if desired. Thus, in the event of an operational problem with one of the towers 79, the other tower 79 may provide sufficient power for all of the motors 66 for at least enough time for the aircraft 20 to continue to the destination or perform an emergency landing. However, in other embodiments, other types and arrangements of batteries may be used.

Figures 1B, 1C, 1D:
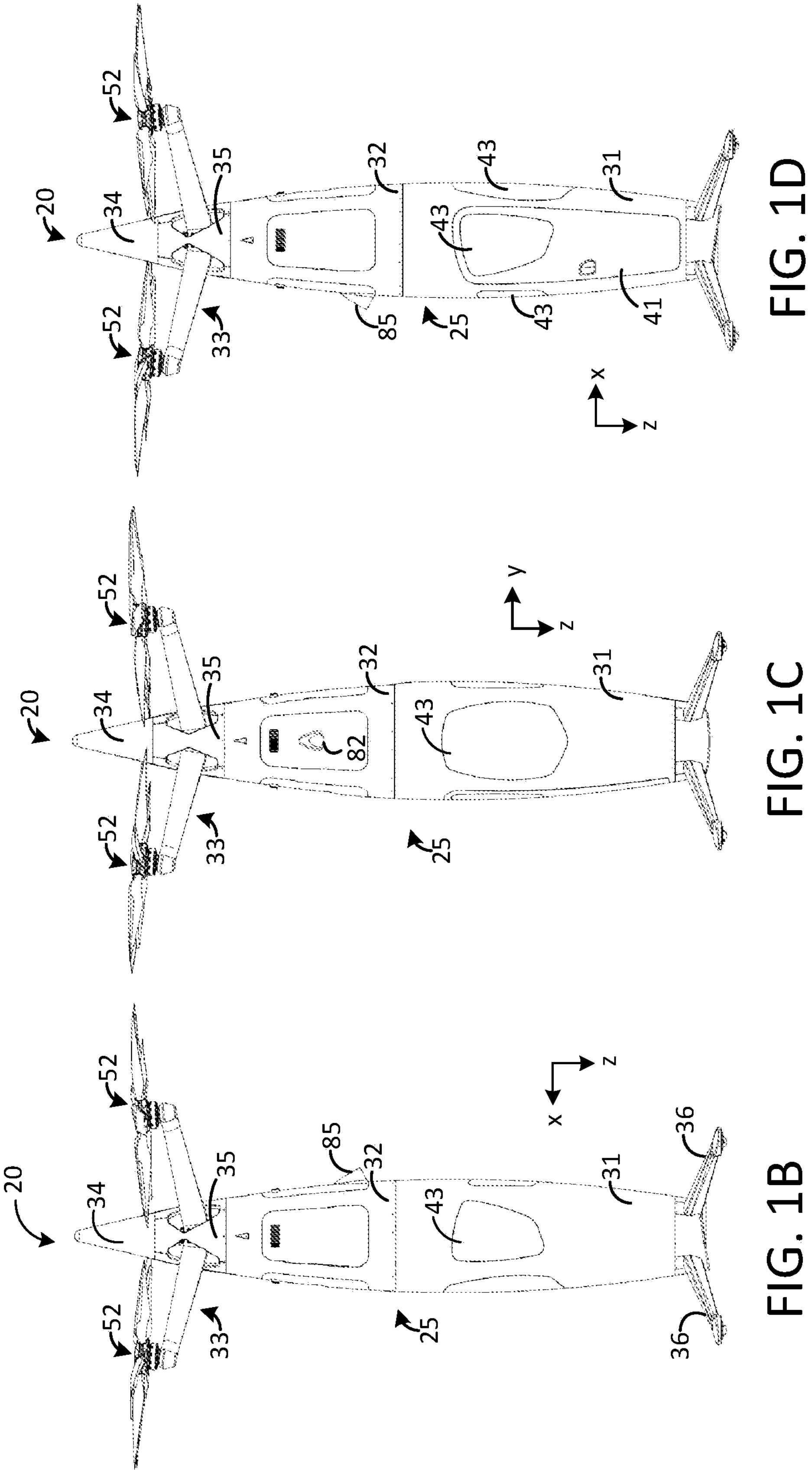
FIG. 1B depicts a left side view of the VTOL aircraft depicted by FIG. 1A.
FIG. 1C depicts a front view of the VTOL aircraft depicted by FIG. 1A.
FIG. 1D depicts a right side view of the VTOL aircraft depicted by FIG. 1A.
Figure 15A:
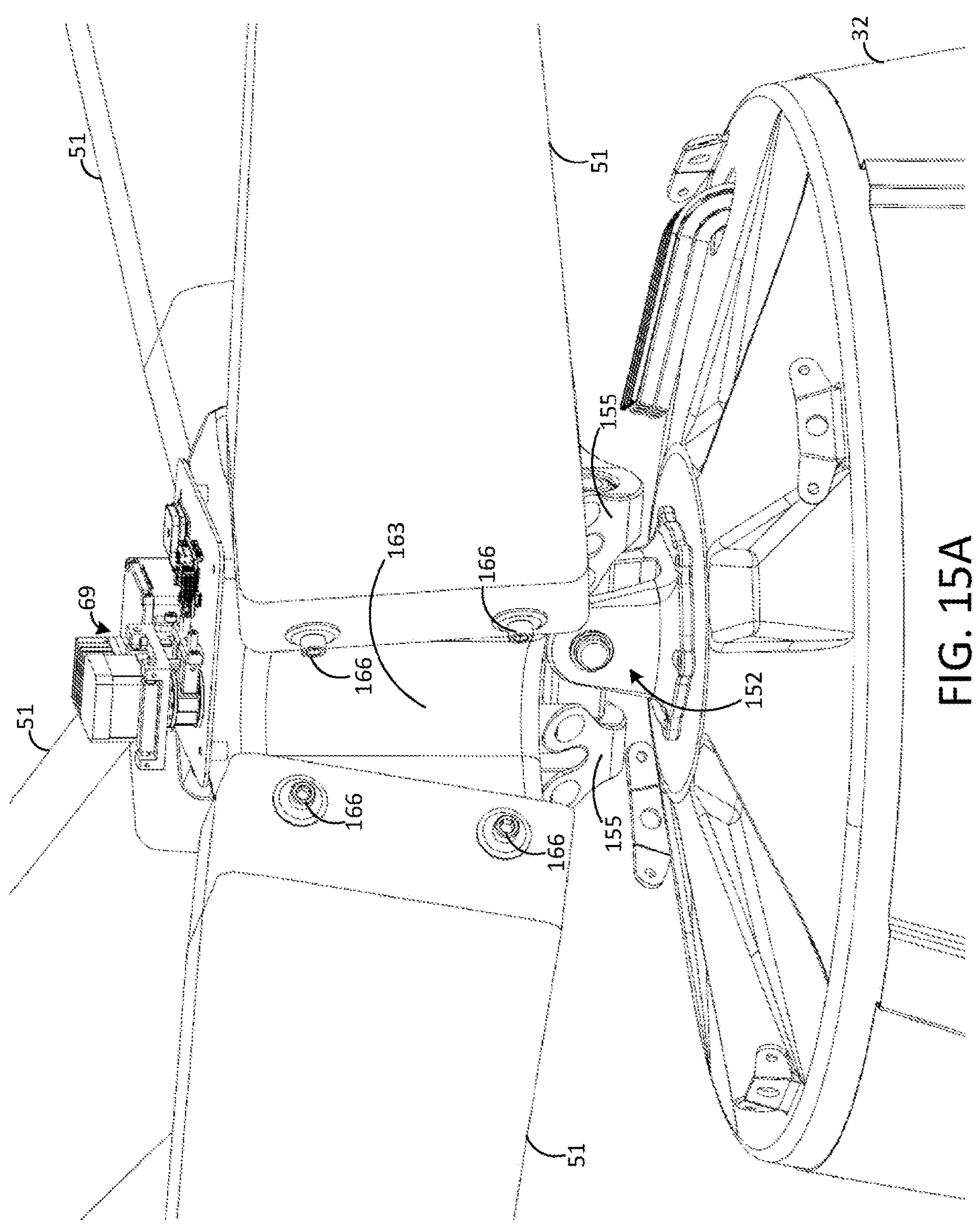
FIG. 15A depicts a perspective view of a pivotal coupling that connects a powerplane assembly to a power module of VTOL aircraft, such as is depicted by FIG. 1A.
Figure 15B:
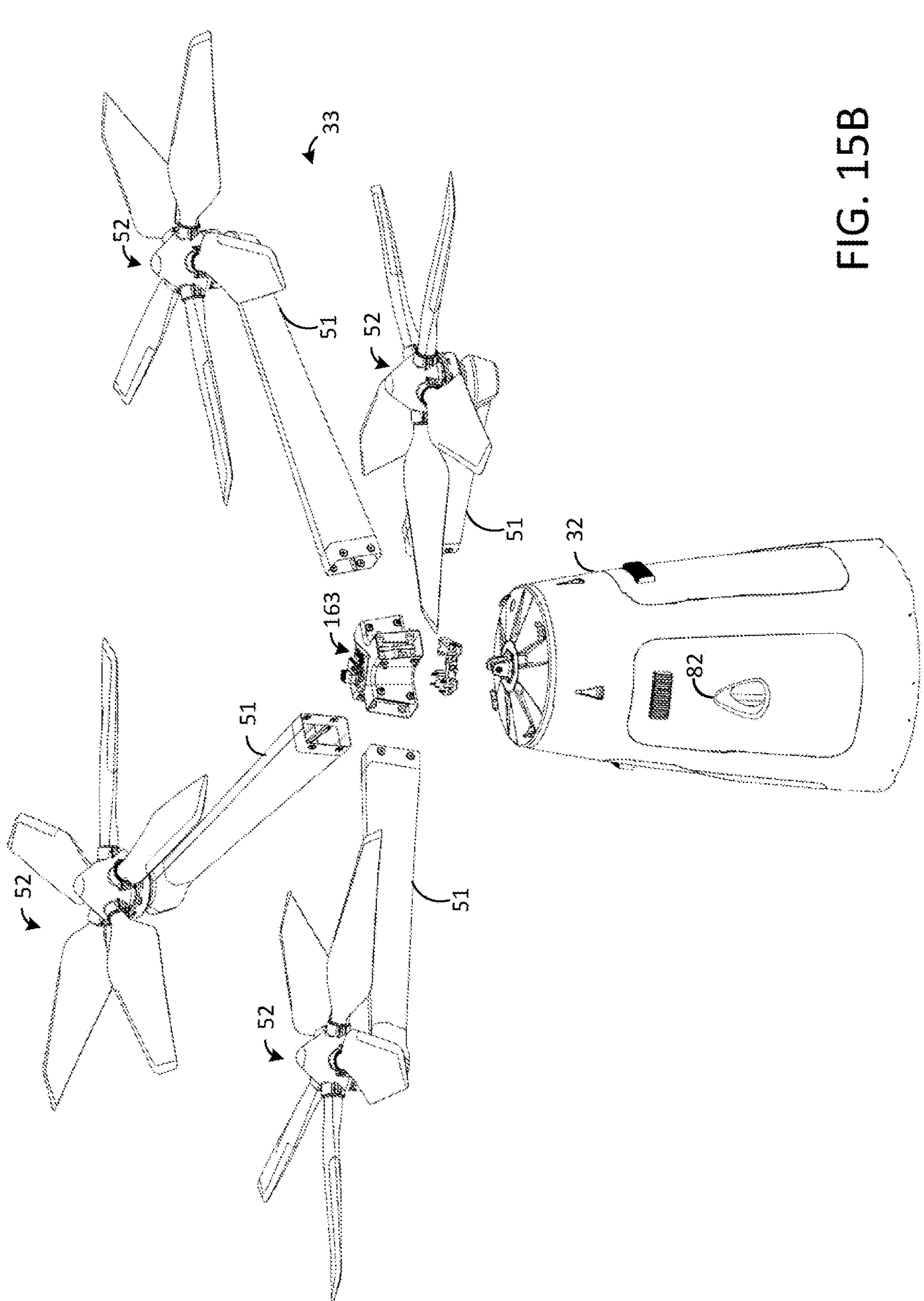
FIG. 15B depicts an exploded view of the pivotal coupling depicted by FIG. 15A.

As shown by FIGS. 1C and 15B, an intake duct 82 is located in the powerpack assembly 32 of the fuselage 25 to receive cooling air from the rotors 52. The air travels from this intake duct 82 through the powerpack assembly 32 and exits the powerpack assembly 32 via an outlet duct 85 (FIGS. 1B and 1D) that is located on an opposite side of the fuselage 25 relative to the intake duct 82. The outlet duct 85 may be fed by a cooling fan, creating negative pressure within the powerpack assembly 32 to aid the intake flow. As the air is passing through the powerpack assembly 32, it absorbs heat from the battery packs 80 and other electronics, and then is expelled through the outlet duct 85, thereby ensuring the electronic equipment is maintained at its designed operating temperature.

In some embodiments, the powerpack assembly 32 can be cooled via liquid cooling. For example, the fuselage 25 can be equipped with a heat exchanger (not shown) filled with a cooling liquid that circulates the cooling liquid through liquid channels disposed within the powerpack assembly 32. In such embodiments, air traveling from the intake duct 82 can pass through the heat exchanger and out of the fuselage 25 via outlet duct 85. As the cooling liquid circulates through powerpack assembly 32, heat is drawn into the cooling liquid and is subsequently dispersed into the surrounding environment as the cooling liquid passes through the heat exchanger, in which the cooling liquid is cooled by the air traveling between intake duct 82 and outlet duct 85. In some embodiments, the heat exchanger may additionally be equipped with a fan in order to increase the rate of heat exchange between the cooling liquid within the heat exchanger and the air of the surrounding environment, for example during charging of battery pack 80.

In the event of a fire in the powerpack assembly 32, the vertical orientation of the fuselage 25 ensures that the passenger cabin 31 is well positioned below the smoke, heat or flame that may rise from such a fire. Additionally, the passenger cabin 31 is separated from the battery packs 80 by two bulkheads, each of which may be designed according to applicable aviation fire-resistance regulations, in order to ensure that the aircraft 20 reaches the ground and the passenger safely exits before the fire is able to penetrate the cabin 31. For example, from an altitude of 500 feet above ground level (AGL) with a BRS descent rate of 10 fps, the fire-resistant bulkhead system would need to remain intact for at least 50 seconds, well within the capabilities of modern fire-resistant materials.

Figure 9:
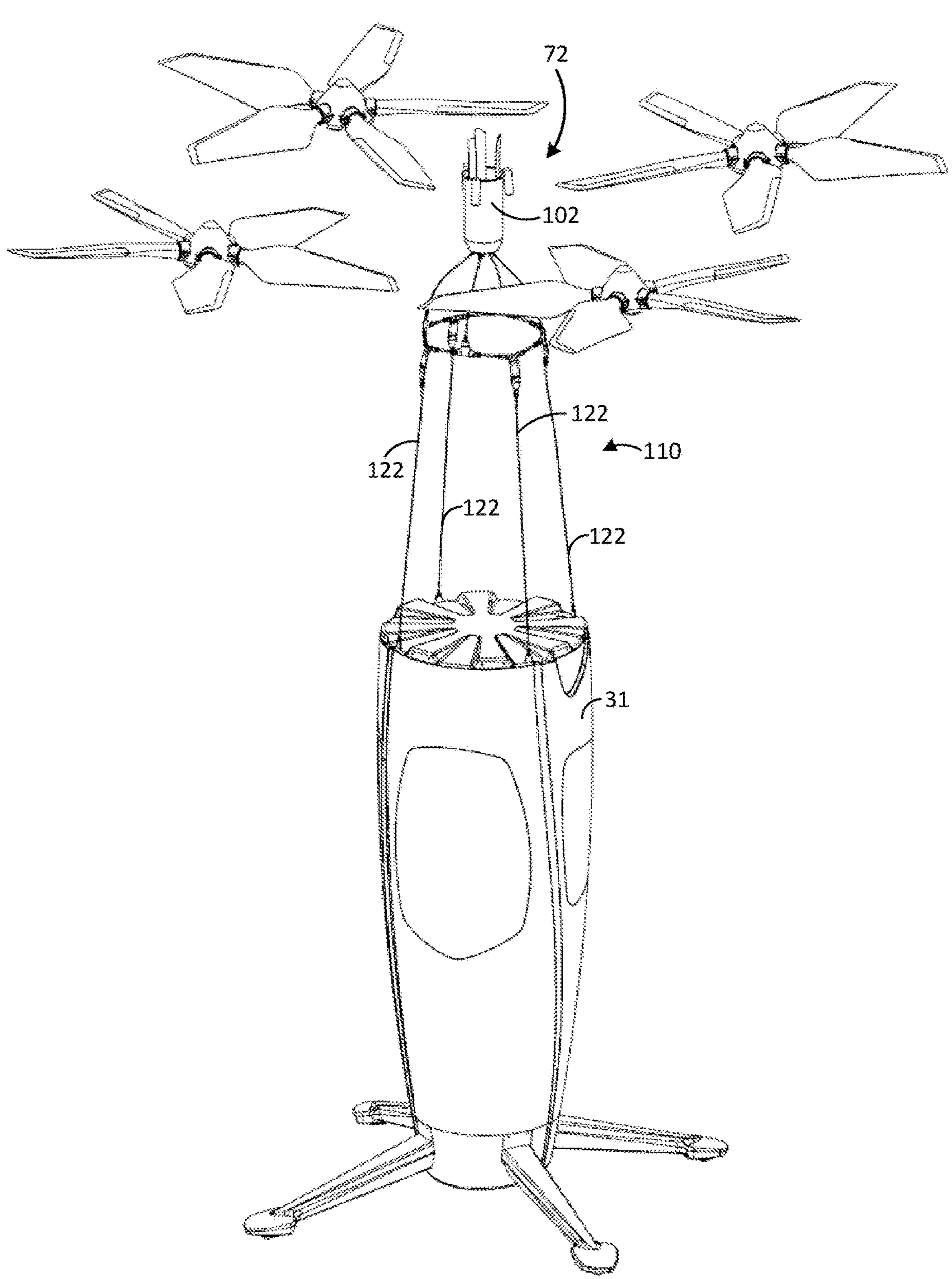
FIG. 9 depicts a perspective view of an embodiment of a ballistic recovery system.
Figure 10:
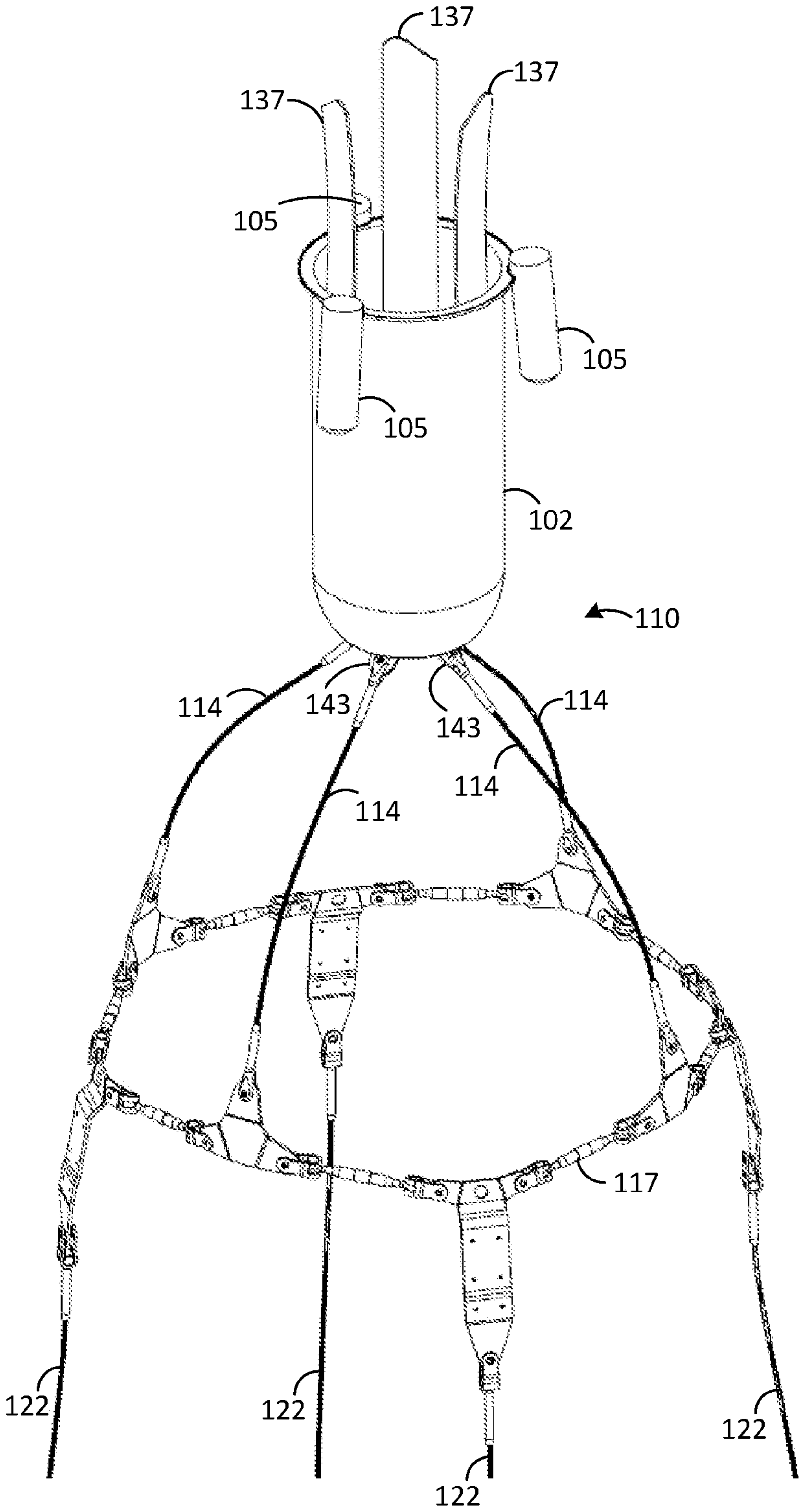
FIG. 10 depicts a harness for a ballistic recovery system, such as is depicted by FIG. 9.
Figure 11A:
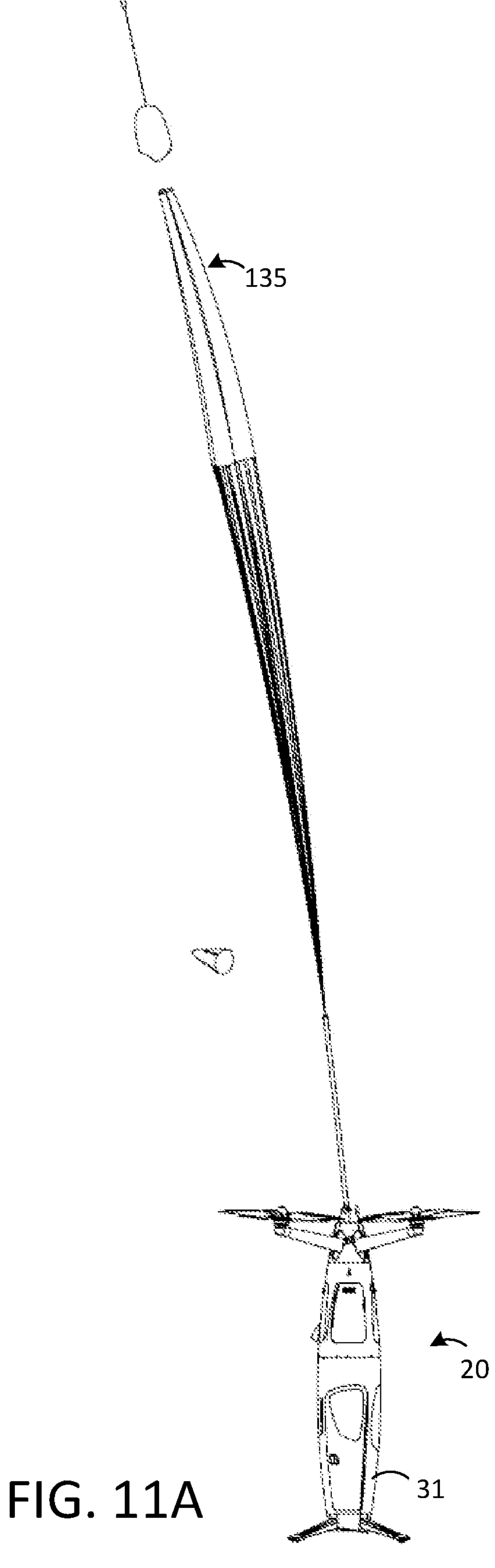
FIG. 11A depicts the VTOL aircraft of FIG. 1A as parachutes of a ballistic recovery system are being deployed.
Figure 11B:
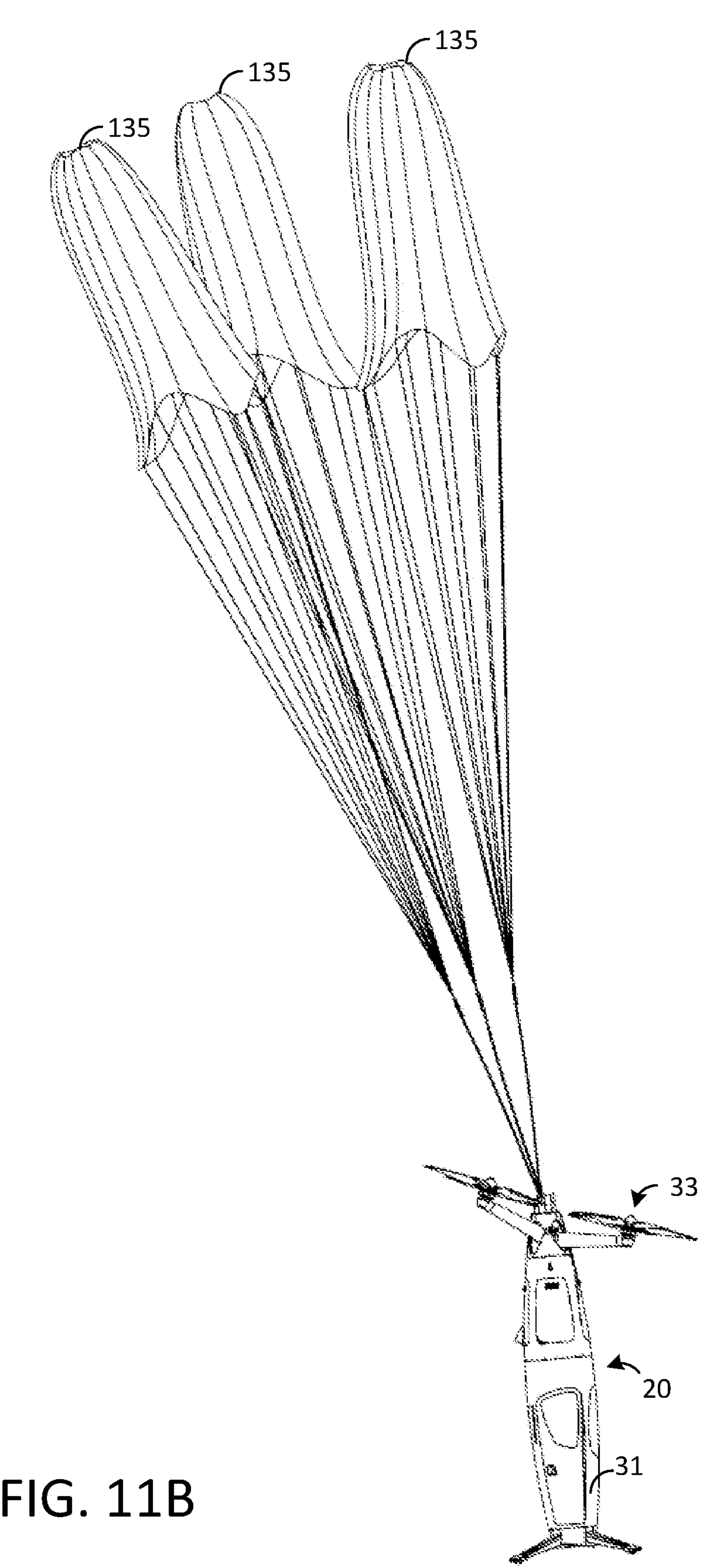
FIG. 11B depicts the VTOL aircraft of FIG. 11A after the depicted parachutes have been further deployed.
Figure 11C:
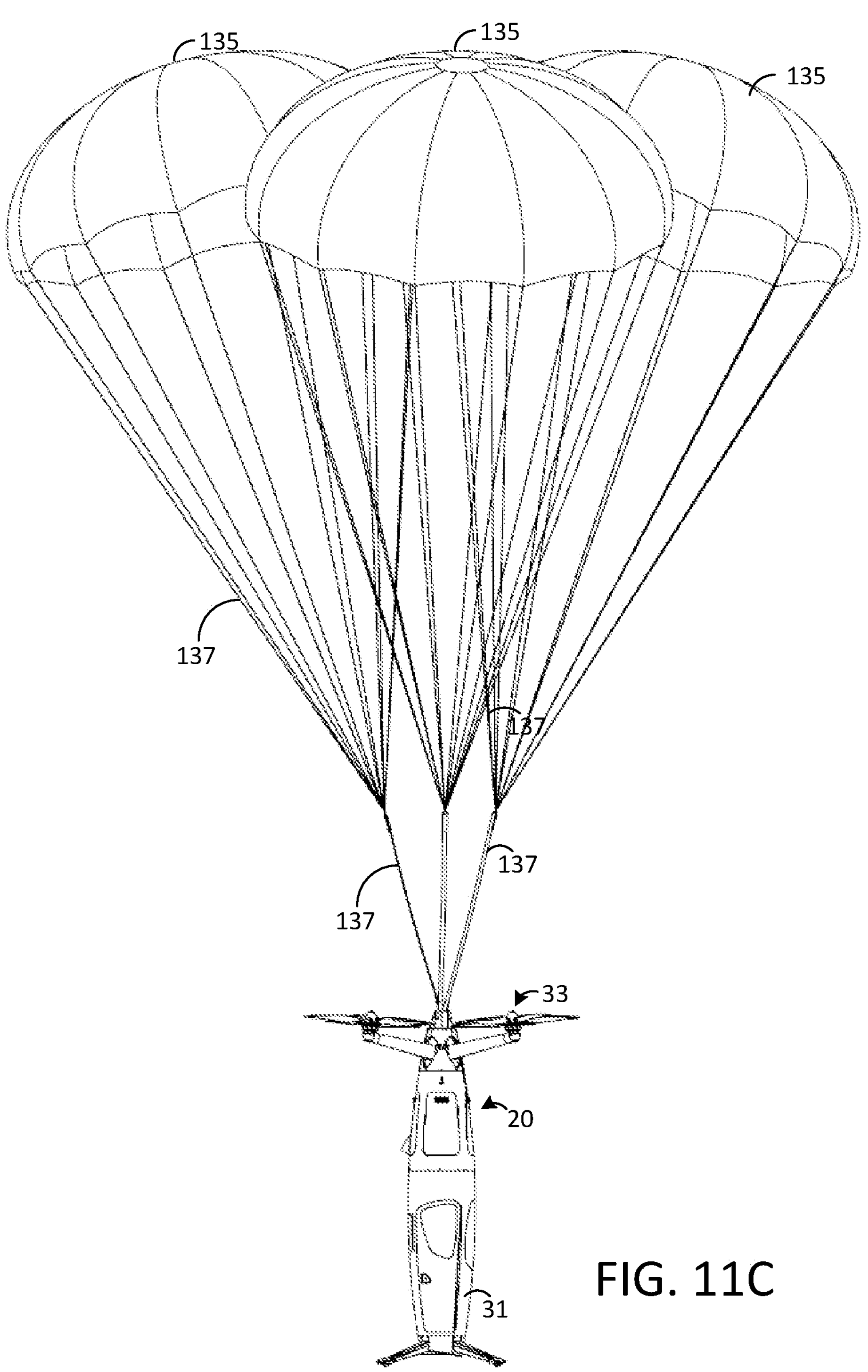
FIG. 11C depicts the VTOL aircraft of FIG. 11B once the parachutes have fully deployed.

As shown by FIGS. 9 and 10, in some embodiments, the aircraft 20 may have a ballistic recovery system (BRS) 72 that can deploy one or more parachutes 135 (FIGS. 11A-11C) in the event of a failure of one or more components (e.g., rotors 52) or other operational problem. The BRS 72 has a hollow container 102, referred to hereafter as "chute can," for holding the parachutes 135. Mounted on the chute can 102 are one or more rocket holders 105 (FIG. 10) for holding rockets (not shown in FIGS. 9 and 10) that are deployed in the event of an emergency event, such as failure of one or more rotors 52 or detection of a fire. When an emergency event is detected by the flight controller 63, it transmits a control signal for causing the rockets in the rocket holders 105 to be deployed. In response, the rockets are activated so that they fire out of the holders 105 upward (generally in the z-direction) either breaking through the nose 34 or forcing the nose 34 off of the aircraft 20 and pulling the parachute or parachutes 135 out of the chute can 102. The parachutes 135 then open to provide significant drag as the aircraft 20 falls to the ground. FIGS. 11A-11C depict a progression of three parachutes 135 being deployed. In other embodiments, other numbers of parachutes 135 may be used.

As shown by FIGS. 9 and 11A-11C, each parachute 135 is coupled by one or more parachute lines 137 to the cabin 31 via a cabin bridle 110, as will be described in more detail below. Since the parachute lines 137 are coupled to the top of the cabin 31 as shown, deployment of the parachutes 135 should not materially change the attitude of the cabin 31, helping to make parachute deployment relatively smooth for the passenger.

In some embodiments, the parachutes 135 provide sufficient drag to limit the descent rate of the aircraft 20 to about 10 feet per second (fps). Thus, at low altitudes of about 500 feet above ground or less, the aircraft 20 should reach the ground in under 50 seconds after parachute deployment. In other embodiments, parachutes 135 providing other descent rates and other types of recovery systems for recovering from an emergency condition are possible.

As noted above and referring to FIG. 10, parachute lines 137 may connect to the cabin 31 through a cabin bridle 110. In this regard, the cabin bridle 110 has a plurality of cables made of high-strength steel wire rope that pass around the booms 51 and thru the powerpack assembly 32 (FIG. 1A) and connect to the passenger cabin 31, thus establishing a direct connection between each parachute 135 and the passenger cabin 31. In the embodiment depicted by FIG. 10, the bridle 110 comprises a plurality of cables 114 that connect the parachute lines 137 to a cabling loop 117 that connects to cables 122, which pass thru the powerpack assembly 32 and connect directly to the passenger cabin 31.

In some embodiments, the parachute lines 137 may couple to the bridle 110 through a coupling assembly having one or more couplers 143 that may be mounted on, attached to, or pass through the chute can 102 and that connect the cables 114 to the parachute lines 137. The material selected for the cabling loop 117 and the cables 114, 122 can be capable of withstanding heat from a fire over a sufficient period of time to allow the aircraft 20 to reach the ground. As noted above, for altitudes of about 500 feet or less, it may take less than 50 seconds for the aircraft 20 to reach the ground after detection of an emergency condition and deployment of the parachute.

In some embodiments, each cable 114, 122 may be designed to support the expected weight of the aircraft 20 such that the BRS 72 remains operational for keeping the cabin 31 connected to the parachutes 135 as along as at least one cable 122 and at least one cable 114 remain connected. Thus, if a fire or other event severs other cables 114 and 122, the cabin 31 can still reach the ground at a safe speed. In other embodiments, other types of harnesses 72 and other harness configurations may be used. In addition, other types of recovery systems are possible, and the use of a BRS 72 or other type of recovery system is unnecessary in all embodiments.

Figure 12:
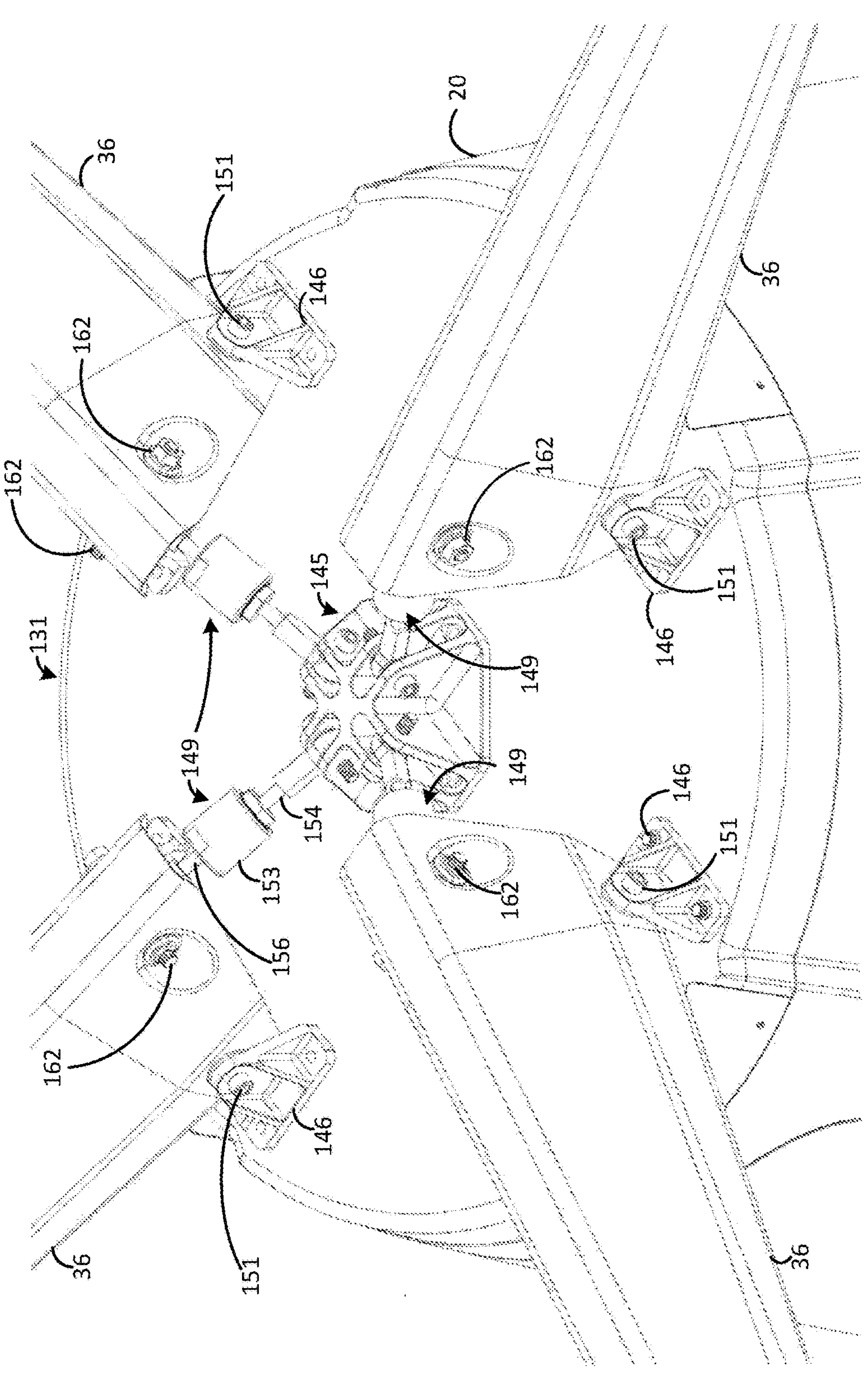
FIG. 12 depicts a perspective view of a base of the fuselage of the VTOL aircraft depicted by FIG. 1A.

FIG. 12 depicts a base 131 of the fuselage 25 that is located below the cabin floor 38 (FIG. 2) on which a passenger may stand or sit. A bottom surface of the base 131 is coupled to a bracket 145, referred to hereafter as "center bracket," and a plurality of brackets 146, referred to hereafter as "perimeter brackets," positioned close to a perimeter of the base 131. Each leg 36 is coupled to the center bracket 145 and at least one perimeter bracket 146. Further, the center bracket 145 is coupled to an end of each leg 36 by an elastic coupling 149 that is designed to provide an adjustable length to permit rotation of the leg 36 to which it is coupled, as will be described in more detail below. In this regard, the elastic coupling 149 may be composed of an elastic material that permits the coupling 149 to stretch, or the elastic coupling 149 may be implemented with a spring or other type of device that permits the coupling 149 to stretch under tension. An exemplary elastic coupling 149 will be described in more detail below with reference to FIGS. 13A-D.

As shown by FIG. 12, each leg 36 is coupled to a respective pair of perimeter brackets 146 in some embodiments. In this regard, for each perimeter bracket 146, a pin 151 passes through the bracket 146 and the leg 36 to which it is coupled, and the leg 36 may pivot about the pin 151. Note that the same pin 151 may pass through both perimeter brackets 146 coupled to the same leg 36, or a separate pin 151 may be used for each perimeter bracket 146.

Figures 13A, 13B, 13C, 13D:
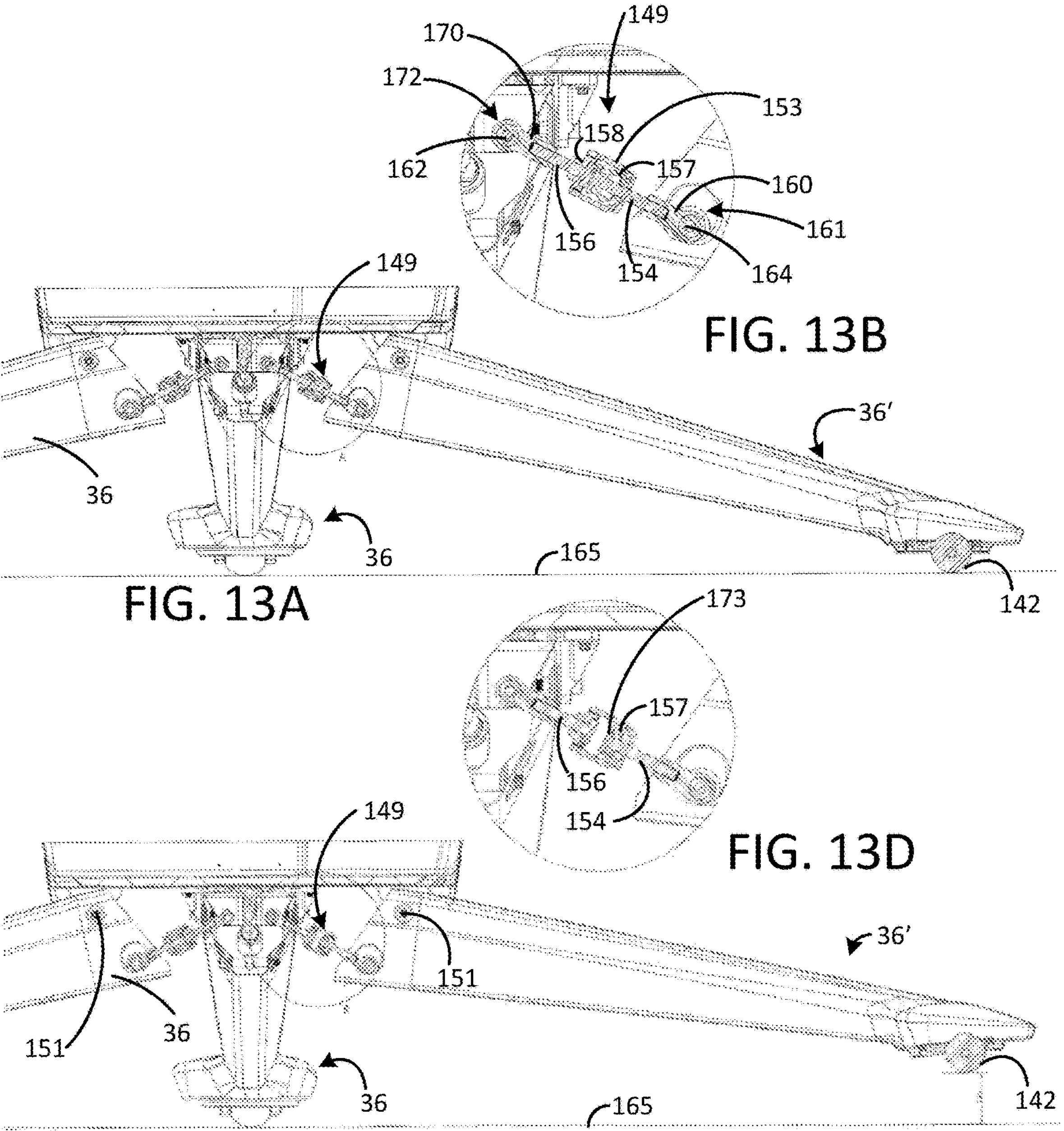
FIG. 13A depicts a side view of landing gear coupled to the base of the fuselage depicted by FIG. 12.
FIG. 13B depicts an elastic coupling of a suspension system for the landing gear depicted by FIG. 13A.
FIG. 13C shows the landing gear of FIG. 13A after foot of the landing gear has been moved relative to the fuselage 25.
FIG. 13D depicts the elastic coupling of FIG. 13B after the foot of the landing gear has been moved, as shown by FIG. 13C.

The brackets 145, 146, elastic coupling 149, and pins 151 form a suspension system that permits the legs 36 to move relative to the fuselage 25 when they contact ground. In this regard, FIG. 13A shows the landing gear prior to a leg 36' making contact with the ground during landing. FIG. 13C shows the landing gear after the leg 36' makes contact with the ground causing the leg 36' to move relative to the fuselage 25 and the other legs 36, as shown by the separation of the leg 36' from a reference plane 165. To permit the leg 36' to move upward, the leg 36' pivots about the pin 151 that is used to couple it to the base 131. Rotation about this pin 151 puts the elastic coupling 149 in tension such that the length of the coupling 149 is increased. However, the elastic coupling 149 is designed to resist this movement such that once the force applied from the ground is removed (e.g., after takeoff) a force generated by the elastic coupling 149 is sufficient to cause the leg 36' to rotate back to its original position shown by FIG. 13A.

As best shown by FIG. 13B, the elastic coupling 149 has a pair of rods 154, 156 that pass through a can 153. Positioned within the can 153 is an elastic bumper 157 through which an end of the rod 154 passes. The elastic bumper 157 is composed of an elastic material, such as rubber, which allows the bumper 157 to deform under an applied force, but the material of the bumper 154 resists such deformation and returns to its original shape when the applied force is removed.

The opposite end of the rod 154 is positioned within a sleeve 160 of a rod end spherical bearing 161, also referred to as a "Heim joint." The bearing 161 has a pin 164 around which the sleeve 160 is permitted to rotate thereby accommodating slight angular changes between the rod 154 and the leg 36 as the leg 36' rotates.

The can 153 also has a cap 158 through which the rod 156 passes. The opposite end of the rod 156 is positioned within a sleeve 170 of a rod end spherical bearing 172. The bearing 172 has a pin 162 around which the sleeve 170 is permitted to rotate thereby accommodating slight angular changes between the rod 156 and the center bracket 145 as the leg 36' rotates.

Rotation of the leg 36' relative to the fuselage 25 presses a head 173 (FIG. 1D) of the rod 154 against the elastic bumper 157 causing the elastic bumper 157 to deform. Such deformation permits the rod 154 to move relative to the can 153 in a direction toward the rotating leg 36' such that the overall length of the elastic coupling 149 is increased, as shown by FIG. 13D. Thus, when the leg 36' contacts the ground, the leg 36' rotates relative to the fuselage 25 about the pin 151 to which it is coupled, thereby putting the elastic coupling 149 under tension such that its overall length is increased.

Once the bumper 157 is fully deformed, further movement of the rod 154 relative to the cam 153 is prevented thereby preventing further rotation of the leg 36' relative to the fuselage 25. In some embodiments, about half of an inch extension of the elastic coupling 149 translates into about three inches of movement of the end of the leg 36', but other ratios of movement are possible in other embodiments.

During takeoff, the force applied to the leg 36' by the ground is reduced and eventually removed entirely. As this force is reduced, the deformation of the bumper 157 provides a force that tends to push the head 173 of the rod 154 away from the leg 36' to which it is coupled so that the bumper 157 can return to its original shape, thereby decreasing the overall length of the elastic coupling 149. This force is sufficiently strong to cause the leg 36' to rotate about the pin 151 in the opposite direction as before such that the leg 36' is rotated back to its original prior to the previous contact with the ground.

Note that the other legs 36 may be similarly configured such that they also are permitted to rotate relative to the fuselage 25 when they make contact with the ground and during takeoff, as described above. This permitted movement of the legs 36 relative to the fuselage 25 has many benefits, such as providing for a smoother landing relative to an embodiment for which the legs 36 are rigidly mounted to the fuselage 25. In addition, the permitted movement of the legs 36 may provide for safer landings for which the risk of toppling of the aircraft 20 is reduced by helping to accommodate for slight attitude misalignments of the fuselage 25 relative to the ground. This may be particularly advantageous for aircraft with relatively high aspect ratios of the fuselage or rotors, as described above, given that a higher fuselage or powerplane aspect ratio may have the effect of increasing the height of the aircraft's center of mass.

Figures 14A, 14B:
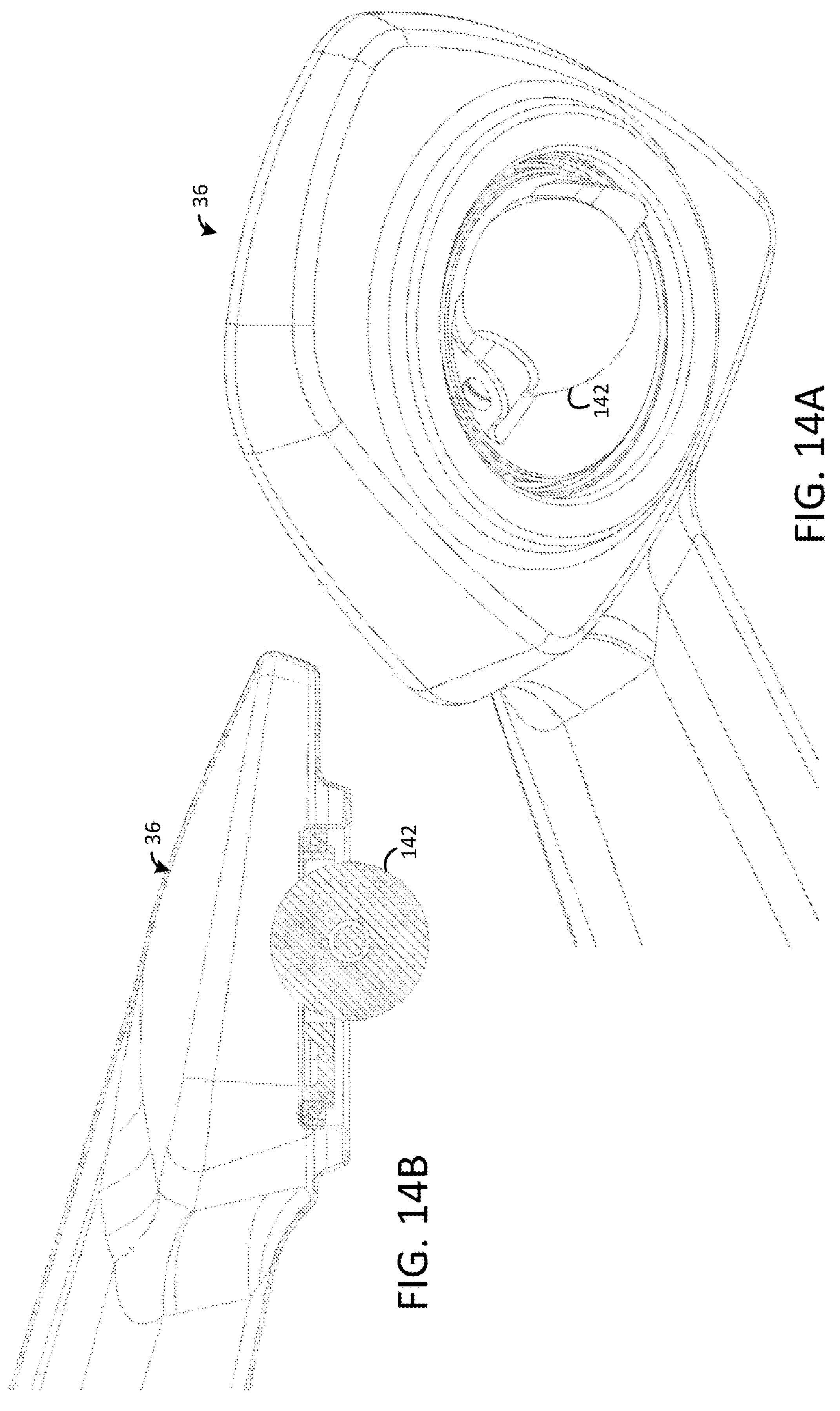
FIG. 14A depicts a bottom perspective view of a landing gear leg with self-catering roller, such as is depicted by FIG. 1A.
FIG. 14B depicts a cross-sectional view of the landing gear foot depicted by FIG. 14A.

As shown by FIGS. 14A and 14B, the distal end of each leg 36 away from the fuselage 25 may have a roller 142. In one embodiment, the roller 142 is a self-castering roller mounted inside a large diameter, thin section bearing, and the roller 142 is capable of rolling in any direction (360 degrees) on the surface of the ground after landing, thereby helping to facilitate suspension function and ground handling. In other embodiments, other types of rollers and configurations of the legs 36 are possible. As an example, it is possible for the legs 36 not to have rollers or otherwise be configured for rolling.

Figure 16:
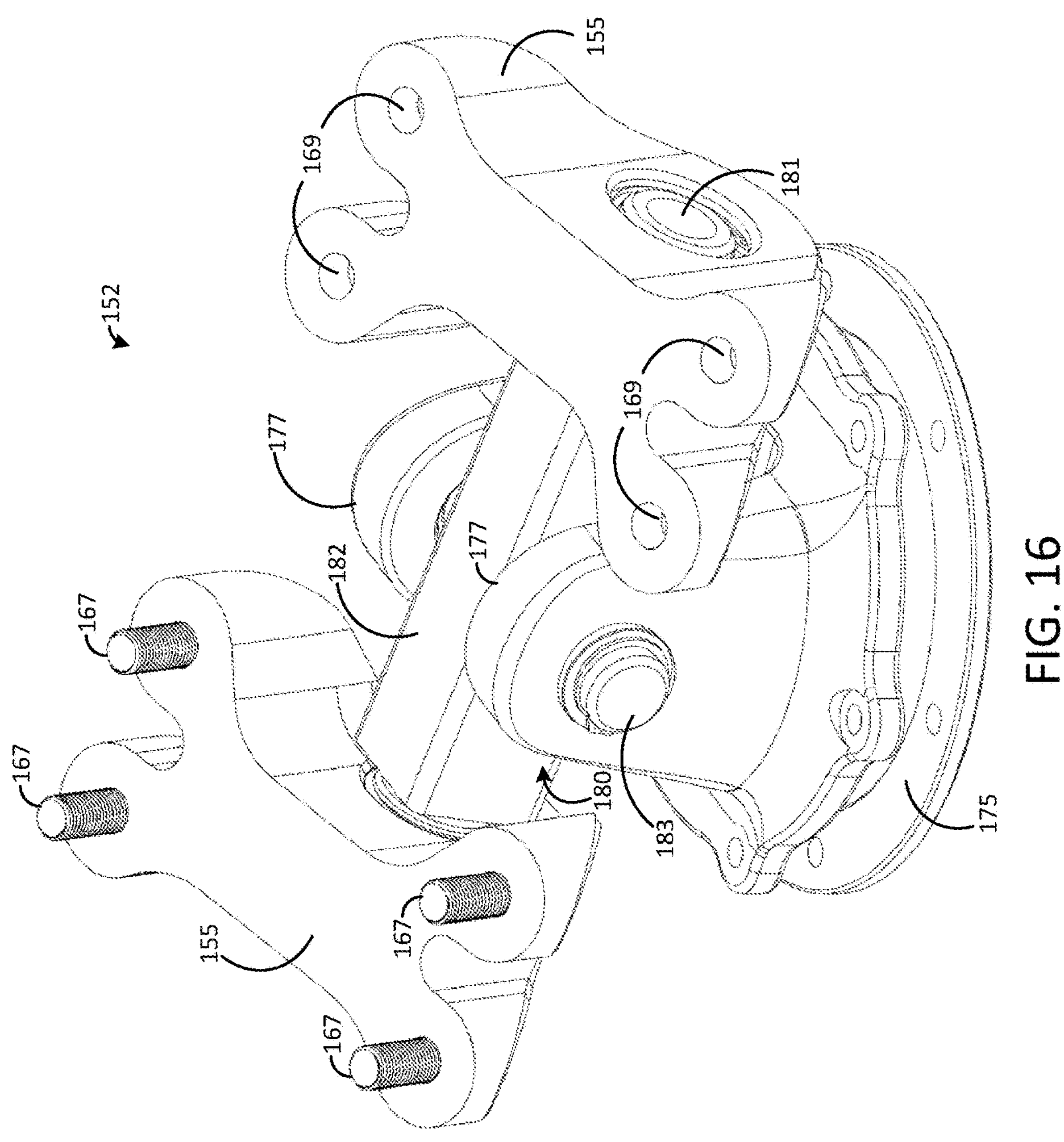
FIG. 16 depicts a perspective view of the pivotal coupling depicted by FIG. 15A.

Referring to FIGS. 15A and 15B, the powerplane assembly 33 is connected to the powerpack assembly 32 by pivotal coupling 152, which in some embodiments is implemented with a biaxial connector, though other types of couplings may be used in other embodiments. The pivotal coupling 152, when implemented as a biaxial connector, functions like a U-joint and in this embodiment has a pair of pillow blocks 155 that are attached to a boom mount 163, which is connected to the booms 51 as shown by FIG. 15A. In this regard, bolts 166 or other couplers may be used to attach each boom 51 to the boom mount 163, and bolts 167 (FIG. 16) or other couplers may be used to attach the pillow blocks 155 to the boom mount 163. As an example, each pillow block 155 may have holes 169 (FIG. 16) through which a respective bolt 167 or other coupler may pass and extend into the boom mount 163 in order to secure the boom mount 163 to the pillow block 155. In this embodiment, the boom mount 163 does not move relative to each pillow block 155. FIG. 16 shows the pillow blocks 155 with bolts 167 inserted in one of the pillow blocks and the other pillow block 155 without bolts 167 inserted for illustrative purposes.

Note that a biaxial connector generally refers to a connector that permits separate, independent rotation or combined, simultaneous rotation about two perpendicular axes. As an example, in the pivotal coupling 152, the boom mount 163 and, thus, powerplane assembly 33 are permitted to pivot about one or more pins 183 for rotation about a first axis and to pivot about one or more pins 181 for rotation about a second axis, as will be described in more detail below. In other embodiments, other types of biaxial or non-biaxial couplings may be used to pivotally connect the powerplane assembly 33 to the fuselage 25. As an example, hinges, spherical bearings or other types of mechanical couplings may be used to permit pitch and roll of the powerplane assembly 33. In some embodiments, a compliant, flexible coupling may be used to connect the powerplane assembly 33 to the fuselage 25. Such a coupling may comprise rubber, wire rope, webbing, or other type of compliant, flexible coupling to permit relative movement of the powerplane assembly 33 and the fuselage 25 about one or more axes. Yet other types of couplings are possible in other embodiments.

Note that one or more sensors 69 (FIG. 15A), such as an inertial measurement unit, may be mounted on the boom mount 163 and/or other components of the powerplane assembly 33 for sensing the orientation (e.g., inclination) of the powerplane assembly 33. As an example, one inclinometer may be attached to the boom mount 163 or other component of the powerplane assembly 33 to sense the angle of the powerplane assembly 33 relative to the roll axis, and another inclinometer may be attached to the boom mount 163 or other component of the powerplane assembly 33 to sense the angle of the powerplane assembly 33 relative to the pitch axis. In other examples, other types of sensors may be used to sense the orientation of the powerplane assembly 33 or make other types of measurements.

Figures 17, 18, 19:
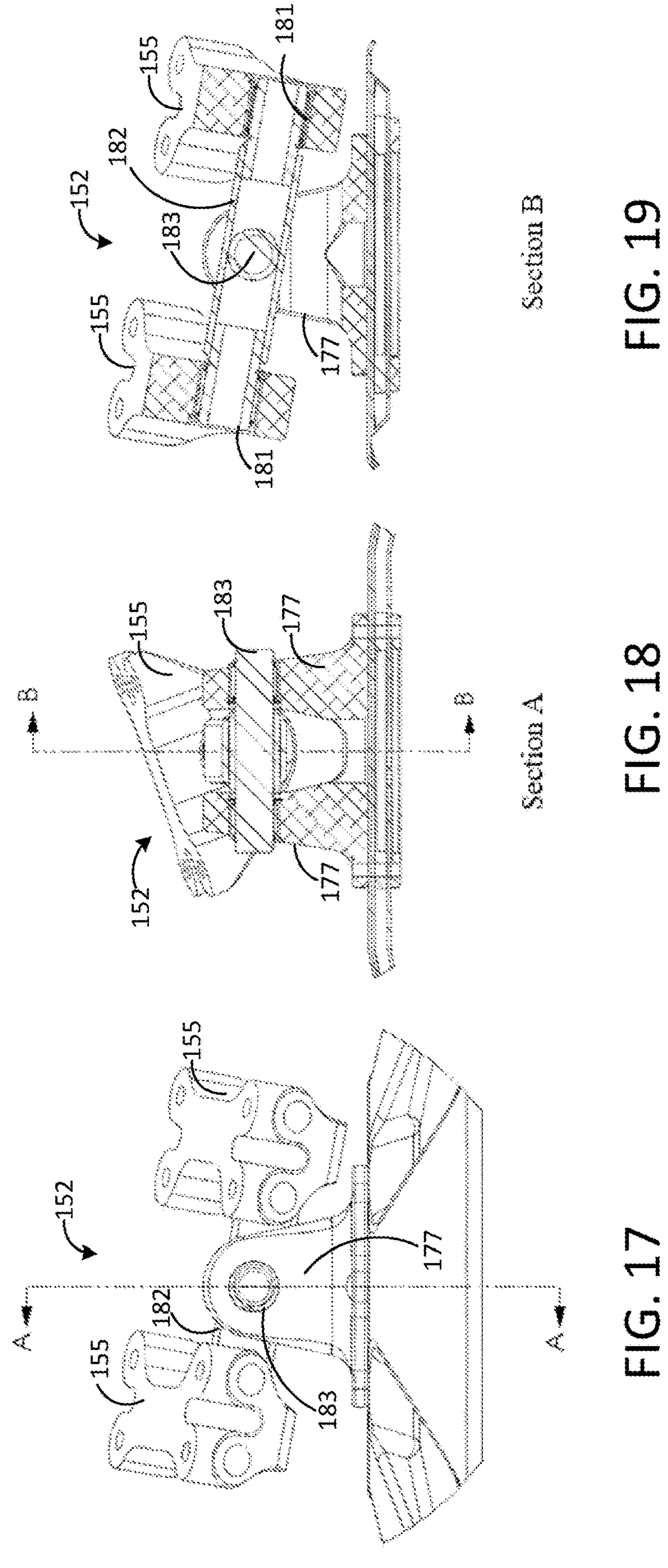
FIG. 17 depicts a side view of the pivotal coupling depicted by FIG. 16.
FIG. 18 depicts a cross-sectional view of the pivotal coupling depicted by FIG. 16 taken along the cut lines shown by FIG. 17.
FIG. 19 depicts a cross-section view of the pivotal coupling depicted by FIG. 16 taken along the cut lines shown by FIG. 18.

As shown by FIGS. 16 and 17, the pivotal coupling 152 has a yoke 175 that is rigidly mounted on the powerpack assembly 32 of the fuselage 25. That is, the yoke 175 does not move relative to the powerpack assembly 32 thereby preventing the powerplane assembly 33 from rotating about the yaw axis (Z) relative to the fuselage 25. Thus, the powerplane assembly 33 and the fuselage 25 rotate in unison about the yaw axis during flight.

The yoke 175 comprises a pair of brackets 177 that protrude from a surface of the yoke 175 forming a space between the brackets 177. The pillow blocks 155 are connected to each other by a cross 180 having a sleeve 182 and a pin 183, which passes through the sleeve 182 and each bracket 177. The sleeve 182 passes through the space between the brackets 177 and may rotate about the pin 183 thereby permitting the powerplane assembly 33, including the rotors 52, to rotate about the pitch axis.

A respective pin 181 (which is hollow in one embodiment but may be solid) extends from each end of the sleeve 182 and passes through a pillow block 155. In the embodiment depicted by FIGS. 16 and 17, separate pins 181 extend from each end of the sleeve 182. Each pillow block 155 may rotate about the respective pin 181 passing through it thereby permitting the powerplane assembly 33, including the rotors 52, to rotate about the roll axis. FIG. 18 shows a cross-sectional view of the pivotal coupling 152 along the cut lines depicted by FIG. 17, and FIG. 19 shows a cross-sectional view of the pivotal coupling 152 along the cut lines depicted by FIG. 18.

Notably, the use of a pivotal coupling 152 that allows the fuselage 25 (e.g., the powerpack assembly 32 and the cabin 31) to hang from a pivot point, as described herein, is relatively simple and much less expensive than other VTOL designs that use tilting rotors or tilting wings to generate lateral thrust. Indeed, many tilt rotor or tilt wing configurations require actuators and complex feedback circuits for actively moving a wing or rotor to a desired orientation relative to the fuselage. In the instant embodiment, differential thrust generated by the rotors 52 is used to pitch or roll the powerplane assembly 33 as desired, and there is no need for a separate actuator to control the orientation of the powerplane assembly 33 relative to the fuselage 25. Instead, the fuselage 25 freely hangs from the pivotal coupling 152, and gravity holds the fuselage 25 in an upright configuration while the powerplane assembly 33 is rotated about the pitch axis and roll axis via differential thrust generated by the rotors 52 as may be desired. That is, the powerplane assembly 33 rolls and pitches relative to the fuselage 25 when differential thrusts by the rotors 52 change the attitude of the powerplane assembly 33 while the fuselage 25 passively hangs from the pivotal coupling 152 in an upright orientation.

Through the use of a pivotal coupling 152 as described above, it is possible to control the attitude of the powerplane assembly 33 in a manner conducive for optimizing flight while the fuselage 25 (e.g., the powerpack assembly 32 and the cabin 31) essentially hangs from the pivotal coupling 152 with a substantially upright orientation. That is, pitching or rolling of the powerplane assembly 33 does not induce a corresponding movement of the cabin 31. Thus, a passenger in the cabin 31 experiences much less pitch and roll movement as compared to aircraft designs which incline the airframe to generate lateral thrust. In addition, the pivotal coupling 152 acts as a mechanical filter to dampen out vibrations from the rotors 52 such that less vibration is felt in the cabin 31.

Furthermore, by decoupling movement of the powerplane assembly 33 from the fuselage 25 about the pitch axis and the roll axis as described above, the powerplane assembly 33 is able to respond to rotor thrust changes more quickly since the weight and moment of inertia of the fuselage 25 does not resist the powerplane assembly's movement about the pitch axis and the roll axis. This enhances powerplane responsiveness and increases maneuverability of the aircraft 20, which may be particularly important in urban areas where sudden or abrupt course changes might be needed or desired.

Figure 20:
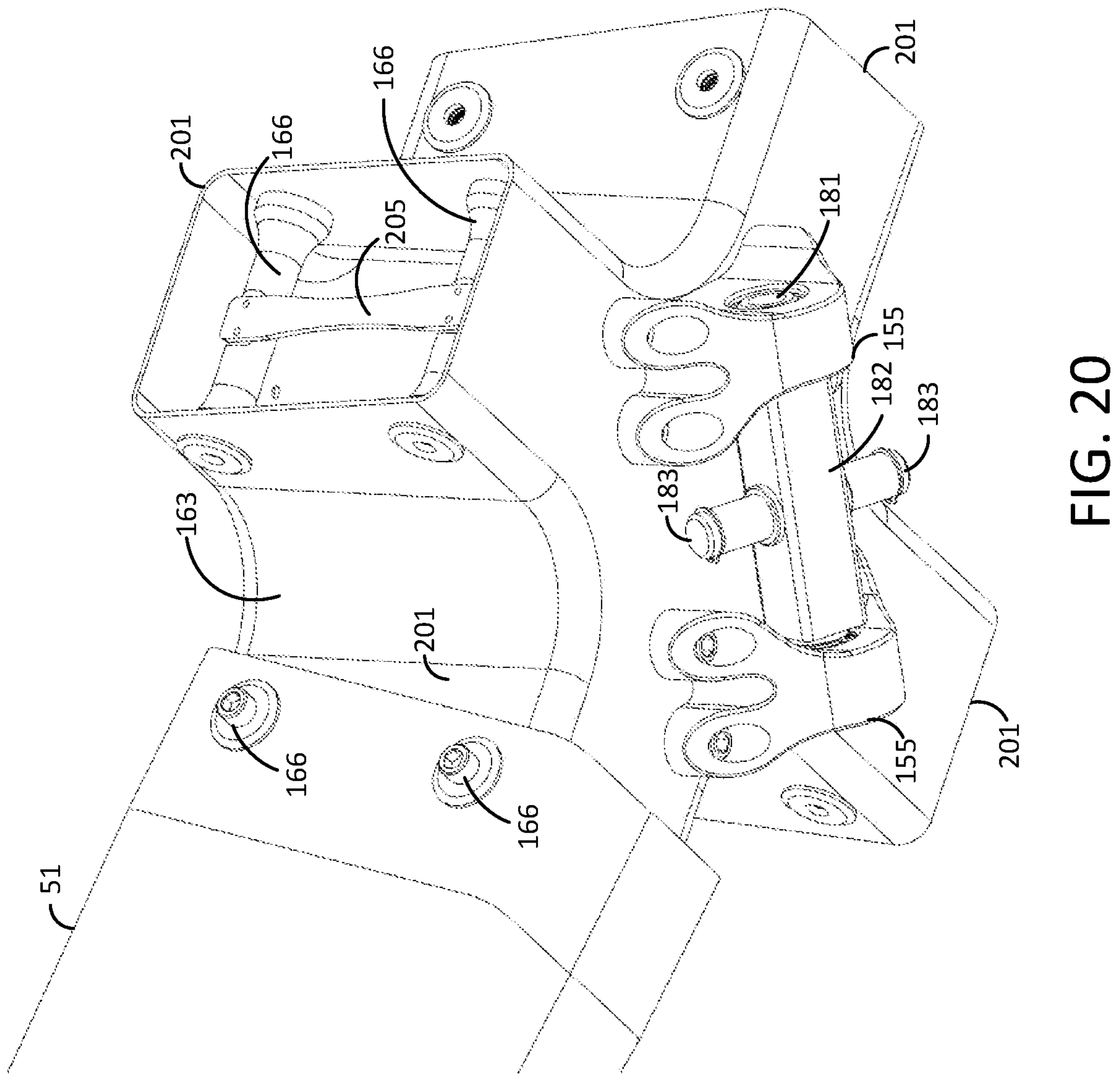
FIG. 20 depicts a perspective view of a support structure for connecting booms of a powerplane assembly to the pivotal coupling depicted by FIG. 16.

FIG. 20 depicts an embodiment of the boom mount 163 connected to one boom 51 and the pillow blocks 155 of the pivotal coupling 152 (FIG. 16). The boom mount 163 comprises a plurality of hollow brackets 201, each of which has a shape corresponding to that of the proximal end of a boom 51 to be secured to the bracket 201. In the embodiment depicted by FIG. 21, the proximal end of each boom 51 is hollow for receiving a bracket 201 and has a rectangular cross-section, and the bracket 201 has walls that form the same approximate cross-sectional shape as the proximal end of the boom 51. Thus, the proximal end of the boom 51 forms flat, faceted surfaces that are dimensioned to receive a respective bracket 201 of the boom mount 163. In some embodiments, the proximal end of a boom 51 and the bracket 201 to be mated with the boom 51 are dimensioned such that the bracket 201 snugly fits into the proximal end of the boom 51. Once the bracket 201 is inserted into the proximal end of the boom 51, one or more bolts 166 or other types of couplers are inserted through the walls of the boom 51 and the bracket 201 to secure the boom 51 to the bracket 201. As shown by FIG. 20, each bracket 201 has one or more horizontal spindles 205 that span the inner walls of the bracket 201 to help stabilize and prevent deformation of the bracket walls.

Figure 2:
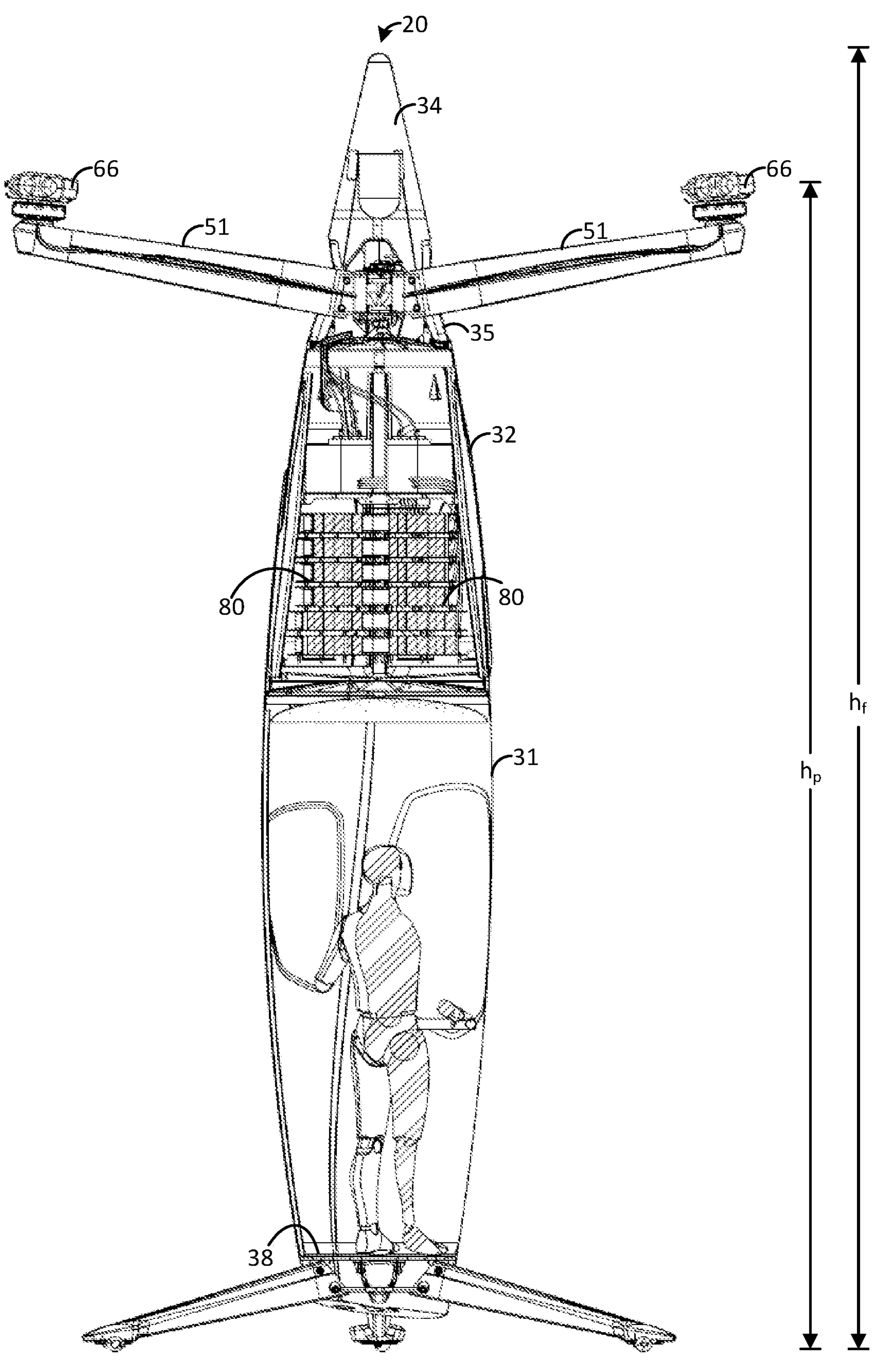
FIG. 2 depicts a side view of the VTOL aircraft of FIG. 1 with portions of the fuselage removed to expose components within the fuselage.
Figure 21:
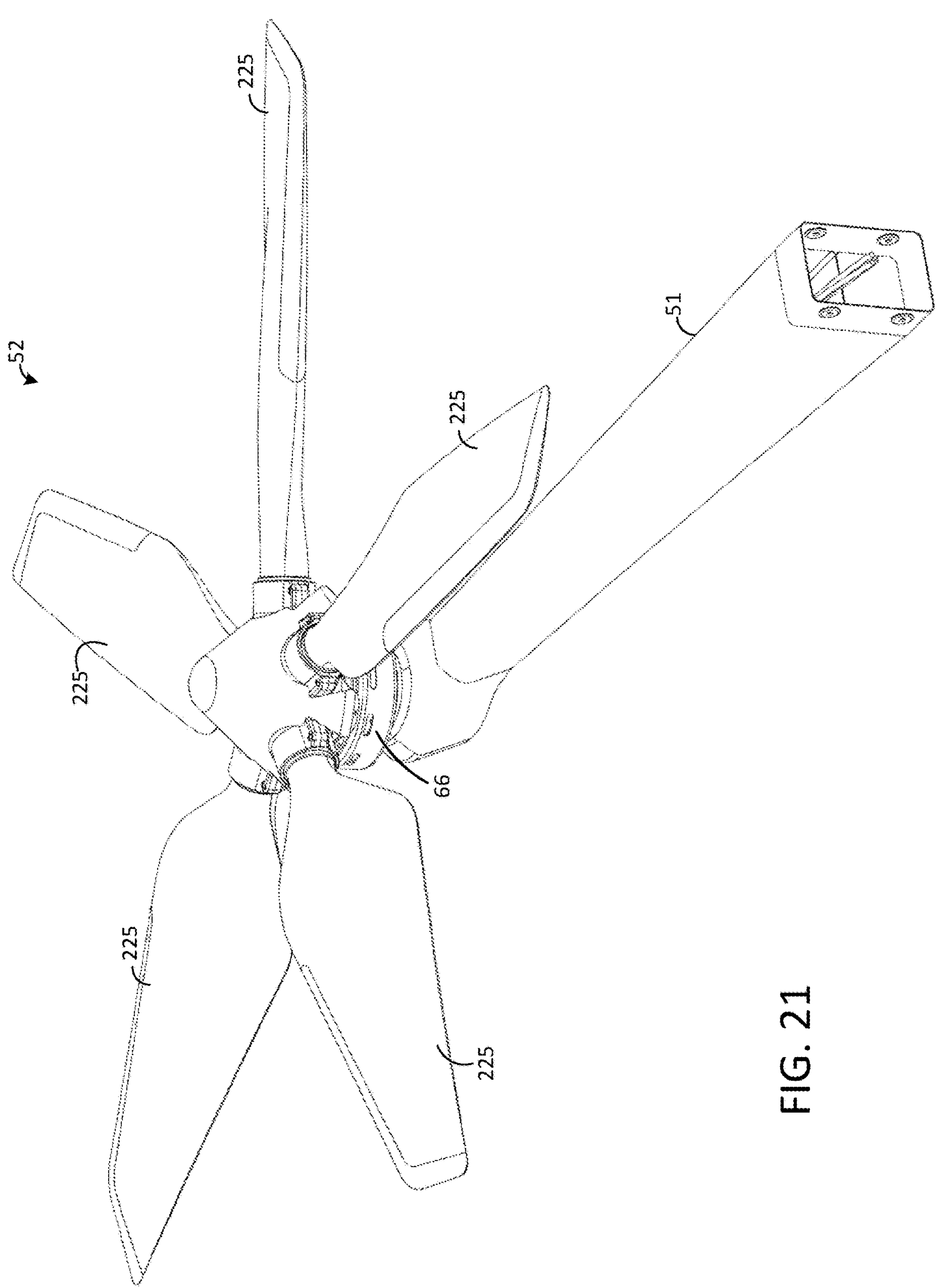
FIG. 21 depicts a perspective view of a boom connected to a motor and rotor assembly for VTOL aircraft, such as is depicted by FIG. 1A.

The distal end of each boom 51 is coupled to a respective rotor 52 and motor 66 (FIG. 2). As shown by FIG. 21, each rotor 52 has a plurality of rotor blades 225, and its motor 66 is configured to operate under the control of a corresponding motor controller 65 (FIG. 4) to rotate the blades 225 such that they interact with air to force air downward thereby providing a thrust in the opposite direction. As known in the art, the speed at which the blades 225 rotate or spin generally controls the amount of thrust provided by the rotor 52. In one embodiment, the diameter of each rotor 52 is about 76 inches. That is, the distance from the center of the rotor 52 to the tip of a given blade 225 is about 38 inches. Further, the booms 51 are dimensioned such that the overall width (wp) of the rotors 52 of the powerplane assembly 33 is about 15.7 feet. That is, the maximum reach of the rotor blades 225 from the longitudinal axis of the fuselage 25 is about 7.85 feet. In other embodiments, other dimensions of the rotors 52 and booms 51 are possible.

In addition, as previously noted above, the vertical orientation of the fuselage 25 with the powerplane assembly 33 mounted above the fuselage 25 helps to raise the rotors 52 off of the ground for safety while utilizing a relatively small footprint and/or aircraft size. For example, in the embodiment described above for FIG. 1A, the rotors 52 may be located about 15.8 feet off of the ground, which is more than sufficient to ensure that they do not inadvertently contact a person walking fully erect beneath the rotors 52. In this regard, keeping the rotors 52 about 10 feet or more off of the ground should make the height of the rotors 52 greater than the height of even the tallest person likely to use the aircraft 20 while adding a suitable margin of error.

In addition, a greater height of the rotors 52 helps to reduce the effects of ground effect and potential for rotor wash recirculation interactions during takeoff and landing when the aircraft 20 is close to the ground. Indeed, such a height of the rotors 52 from the ground should position rotors 52 out of ground effect, thereby providing improved hover performance during landing and takeoff. Greater rotor height also reduces risk of injury to a passenger during an event that causes rotor or blade separation and also the risk of damage from foreign object debris (FOD) from objects on the ground that may be blown by the rotor wash. By creating a tall, narrow column of air, there should be reduced horizontal downwash velocity (increasing safety to passengers or other persons in the vicinity of the aircraft 20) and reduced risk of FOD recirculation as compared to aircraft designs with a shorter rotor height, such as at least some helicopters.

Figure 3:
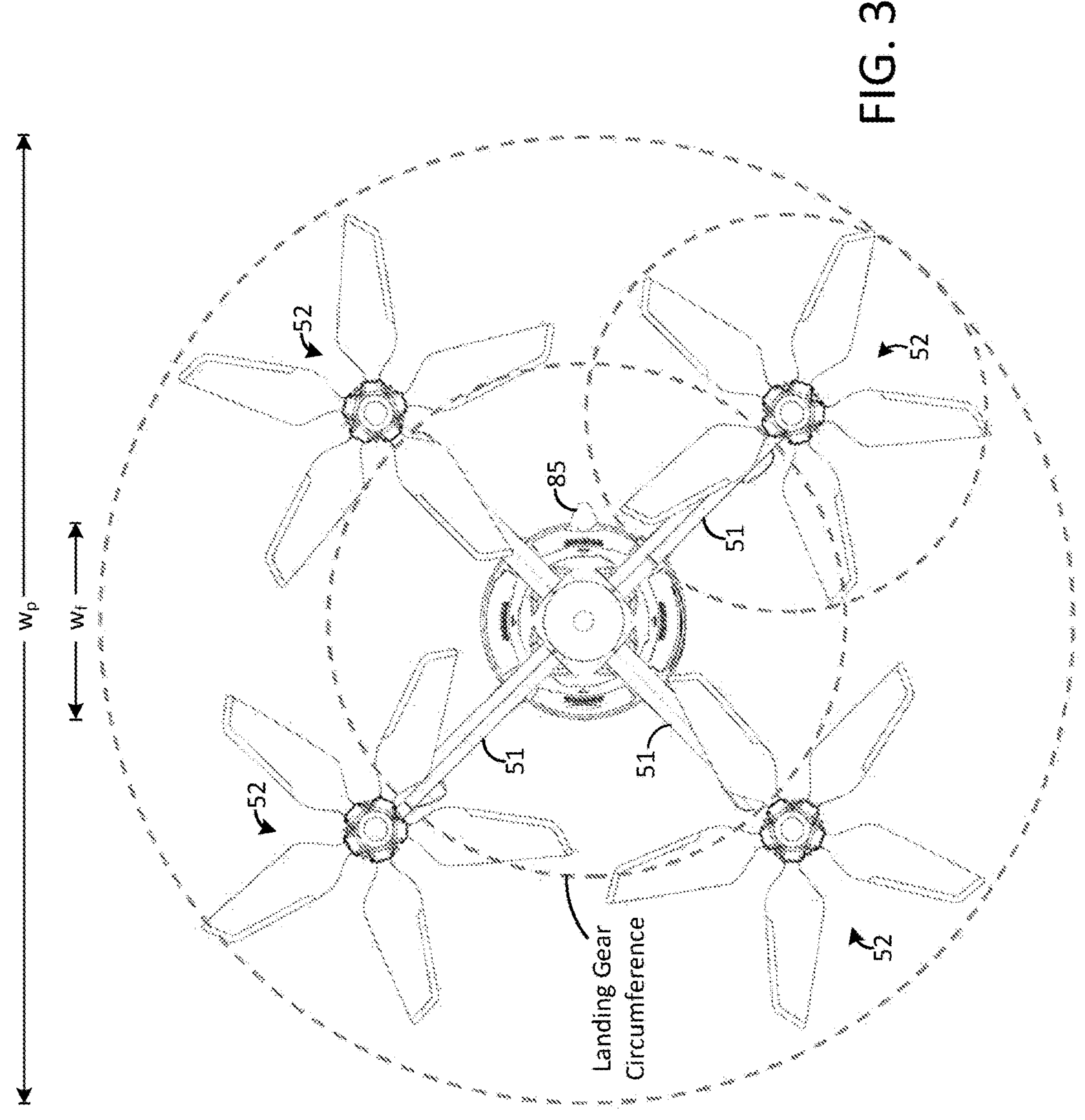
FIG. 3 depicts a top view of the VTOL aircraft depicted by FIG. 1A.

In some embodiments, the aircraft 20 has an aspect ratio (hp/wp), referred to hereafter as "powerplane aspect ratio," of about 1.0 or greater, where "hp" is the maximum rotor height of the powerplane assembly 33 in the z-direction and "wp" is the maximum rotor width (i.e., from blade tip-toblade tip) of the entire powerplane assembly 33 in the x-direction, as shown by FIG. 3. As an example, in one embodiment described above, hp is about 15.8 feet and wp is about 15.7 feet. However, other dimensions and ratios are possible. Indeed, greater rotor heights may help to enhance at least some of the benefits described above, including reduced ground effect and potential for rotor wash recirculation interactions that can affect controllability of the aircraft 20 close to the ground, as well as enhancing safety and the passenger perception of safety. In fact, in some embodiments, it may be desirable for the powerplane aspect ratio to be at least 2.0 or even 3.0 or more.

Note that the design of the aircraft 20 with a high powerplane aspect ratio helps to de-couple the ground footprint from rotor size. Thus, rotor diameter can be increased as desired to increase lift, reduce noise, or provide other benefits, without increasing the aircraft's ground footprint. Also, such design along with a streamlined fuselage 25 provides reduced vehicle interaction with rotor downwash, thereby providing for steady, smooth takeoffs and landings, particularly in conjunction with light, responsive powerplane differential thrusting. Various other benefits of a relatively high powerplane aspect ratio are also possible.

Note that the use of electrical motors 66 in the configurations shown and/or described herein provide many advantages and benefits. In this regard, electrical motors 66 are clean and efficient helping to reduce pollution and waste. In addition, electrical motors 66 typically are much quieter than other types of motors, thereby enabling the aircraft 20 to access more locations in urban environments. Using multiple rotors 52 helps to reduce the required speed of the rotor blades of each respective rotor 52 in order for the powerplane assembly 33 to generate a desired amount of lift. In addition, using a vertically elongated fuselage 25 allows for a greater height of the powerplane assembly 33, thereby permitting larger rotor blades to be used without increasing the aircraft's ground footprint. Using larger, slower-rotating blades decreases the amount of noise generated by the rotors 52 and, thus, helps to make the aircraft more conducive to urban environments.

During operation, the flight controller 63 (FIG. 4) is configured to receive input from the sensors 69 and to control flight of the aircraft 20 based on the sensor inputs. As an example, the sensors 69 may indicate aircraft attitude and movement (e.g., airspeed), and the flight controller 63 may provide control signals to the motor controllers 65 for controlling the rotors 52 to generate the appropriate thrust for achieving a desired attitude of the powerplane assembly 33 and movement of the aircraft 20. At least some sensors 69 (e.g., a GPS sensor) may be used to sense the location of the aircraft 20, and the flight controller 63 may control movement of the aircraft 20 in order to navigate the aircraft 20 to a desired destination. At least some sensors 69, such as radar or LIDAR, may be used to sense objects external to the aircraft 20, and the flight controller 63 may use information from these types of sensors to sense and avoid collision threats.

Based on the input from the sensors 69, the thrusts generated by the rotors 52 are controlled to move the aircraft 20 as desired to a destination. As an example, thrust may be increased to lift the aircraft 20 off the ground. After taking off, differential thrusting may be used to control the direction of flight and attitude of the powerplane assembly 33. Thrusting may also be used to control the ascent and descent of the aircraft 20 as may be desired. As the attitude of the powerplane assembly 69 is changing about the pitch axis and roll axis, the fuselage 25 hangs from the pivotal coupling 152 and maintains a vertical orientation due to gravity independent of the movements of the powerplane assembly 33 and, thus, rotors 52 about the pitch axis and roll axis.

Once the aircraft 20 reaches its destination, the flight controller 63 controls the rotors 52 so that the aircraft 20 gently lands on the legs 36. If an emergency condition is detected during the flight, such as a detection of a fire or failure of a critical component (e.g., one or more rotors 52), the flight controller 63 may be configured actuate the BRS 72 in order to deploy a parachute that allows the aircraft 20 to slowly and safely return to the ground. In other embodiments, other techniques and/or recovery systems for handling an emergency condition are possible.

Figure 22:
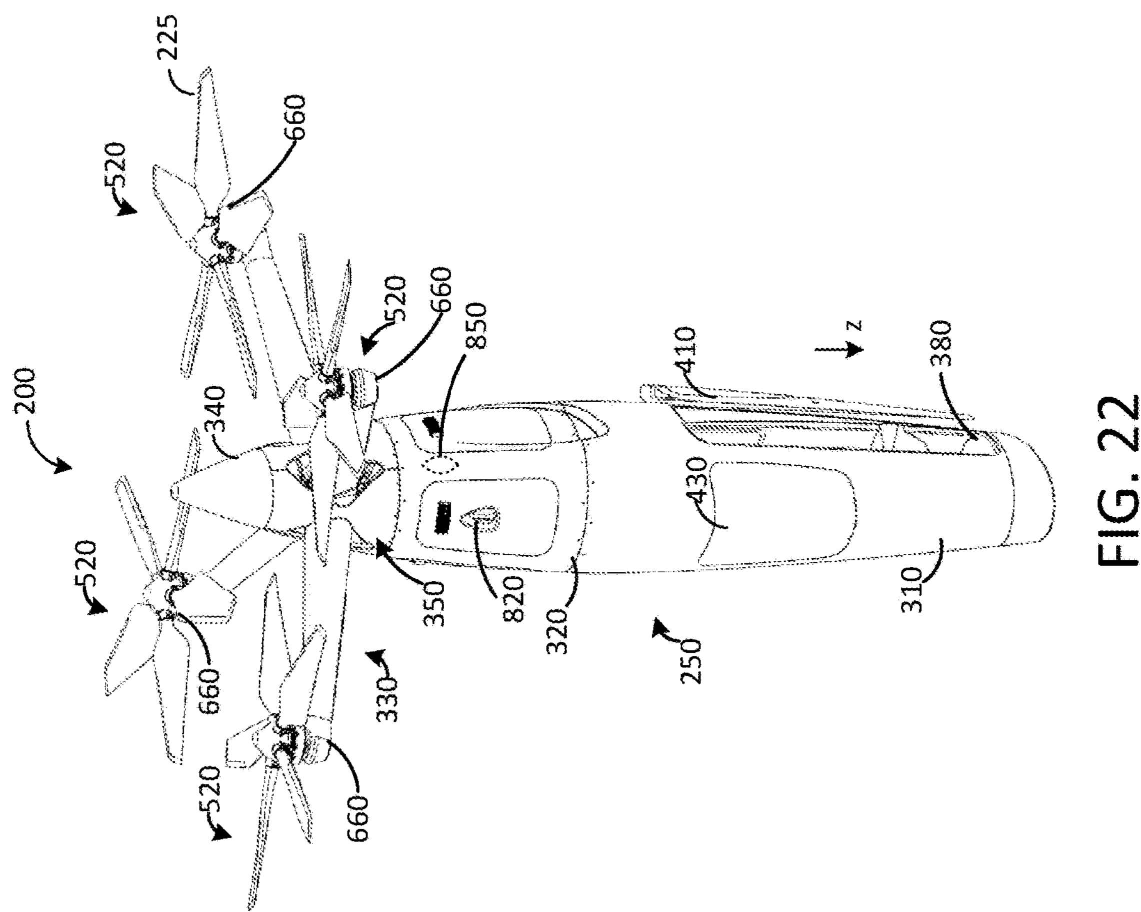
FIG. 22 depicts a perspective view of an embodiment of a VTOL aircraft.

FIG. 22 shows a VTOL aircraft 200, according to an example embodiment. The aircraft 200 has a fuselage 250 that is vertically elongated (in the z-direction). As an example, the fuselage 250 may be vertically elongated such that it has an aspect ratio ($h_f/w_f$), referred to hereafter as "fuselage aspect ratio," of about 2.0 or greater, where "$h_f$" is the maximum height of the fuselage 25 in the z-direction and "$w_f$" is the maximum width of the fuselage 25. However, a greater fuselage aspect ratio may help to increase the height of the powerplane assembly 330, thereby realizing various benefits, as will be described in more detail below. To enhance at least some of these benefits, it may be desirable for the fuselage aspect ratio to be at least 3.0 or even 4.0 or more. For example, a greater fuselage aspect ratio may help to minimize or eliminate downwash ground effect interactions, thus simplifying control system workload and enhancing passenger comfort. Having a greater rotor height not only provides some performance benefits, as described in more detail below, but also may help to provide passengers with a greater sense of safety. It may also reduce the rotor wash felt by a passenger or other user while walking beneath the rotors 520.

The vertical orientation of the fuselage 250 also helps to optimize the shape of the fuselage 250 for streamwise aerodynamic efficiency and reduced VTOL and hover drag. Some additional benefits include: providing more room to accommodate one or more standing passengers and providing easy entry and exit to the cabin for passengers; reduced ground footprint, helping to facilitate maneuvers in confined or congested areas; and providing greater vertical cabin space to accommodate long, unwieldy cargo. In other embodiments, aspect ratios below 2.0 are possible, and it is unnecessary for the fuselage 250 to be vertically elongated. Indeed, although the vertical orientation of the fuselage 250 has many advantages, as described herein, it should be emphasized that such vertical orientation is unnecessary in all embodiments, and any shape of the fuselage 250 is possible in other embodiments.

As shown in FIG. 22, the fuselage 250 has one or more modules, such as a cabin 310, a powerpack assembly 320, a powerplane section 350, and a nose 340 (which is tapered in the shape a cone, though other shapes are possible). The fuselage 250 is coupled to a powerplane assembly 330, which includes booms 510 and rotors 520, used to provide lift and controllability as will be described in more detail below. In some embodiments, the walls of the fuselage 250 are composed of a carbon fiber material helping to reduce weight. As shown by FIG. 22, the aircraft 200 lacks the landing gear of aircraft 20, because aircraft 200 is configured to land and dock in a respective VTOL docking station 900, as described in more detail below.

In the embodiment depicted by FIG. 22, the aircraft 200 is dimensioned such that, when it is on the ground prior to takeoff, the bottom of the cabin 310 is about 1.2 feet above the ground, the bottom of the powerpack assembly 320 is about 9.1 feet above the ground, the bottom of the powerplane section 350 is about 16.6 feet above the ground, and the top of the nose 340 is about 18.1 feet above the ground such that the overall height of the fuselage 250 is about 18.1 feet above the ground.

In some embodiments, the aircraft 200 is designed to have a cruise speed of up to about 60 miles per hour with a weight of about 900 pounds and a targeted service range of about 10 miles (with reserve). In addition, the aircraft 200 is designed to produce noise during takeoff and landing of less than 60 decibels (dB) from a distance of 50 feet. In other embodiments, other design and performance characteristics are possible.

The cabin 310 forms a compartment in which cargo, passengers, and/or other types of payloads may be situated for transport, and will sometimes be referred to hereafter as "passenger cabin." In the embodiment depicted by FIG. 22, the cabin 310 is designed to accommodate one or two passengers, who stand on a floor 380 (FIG. 22) of the cabin 310 during operation, similar to an elevator or some alpine cable cars. Also, the cabin 310 has a door 410 through which the passenger may enter the cabin 310, and the cabin 310 has a plurality of windows 430 through which the passenger may see outside the cabin 310. In other embodiments, the cabin 310 may be designed to accommodate a greater number of passengers and/or other types of payloads, such as cargo (e.g., one or more packages to be delivered to one or more locations), and use of windows 430 is unnecessary. In addition, the cabin 310 may include one or more seats for permitting one or more passengers to sit as may be desired during transport. In contrast to door 41, door 410 can be configured as an automatic, single sliding plug door, as is common in the light rail industry instead of a hinged door. Door 410 can be desirable when aircraft 200 is docked within a docking station 900 (described below), because a hinged door that swings outward such as door 41 may interfere with docking station 900. In addition, single sliding plug door design and engineering, including tamper-proof automatic locking mechanisms for safety-critical, high-speed applications, is mature technology well understood within the industry.

The vertical orientation of the fuselage 250 and cabin 310 allows a passenger to stand or maintain an upright posture, providing a user experience similar to an elevator and which may be preferable or more enjoyable to the at least one passenger, enables rapid entry and exit, and is easy to clean between flights. Further, as will be described in more detail below, the aircraft 200 may be designed such that the cabin 310 experiences very little or no movement about the pitch and roll axes in response to differential thrusting of the rotors 520, thereby reducing perturbations or movements experienced by the passenger during flight. It should be understood that aircraft 200 is compatible with the BRS system discussed with respect to aircraft 20, the full description of which is omitted herein for brevity. The BRS may be located above the powerplane assembly 330, helping to keep the parachute lines clear of the powerplane rotors 520. However, in other embodiments, aircraft 200 may use non-BRS flight safety and recovery systems. For example, aircraft 200 may utilize a dual redundant battery and motor system such that if the if one set of batteries or motors fail, the backup batteries or motors can be utilized to safely land aircraft 200.

In some embodiments, the shape of the vertically elongated fuselage 250 is streamlined so as to reduce aerodynamic drag from air being blown over the fuselage 250 by the rotors 520. In the embodiment depicted by FIG. 22, the fuselage 250 has a generally circular cross-section along its longitudinal axis (which is parallel to the z-direction in the exemplary embodiment of FIG. 22), and the fuselage 250 may be tapered. As an example, and as shown by FIG. 22, the fuselage's diameter or width may increase downward in the z-direction from the top of the fuselage 250 in order to provide greater area for the powerpack assembly 320 and the cabin 310. However, as shown in FIG. 22, the diameter of the lower portion of the cabin 310 may slightly decrease toward the base of the cabin 310 in order to reduce frontal area and aerodynamic resistance. In some embodiments, the maximum diameter or width of the cabin 310 is about 38 inches, but other maximum cabin widths are possible. In other embodiments, the fuselage 250 may have other types of profiles and contours, and as noted above, the pivotally-coupled powerplane assembly described herein is compatible with a wide range of vertically or horizontally elongated fuselage configurations.

The shape and dimensions of the cabin 310 are designed such that at least one passenger may comfortably stand fully erect in the cabin 310 during flight. In some embodiments, the interior height of the cabin 310 from floor to ceiling is about 7.9 feet, though other heights are possible in other embodiments. Indeed, cabin heights greater than 6.5 feet will accommodate$_{99}$th percentile males in order to allow them to stand fully erect in the cabin 310. In some embodiments, the cabin 310 may have one or more holding apparatuses, such as a handrail (not shown) or hand strap, mounted on an interior wall of the cabin 310, and a passenger may hold onto such holding apparatus during flight in order to help maintain balance. To provide more room for standing, the cabin 310 may be designed without a passenger seat, but it is possible for the cabin 310 to have one or more seats in which one or more passengers may sit during flight. Yet other designs and configurations of the cabin 310 are possible in other embodiments.

Figure 35D:
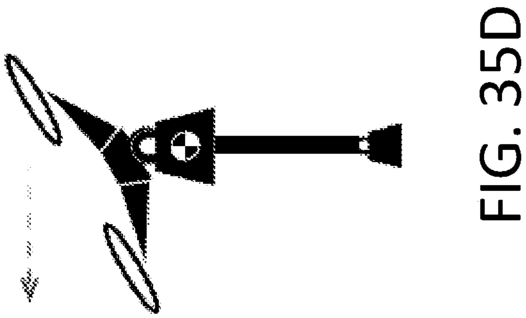
FIGS. 35A-D illustrate the effect of varying a center of mass of a VTOL aircraft, according to aspects of the present disclosure. More specifically.
Figure 35C:
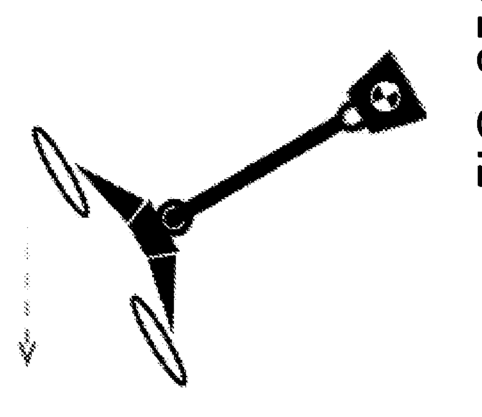
Figure 35C:
Figure 35B:
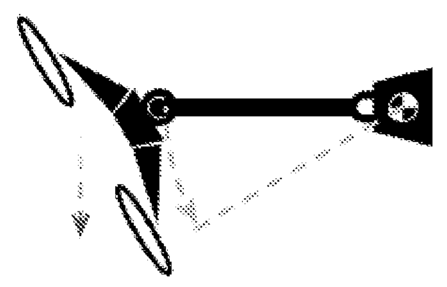
Figure 35A:
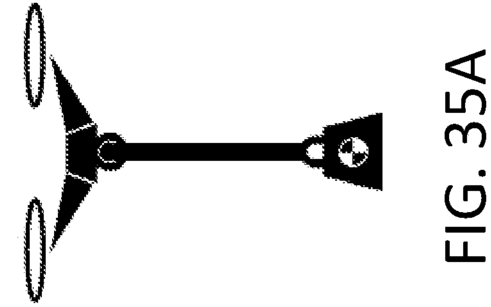

As shown in FIG. 22, the powerpack assembly 320 of aircraft 200 is positioned above cabin 310 and below powerplane section 350. The positioning of the powerpack assembly is not arbitrary. Placing the powerpack mass close to the powerplane pivot (e.g., pivotal coupling 1520) helps maintain cabin verticality during lateral acceleration, because multirotor aircraft pivot around the center of mass, not the center of thrust. Accordingly, positioning the powerpack assembly 320 near the pivotal coupling 1520 helps aircraft 200 to maintain cabin verticality during lateral acceleration as shown in FIG. 35D. By contrast, multirotor aircraft with a center of mass located far below the powerplane pivot may have difficulty maintaining vertical orientation of the cabin during pronounced lateral acceleration, as illustrated in FIGS. 35A-C.

Returning to FIG. 22, the powerplane assembly 330 comprises a plurality of booms 510 extending from a central mount and a plurality of motors 660 and rotors 520 respectively mounted on the booms 510. In the embodiment depicted by FIG. 22, the powerplane assembly 330 has four booms 510 and four rotors 520 with five blades each, but the powerplane assembly 330 may have other numbers of booms 510, motors 660, rotors 520, or rotor blades 225 in other embodiments. In the embodiment depicted by FIG. 22, the rotors 520 provide sufficient lift for the aircraft 200 without the need of other lift-generating apparatuses, such as wings. However, in other embodiments, the aircraft 200 may have winglets or other lift-generating apparatuses, which may help to increase the range of the aircraft 200.

Figure 24:
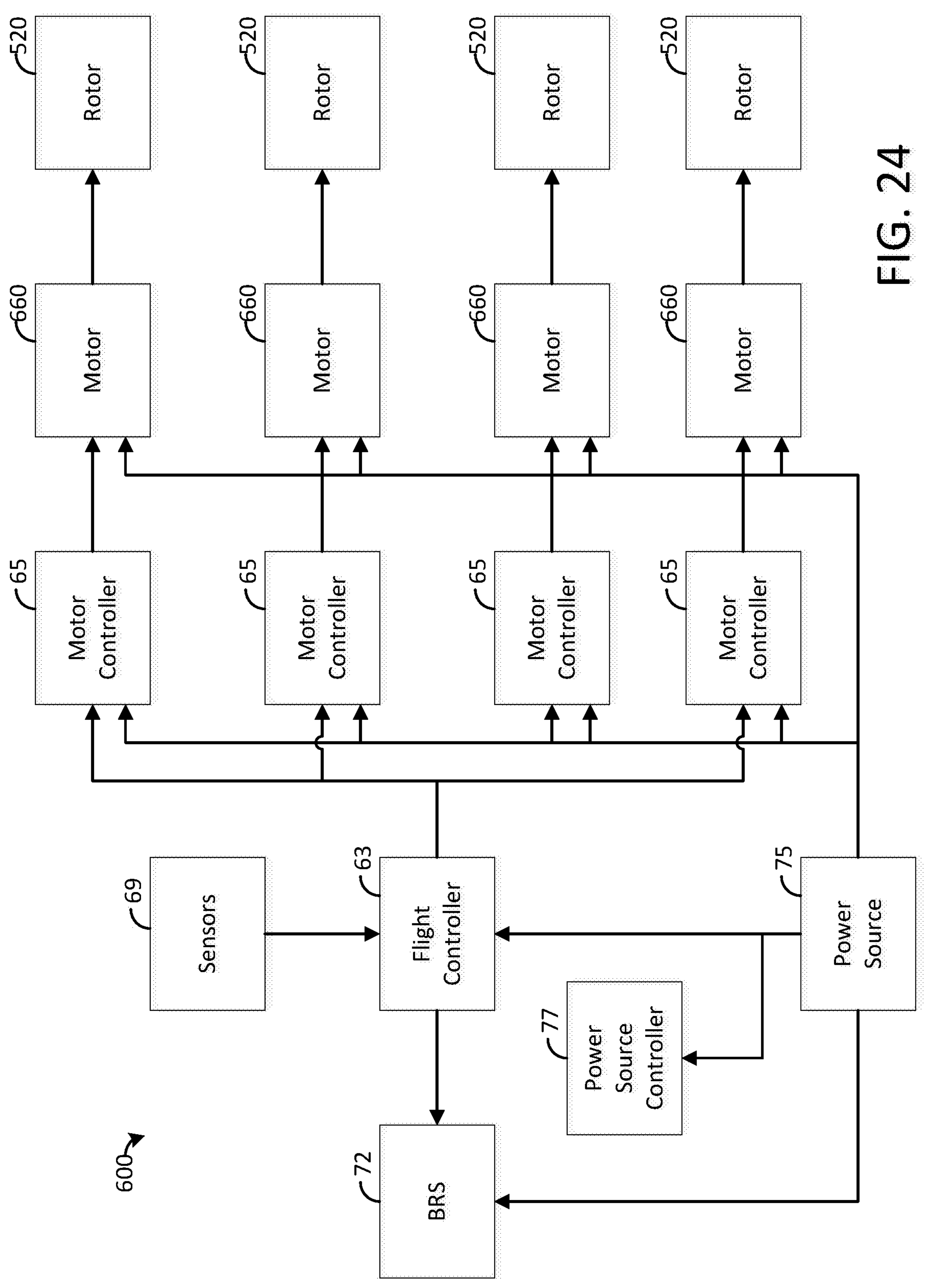
FIG. 24 is a block diagram illustrating an embodiment of a flight control system for controlling VTOL aircraft, such as depicted in FIG. 22.

The rotors 520 are driven by motors 660 that cause the rotors 520 to generate aerodynamic thrust to be used for generating lift and controlling powerplane pitch, roll, and yaw. In this regard, FIG. 24 shows an exemplary flight control system 600 of the aircraft 200 that can be used to control movement of the aircraft 200. In the embodiment depicted by FIG. 24, the system 600 comprises a flight controller 63 that is coupled to a plurality of motor controllers 65, which are configured to control motors 660 for driving the rotors 520. The flight controller 63 is also coupled to a plurality of sensors 69 that are configured to sense flight characteristics of the aircraft 200, such as horizontal airspeed, vertical airspeed, heading, powerplane attitude, and other flight characteristics that are typically used to control flight of conventional aircraft. The sensors 69 may also sense other parameters useful in controlling the aircraft 200, such as external objects for sensing and avoiding collision threats, temperature, etc.

The flight controller 63 is configured to control the general operation of the aircraft, including flight, as will be described in more detail below. As an example, the flight controller 63 may be configured to provide control inputs to the motor controllers 65 for controlling rotors 520 such that they generate thrust as appropriate for controlling the movement of the aircraft 200 in a desired manner. That is, the flight controller 63 instructs each motor controller 65 to operate its respective rotor 520 at a desired speed so that appropriate thrusts are generated for controlling the flight of the aircraft 200. As an example, the rotors 520 may be controlled to generate sufficient lift to counteract the weight of the aircraft 200 such that the aircraft 200 is flown to a desired altitude above ground. Further, differential thrusting of the rotors 520 may be used to control movement of the powerplane assembly 330 about the roll and pitch axes, as is known in the art for conventional multirotor VTOL aircraft, and also to provide horizontal movement of the aircraft 200 as may be desired. Further, differential torque from the rotors 520 may be used to control movement of the powerplane assembly 330 about the yaw axis, as is known in the art for conventional multirotor VTOL aircraft.

In addition, in some embodiments, as will be described in more detail below, the powerplane assembly 330 may be coupled to the fuselage 250 via a pivotal coupling 1520 (FIG. 31) that permits the powerplane assembly 330 to pivot about at least two axes (e.g., pitch and roll) relative to the fuselage 250. In such an embodiment, the differential thrusting used to rotate the powerplane assembly 330 about the pitch and roll axes does not cause corresponding movement of the fuselage 250. That is, in some embodiments for which the pivotal coupling 1520 couples the powerplane assembly 330 to the fuselage 250, the powerplane assembly 330 pitches and rolls independently of the fuselage 250. However, the powerplane assembly 330 may be indexed to the fuselage 250 such that the powerplane assembly 330 and fuselage 250 rotate together about the yaw axis. An exemplary pivotal coupling 1520 for achieving this effect will be described in more detail below with reference to FIG. 31. However, it should be noted that use of such a pivotal coupling 1520 is unnecessary, and other types of couplings are possible in other embodiments.

The flight controller 63 is further coupled to a power source 75, which may include one or more batteries for powering the electrical motors and components of the aircraft 200, and a ballistic recovery system (BRS) 72. The power source 75 is also coupled to a power source controller 77, which is configured to monitor power source for charge status, battery health, battery temperature, etc. Power source controller 77 is also configured to control the charging and discharging of the power source 75. For example, as discussed below with respect to FIG. 25, the power source controller 77 can be configured to communicate with a docking station controller 902 of a VTOL docking station 900 in order to control the charging characteristics of the power source 75 when the aircraft 200 (described below with respect to FIGS. 22-30) docks on the VTOL docking station 900.

Returning to FIG. 24, the flight controller 63 and the power source controller 77 may be implemented in hardware or a combination of hardware with software and/or firmware. As an example, the flight controller 63 and the power source controller 77 may be implemented with hardware gate logic, such as a field programmable gate array (FPGA), or with application-specific integrated circuits (ASICs). In some embodiments, the flight controller 63 and/or the power source controller 77 each comprise at least one processor, such as a digital signal processor (DSP) or a central processor unit (CPU), that is configured to execute software and/or firmware for performing the functions described herein. In other embodiments, other types of controllers 63 and/or power source controllers 77 may be used.

In some embodiments, the motors 660 are electrical and draw electrical power from the power source 75 during operation. The motors 660 may operate under the control of one or more motor controllers 65 to control the speeds of the rotors 520 as instructed by the flight controller 63. In some embodiments, the aircraft 200 is autonomous, and the flight controller 63 controls flight of the vehicle 200, including both navigation and aviation, without the use of or inputs from a pilot. However, in other embodiments, a pilot onboard the aircraft 200 may provide control inputs for controlling flight. Such inputs may be received by the flight controller 63, which interprets such inputs to provide appropriate control signals to the motor controllers 650. If desired, such inputs may be received from a remote pilot via wireless communication. Yet other techniques and configurations for controlling the flight of the aircraft 200 are possible in other embodiments. It is also possible to drive the rotors 520 with other types of motors.

The powerpack assembly 320 (FIG. 22) houses the power source 75 (FIG. 24) and motor controllers 65, similar to FIGS. 8A and 8B with respect to powerpack assembly 32. As discussed with respect to powerpack assembly 32, in one embodiment, the power source 75 of powerpack assembly 320 comprises a plurality of battery packs 80 that are positioned just below the motor controllers 65, as shown by FIGS. 8B and 8C. In other embodiments, other types of power sources 75 may be used, and the relative positions of the battery packs 80 and the motor controllers 65 may be different. In some embodiments, as depicted with respect to powerpack assembly 32 in FIGS. 8A, 8B, 8C, and 22, the powerpack assembly 320 may be located below the powerplane assembly 330, including the motors 660 and rotors 520. By locating the battery packs 80 and motor controllers 65 just below the powerplane assembly 330, the lengths of electrical wiring between the battery packs 80, motor controllers 65, and rotor motors 660 can be kept relatively short, thereby helping to minimize the electrical resistance and weight of such wiring. Additionally, locating the battery packs 80 and motor controllers 65 just below the powerplane assembly 330 helps maintain cabin verticality during lateral acceleration, as is illustrated in FIGS. 35A-D. In some embodiments, the modular powerpack assembly 320, which comprises the battery packs 80, the motor controllers 65, and the flight controller 63, can be removed from the fuselage 250 and replaced with a new powerpack assembly 320.

In one embodiment, the powerpack assembly 320 for aircraft 200 comprises 1012 battery cells providing a total power of approximately 99 kilowatt hours (kWh), although other numbers of cells and amounts of available power are possible. These cells can be arranged in several interconnected battery packs 80 where each pack 80 comprises a plurality of cells. Similar to the embodiment shown by FIG. 8C, the battery packs 80 can be arranged into two vertically-stacked towers 79 within powerpack assembly 320. The battery packs 80 may be stacked in other arrangements, and other numbers of battery pack towers 79 may be used in other embodiments.

In some embodiments, each battery pack tower 79 is electrically connected to each motor 660 for driving the rotors 520 so that each motor 660 may receive power from either or both of the towers 79. In addition, each battery pack tower 79 is able to generate sufficient power to drive simultaneously all of the motors 660 without power from the other tower 79, if desired. Thus, in the event of an operational problem with one of the towers 79, the other tower 79 may provide sufficient power for all of the motors 660 for at least enough time for the aircraft 200 to continue to the destination or perform an emergency landing. However, in other embodiments, other types and arrangements of batteries may be used.

As shown by FIG. 22, an intake duct 820 is located in the powerpack assembly 320 of the fuselage 250 to receive cooling air from the rotors 520. The air travels from this intake duct 820 through the powerpack assembly 320 and exits the powerpack assembly 320 via an outlet duct 850 that is located on an opposite side of the fuselage 250 relative to the intake duct 820. The outlet duct 850 may be fed by a cooling fan, creating negative pressure within the powerpack assembly 320 to aid the intake flow. As the air is passing through the powerpack assembly 320, it absorbs heat from the battery packs 80 and other electronics, and then is expelled through the outlet duct 850, thereby ensuring the electronic equipment is maintained at its designed operating temperature.

In some embodiments, the powerpack assembly 320 can be cooled via liquid cooling. For example, the fuselage 250 can be equipped with a heat exchanger (not shown) filled with a cooling liquid that circulates the cooling liquid through liquid channels disposed within the powerpack assembly 320. In such embodiments, air traveling from the intake duct 820 can pass through the heat exchanger and out of the fuselage 250 via outlet duct 850. As the cooling liquid circulates through powerpack assembly 320, heat is drawn into the cooling liquid and is subsequently dispersed into the surrounding environment as the cooling liquid passes through the heat exchanger, in which the cooling liquid is cooled by the air traveling between intake duct 820 and outlet duct 850. In some embodiments, the heat exchanger may additionally be equipped with a fan in order to increase the rate of heat exchange between the cooling liquid within the heat exchanger and the air of the surrounding environment, for example during charging of battery pack 80.

In the event of a fire in the powerpack assembly 320, the vertical orientation of the fuselage 250 ensures that the passenger cabin 310 is well positioned below the smoke, heat or flame that may rise from such a fire. Additionally, the passenger cabin 310 is separated from the battery packs 80 by two bulkheads, each of which may be designed according to applicable aviation fire-resistance regulations, in order to ensure that the aircraft 200 reaches the ground and the passenger safely exits before the fire is able to penetrate the cabin 310. For example, from an altitude of 500 feet above ground level (AGL) with a BRS descent rate of 10 fps, the fire-resistant bulkhead system would need to remain intact for at least 50 seconds, well within the capabilities of modern fire-resistant materials.

Figure 23:
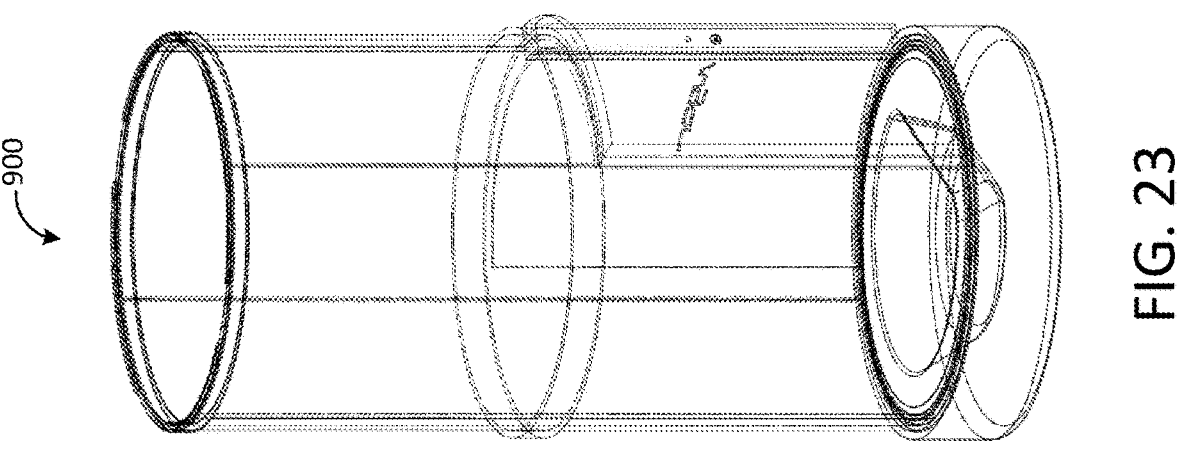
FIG. 23 depicts a perspective view of an embodiment of a VTOL docking station.
Figure 25:
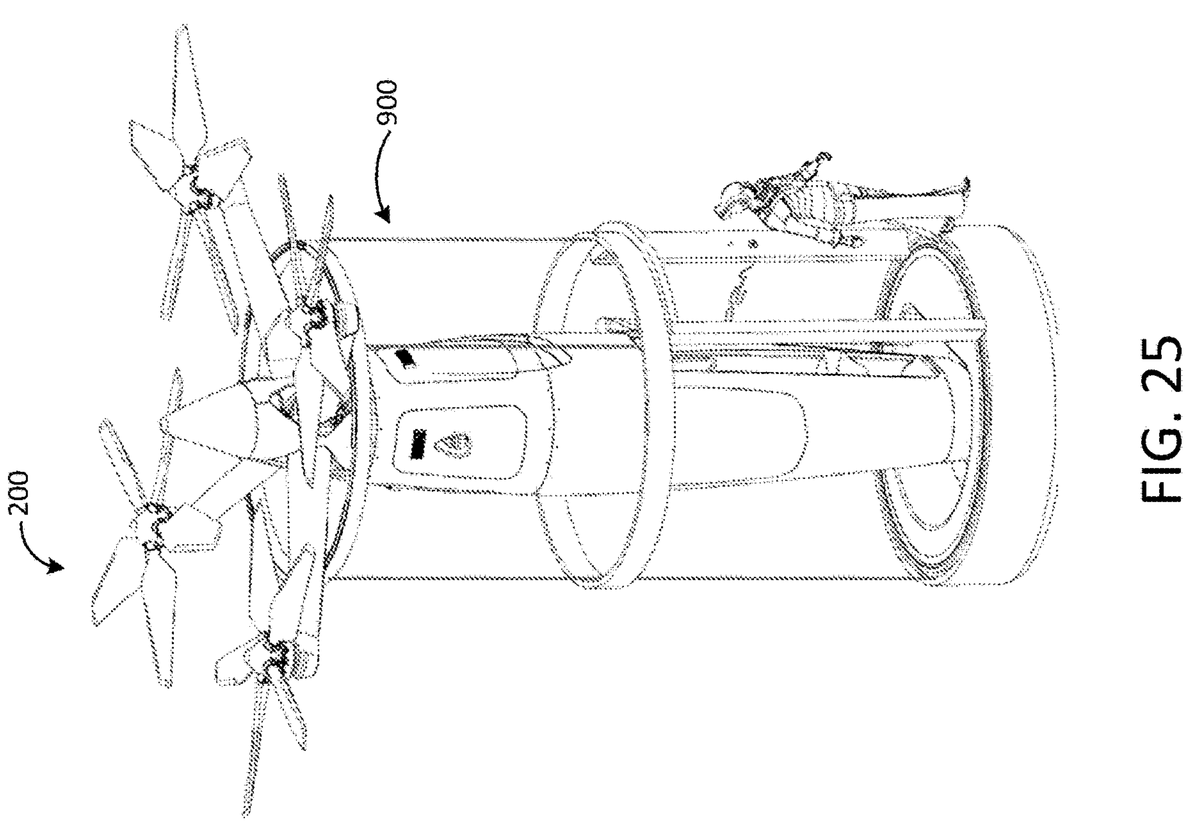
FIG. 25 depicts a perspective view of a VTOL aircraft docked at a VTOL docking station, such as depicted by FIGS. 22-23.

Notably, aircraft 200 shown in FIG. 22 lacks landing gear. Instead of utilizing landing gear as was discussed with respect to aircraft 20, aircraft 200 is configured to dock with a respective VTOL docking station 900. An exemplary VTOL docking station 900 is shown in FIG. 23. Turning to FIG. 25, aircraft 200 is synergistically designed to dock with VTOL docking station 900 by resting the lower surface of each structural boom 510 on the upper rim of VTOL docking station 900, effectively suspending the aircraft 200 from its booms 510 and the frame 906 of the VTOL docking station 900. However, it should be noted that in some embodiments, aircraft 200 can be configured to operate without use of a VTOL docking station 900, and may hover near the ground to allow passengers to board and deboard the aircraft 200 without requiring the aircraft 200 to dock with a docking station 900, as will be described further with respect to FIG. 34.

Figure 26:
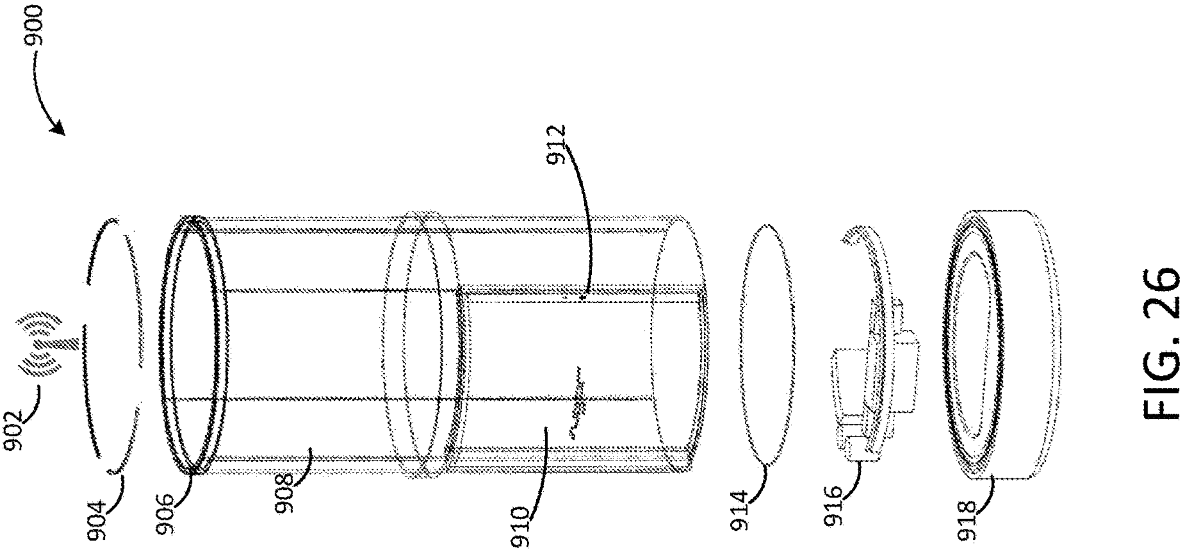
FIG. 26 depicts an exploded view of the VTOL docking station, such as depicted by FIG. 23.

FIG. 26 is an exploded view of VTOL docking station 900 showing the primary components including the base 918, a barrier 908, a structural frame 906, an automatic door 910, a door open and close mechanism (not shown), an access control system 912, electrical charging components 916, electrical contact strips 904, a controller 902, and lighting components 914 as desired for nighttime visibility, safety, aesthetics, or visually communicating system status of the VTOL docking station 900. The VTOL docking station 900 is self-enclosed and fully autonomous, and provides a secure take-off and landing zone for aircraft 200 while also providing pedestrian protection, a small footprint for minimal site impact, and a fixed, defined take-off and landing location to assist autonomous vehicle navigation. Additional benefits of the VTOL docking station 900 include: a prefabricated construction to enable mass production cost savings; minimal site preparation and installation labor requirements; multi-jurisdictional regulatory code compliance; construction of high-grade industrial materials; well suited to wide distribution and rapid scaling of commercial operations; all weather, all season operation, safe harbor for aircraft 200 during storms; autonomous charging of aircraft 200; and suitability for both indoor and outdoor installation.

A plurality of VTOL docking stations 900 are configured to be conveniently placed throughout the environment in which aircraft 200 operates, and passengers may select from a range of journeys depending on their desired VTOL docking station 900 departure and destination locations.

In some embodiments, the VTOL docking station 900 may be configured to have an approximately cylindrical shape roughly corresponding to the generally circular cross-section of aircraft 200's fuselage 250, although in other embodiments, other shapes of VTOL docking station 900 are envisioned.

The base 918 of VTOL docking station 900 is a self-contained, hollow structural container made of metal, fiber-reinforced composite, or other suitable material with integrated mounting points for the structural frame 906 and barrier 908. The base 918 also provides a protective housing and mounting points for the VTOL docking station 900 subcomponents including the electrical charging components 916, control and navigation support elements, the automatic door mechanisms for opening, closing, and locking, and the precision track upon which the door is configured to slide during operation.

In the example embodiment of base 918 shown in FIG. 25 and FIG. 26, the base 918 may be installed outdoors in a prepared hole in the ground, or indoors in a prepared opening in the floor, in such a way that the flat, upper surface of base 918 (e.g., the automatic door 910 entryway floor) is at roughly the same elevation as the surrounding ground or floor. Additionally, the upper surface of base 918 contains a recess for the bottom of cabin 310, so that when aircraft 200 is docked (hanging at rest) in VTOL docking station 900, the aircraft cabin floor 380 is approximately the same elevation as the flat, upper surface of base 918 (entryway floor) and the surrounding ground or floor.

VTOL docking station 900 frame 906 may be constructed out of any structurally appropriate and suitably rugged and durable material such as aluminum, steel, stainless steel, fiber-reinforced composite, and/or other materials or combinations thereof, bearing in mind that frame 906 is intended to support the combined aircraft and payload with an appropriate factor of safety. The VTOL docking station 900 additionally incudes a barrier 908 which surrounds the cabin 310 of aircraft 200 when aircraft 200 is docked within the VTOL docking station 900. The barrier 908 may be constructed of any suitable material; in the example embodiment depicted in FIG. 26, barrier 908 is constructed out of a transparent structural laminated glass material. In some embodiments, the VTOL docking station 900 may lack frame 906 and the barrier 908 can be configured to support the combined aircraft and payload with an appropriate factor of safety without the utilization of frame 906.

Access to and from the aircraft 200 is enabled by the automatic door 910 of VTOL docking station 900, which may include access control 912. Access control 912 may be configured to selectively provide access to the passenger requesting a ride from aircraft 200, and may be implemented using a variety of known methods. For example, access control may be implemented as an RFID device that is configured to open in response to an appropriate RFID signal received from a user device associated with the passenger. In other embodiments, access control 912 may be implemented as a smart lock that can communicate wirelessly with a user device associated with the passenger.

Access control 912 may be selectively tailored for arriving or departing passengers. For example, for a departing passenger access control 912 may prevent the automatic door 910 of the VTOL docking station 900 from opening until a charging cycle is complete and the vehicle has passed self-check and communicated flight readiness to the VTOL docking station controller 902. After departing passenger boarding, access control 912 may be configured to close and lock aircraft cabin door 410 and VTOL docking station automatic door 910 in preparation for initiating aircraft 200 take-off procedures.

For an arriving passenger, access control 912 may provide an enhanced level of safety by preventing the aircraft cabin door 410 and VTOL docking station automatic door 910 from opening until access control 912 receives an indication from the aircraft 200 (e.g., via communication between docking station controller 902 and flight controller 63) that the rotors 520 of aircraft 200 have reduced thrust and/or rotation speed to below a predetermined value, thereby preventing passenger de-boarding until rotor wash and flying debris from the spinning rotors has subsided.

Access control 912 may also prevent unauthorized access into an aircraft 200 that is docked with a VTOL docking station 900. For example, access control 912 may be configured to allow automatic door 910 to open only after receiving a command from a user device associated with a passenger scheduled to utilize aircraft 200, thereby preventing an unauthorized entry into aircraft 200 by another person who is not the scheduled passenger. Access control 912 can also prevent passengers and other persons from entering VTOL docking station 900 while no aircraft 200 is docked within, thereby ensuring an unobstructed landing area when an arriving aircraft 200 initiates a docking procedure. Many other access control 912 configurations may be implemented as desired in order to support safe and efficient operation of VTOL docking station 900.

The VTOL docking station controller may be configured to communicate with components of aircraft 200. The controller 902 may be implemented in hardware or a combination of hardware with software and/or firmware. As an example, the VTOL docking station controller 902 may be implemented with hardware gate logic, such as a field programmable gate array (FPGA), or with application-specific integrated circuits (ASICs). In some embodiments, the VTOL docking station controller 902 comprises at least one processor, such as a digital signal processor (DSP) or a central processor unit (CPU), that is configured to execute software and/or firmware for performing the functions described herein. In other embodiments, other types of controllers 902 may be used.

The VTOL docking station controller 902 may be configured to communicate with flight controller 63 of aircraft 200 to provide aircraft navigation support. While each VTOL docking station 900 has a fixed, known location and aircraft 200 uses autonomous navigation to follow predetermined flight paths between distributed VTOL docking stations 900 or other departure and destination points, precision landing of aircraft 200 in the VTOL docking station 900 may require enhanced, centimeter level positional accuracy. Therefore, VTOL docking station 900 may be equipped with a local-area navigation augmentation system to establish direct communication between VTOL docking station controller 902 and aircraft flight controller 63 as the aircraft 200 approaches the docking station 900, and to provide high precision positional information and navigational assistance to help guide aircraft 200 during its descent from hover into the VTOL docking station 900. It should be understood that base controller 902 is intended to represent the entire navigation augmentation capability of the VTOL docking station 900, which may encompass multiple transmitter or receiver units of various designs and operational frequencies, together with a range of hardware and software systems to provide high precision, all-weather, local-area navigation support during aircraft 200 take-off and landing.

In some embodiments, VTOL docking station 900 may be equipped with various cargo-centric features. For example, in some embodiments, aircraft 200 may be configured to carry cargo in place of passengers, and docking stations 900 can be modified with cargo-centric features such as automated loading and unloading systems to transfer cargo between aircraft 200 and an integrated, secure cargo hub locker (not shown). Yet other cargo-centric features of docking station 900 are envisioned.

Figures 27A, 27B:
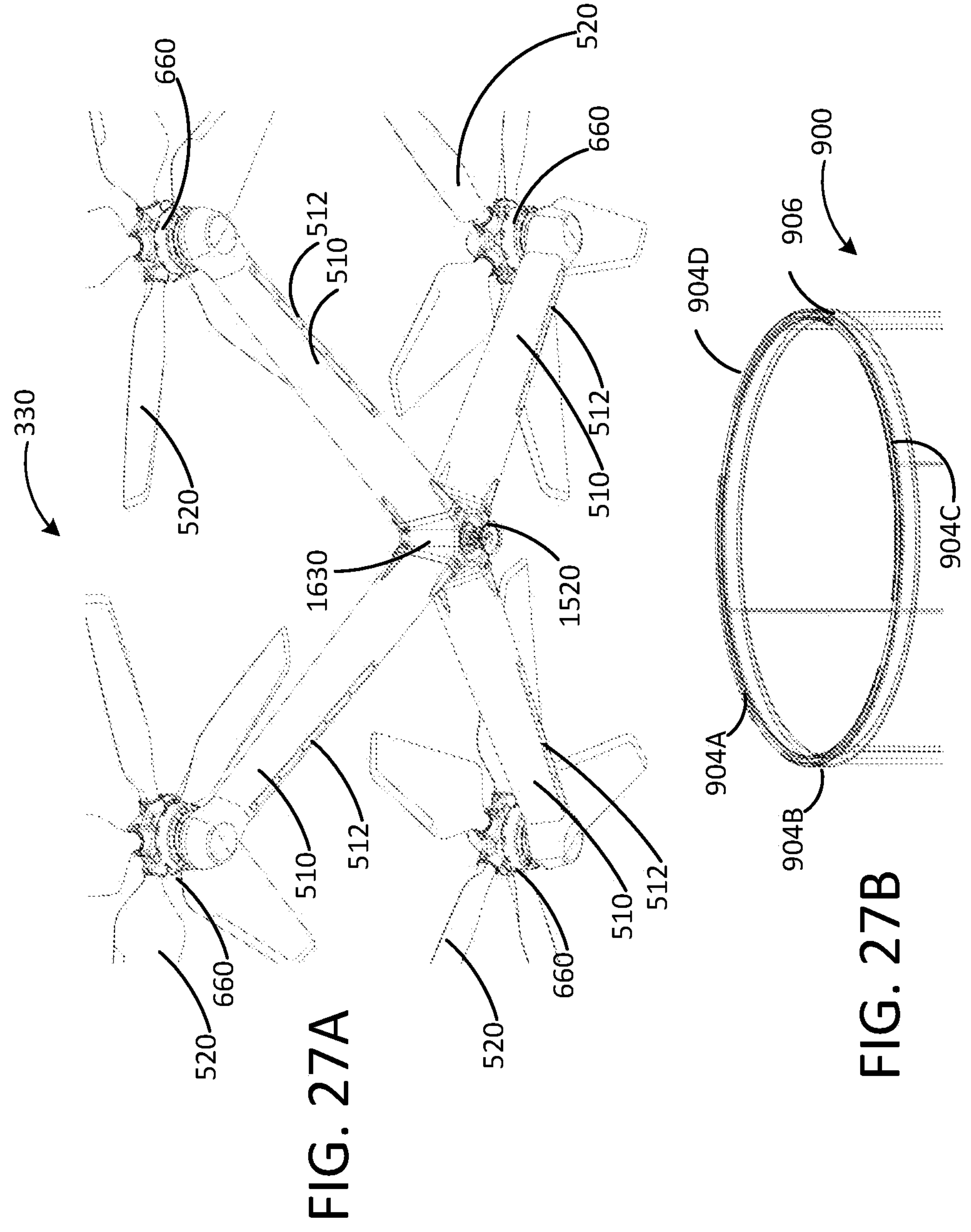
FIG. 27A depicts a powerplane assembly with electrical contact strips located on a lower surface of each boom.
FIG. 27B depicts an upper surface of the VTOL docking station including one or more electric contact strips for forming an electrical connection to a docked VTOL aircraft, such as depicted by FIG. 22.

The VTOL docking station 900 is equipped with an autonomous charging capability, so that docked aircraft 200 can be re-charged as necessary without human action. As shown in FIG. 26, the main electrical charging components 916 are located within the base 918 of VTOL docking station 900 and are controlled by VTOL docking station controller 902 to charge power source 75 of a docked aircraft 200. Also shown in FIG. 26 and FIG. 27B are VTOL docking station electrical contact strips 904, which are shown as curved in this embodiment, but may take any desired shape in other embodiments. The electrical contact strips 904 are positioned at the top of the VTOL docking station frame 906 and electrically coupled to the charging components 916 located in the base 918.

Turning now to the aircraft 200, FIG. 27A depicts powerplane assembly 330, including boom mount 1630, booms 510, and pivotable coupling 1520. Similar boom electrical contact strips 512 are mounted to the bottom of each boom 510. In the embodiment depicted in FIG. 27A, the boom electrical contact strips 512 are straight but can take on other shapes and dimensions in other embodiments as desired. It should also be understood that in some embodiments, each boom can include more than one boom electrical contact strips 512, as desired. The boom electrical contact strips 512 are electrically coupled to the power source 75 of aircraft 200 and are used to charge aircraft 200 when aircraft 200 is docked with VTOL docking station 900. Thus, each of the one or more VTOL docking station electrical contact strips 904 is configured to make contact with a respective boom electrical contact strip 512 when aircraft 200 docks with docking station 900. The respective contact strips and their mating surfaces may be appropriately designed to handle high current, which together with a point load clamping force sufficient to ensure that good electrical contact is made, may support Direct Current Fast charging of aircraft 200 power source 75.

Figure 27C:
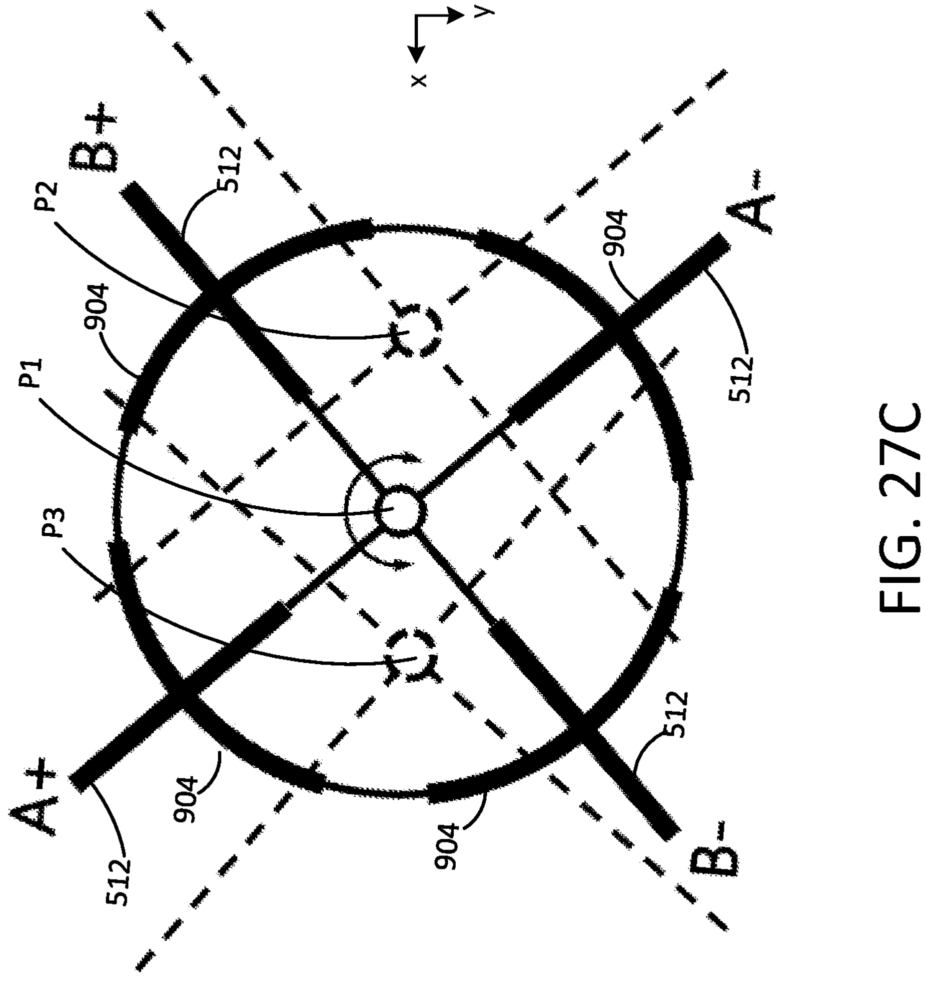
FIG. 27C is a diagram representing how electrical contact strips of a powerplane assembly can contact the one or more electric contact strips of a VTOL docking station with the VTOL aircraft in various docking positions.

Advantageously, this unique plugless charging solution comprised of crossed electrical contact strips effectively de-tolerances vehicle position, and as illustrated in FIG. 27C, the system can therefore accommodate charging of aircraft 200 in a wide range of vehicle x/y positions and z clocking angles within the VTOL docking station 900, without human action. As shown in this simplified plan view, the aircraft 200 can be positioned at point P1 within docking station 900 (approximating the center of docking station 900) and may also be shifted left or right along the x direction to points P2 and P3 without losing electrical connectivity between boom electrical contact strips 512 and the one or more electrical docking station electrical contact strips 904. Similarly, aircraft 200 may also be shifted along the y direction in a similar manner as described with respect to P2 and P3, or rotated about its Z axis as shown for P1, or multiple combinations of X and Y displacement, with or without Z rotation, without losing electrical connectivity between boom electrical contact strips 512 and the one or more docking station electrical contact strips 904. According to some embodiments, each of the one or more docking station electrical contact strips 904 can extend in an arc angle of up to approximately 60 degrees. In other embodiments, docking station electrical contact strips 904 can extend in other arc angles as desired.

In some embodiments, the number of docking station electrical contact strips 904 matches the number of booms of aircraft 200. For example, in the embodiment disclosed in FIG. 27B there are four docking station electrical contact strips 904A-904D that each extend over an approximate 60-degree arc, and in FIG. 27A there are four matching boom electrical contact strips 512. In other aircraft 200 and VTOL docking station 900 embodiments, there may be other numbers of booms 510, boom electrical contact strips 512, and docking station electrical contact strips 904, and the number of electrical contact strips between the boom and docking station need not match.

As previously mentioned, the VTOL docking station controller 902 may be configured to communicate with components of aircraft 200 including power source controller 77 of aircraft 200 in order to control aspects of charging the aircraft power source 75. For example, docking station controller 902 may communicate with power source controller 77 to receive power source data that includes charge status of the power source 75, temperature of the power source 75, battery health of power source 75, or many other parameters. Data received from power source controller 77 allows docking station controller 902 and the charging algorithm to control the electrical charging components 916 so as to safely and optimally charge the power source 75 while the aircraft 200 is docked with the VTOL docking station 900. In some embodiments, communication between docking station controller 902 and power source controller 77 may be enabled wirelessly, and in other embodiments communication may be achieved by means of an optical or physical connection.

In some embodiments, parallel charging of multiple power sources 75 (e.g., multiple battery packs) is possible. In some embodiments, aircraft 200 is not charged after every flight. For example, if the power source controller 77 determines that the power source 75 is beyond a threshold of charge (e.g., 80% capacity), power source controller 77 can instruct docking station controller 902 to not provide charge to the power source 75. This can be advantageous, for example, to maximize battery longevity by avoiding unnecessary charge/discharge cycles of power source 75.

FIG. 28 depicts a structural boom 510 of aircraft 200 depicted in FIG. 22. The structural booms of aircraft 20 and 200 are essentially cantilevered beams with an end mass consisting of motors 66 and 660 and rotor assemblies 52 and 520 assembly, respectively, and as such are structural members designed to resist lateral loads acting transversely to the beam axis. Boom 510 features a mechanically efficient thin wall composite laminate with a non-uniform diamond profile that offers improved stiffness (resistance to bending), a higher natural vibration frequency (first harmonic) with reduced amplitude, and improved aeroacoustics over boom 51 of aircraft 20. Other materials or construction methods are possible, including traditional aluminum construction common in the aerospace industry, with varying benefit.

Figures 28A, 28B, 28C:
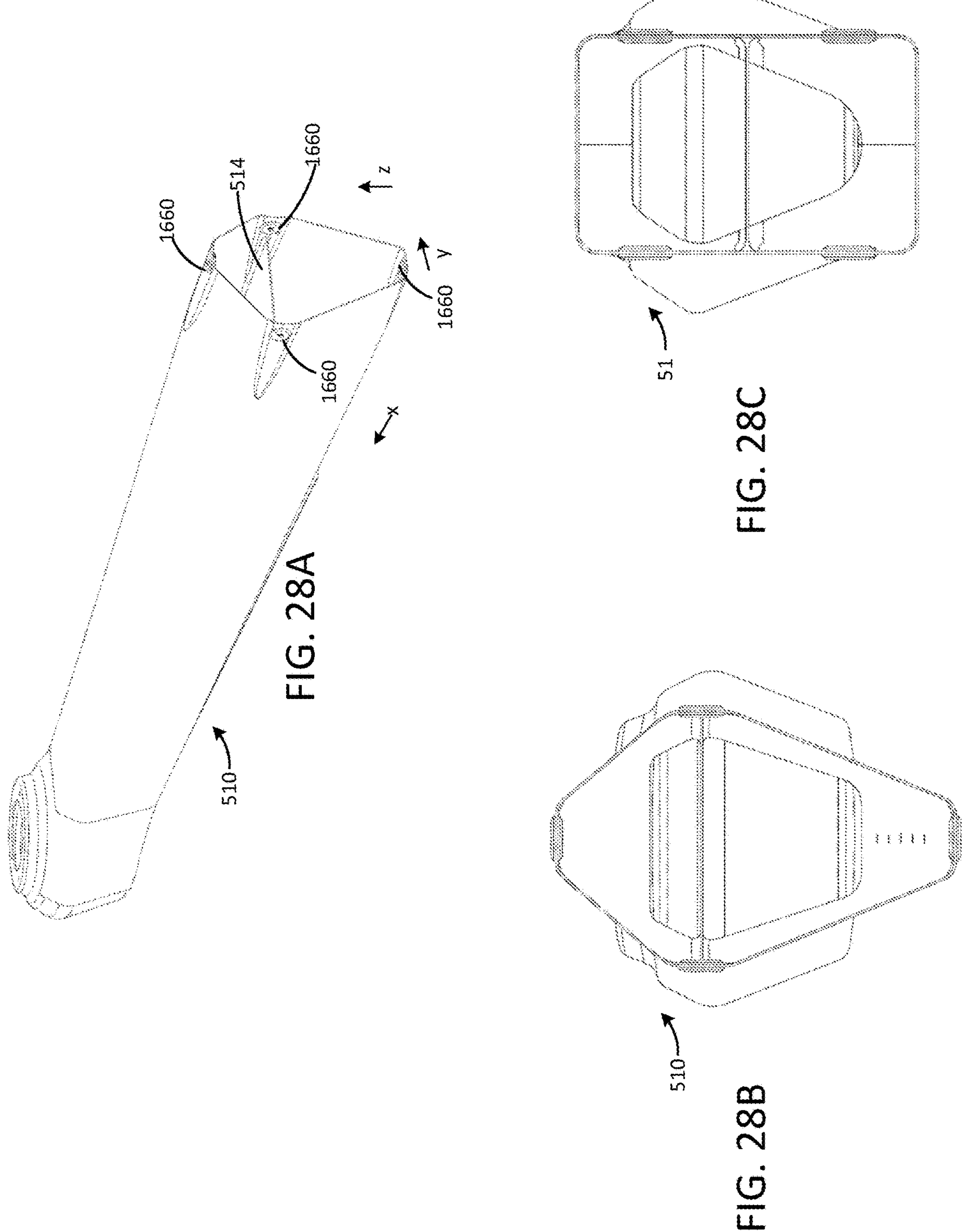
FIG. 28A depicts a boom of a VTOL aircraft, such as depicted by FIG. 22.
FIG. 28B depicts a profile perspective of a boom, such as depicted by FIG. 28.
FIG. 28C depicts a profile perspective of a boom, such as depicted by FIG. 21.

Notably, boom 510 has an approximately diamond shape profile as compared to the rectangular profile of boom 51 as can be seen in FIGS. 28B-28C. The diamond profile provides enhanced mechanical efficiency by placing the primary vertical and lateral bending load paths as far as possible from the neutral axis of the beam, maximizing the area moment of inertia for improved mechanical efficiency. Additionally, boom 510 connects to boom mount 1630 by means of fasteners (not shown) thru load-bearing inserts 1660 which are placed directly in-line with the vertical and lateral bending load paths at the 'points' of the approximately diamond profile, significantly increasing fastener reaction mechanical efficiency compared with boom 51. Further, the approximately diamond profile of boom 510 is taller than the rectangular profile of boom 51, and because the load-bearing inserts 1660 are spaced at the diamond profile extremities rather than along the rectangular sidewalls as in boom 51, the distance between the upper and lower fasteners of boom 510 is considerably greater than boom 51, providing improved leverage to react the primary vertical bending moment of boom 510 compared with the more closely spaced fasteners and more circuitous reaction load path of boom 51.

Additionally, the approximately diamond profile of boom 510 is non-uniform: the cross-sectional height and width dimensions diminish along the boom 'X' axis shown in FIG. 28A, from the boom mount end to the rotor end, producing a double taper effect (e.g., along the illustrated y and z axes).

Tapered cantilevered beams are well known to those with skill in the art for their high-stiffness-to-mass ratio and reduced bending moment and deflection compared with constant profile cantilevered beams. Finally, the approximately diamond profile of boom 510 may reduce undesirable acoustic effects by minimizing and disbursing reflections of the high-pressure wave below the passing rotor blade. As shown in FIG. 28, boom 510 may include a reinforcement web 514 to improve lateral stability of the boom. Reinforcement web 514 may extend from the boom mount end of boom 510 to the rotor end of boom 510 and may extend along the width of boom 510 along the illustrated 'Y' axis. As shown, reinforcement web 514 can connect respective load-bearing inserts 1660 of a boom to provide increased lateral stability of each boom 510. Boom 510 embodiments constructed as composite laminates may have load-bearing inserts 1660 which are co-molded during lamination or mounted as a post-cure secondary operation.

Figure 29:
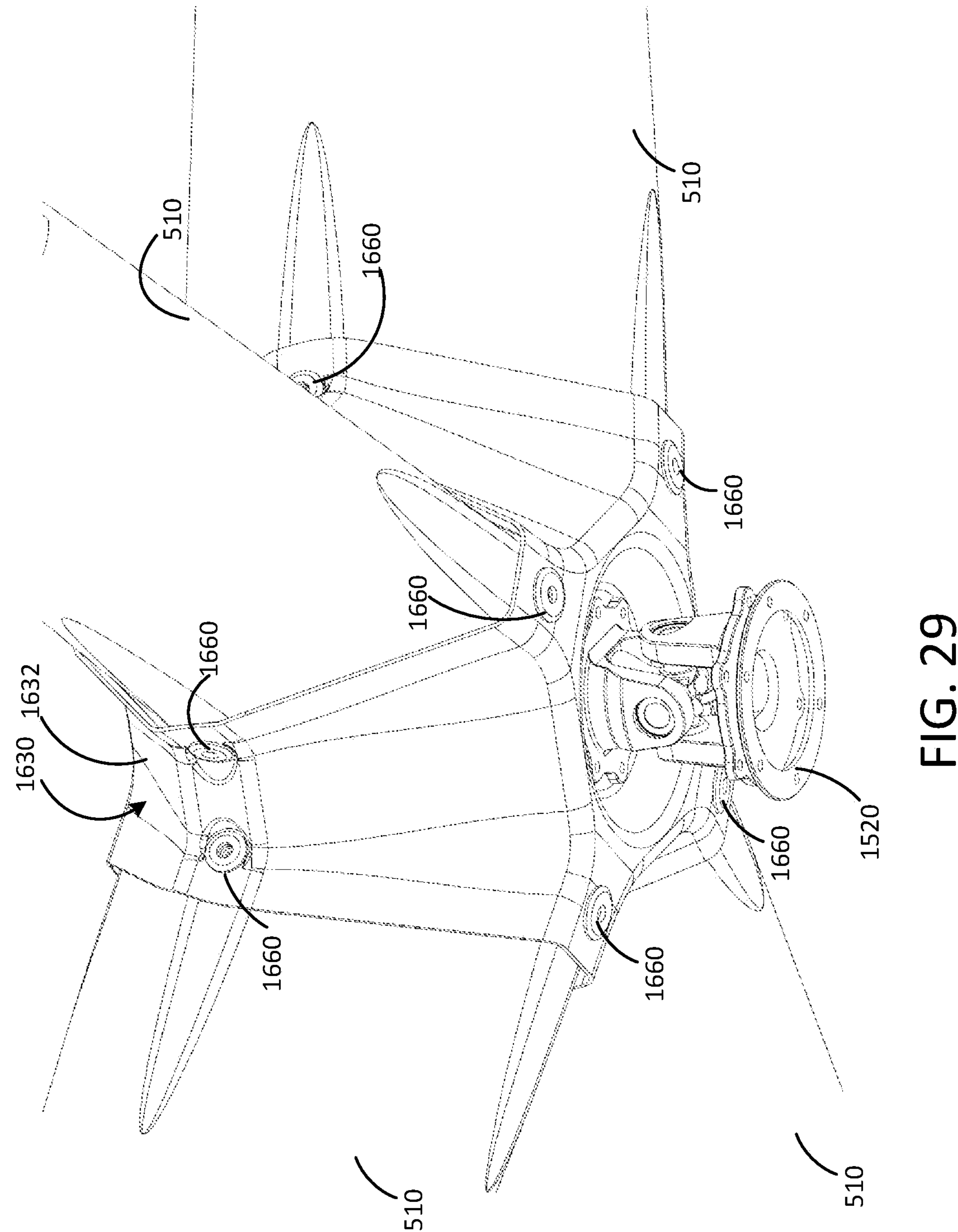
FIG. 29 depicts a perspective view of a boom mount exoskeleton that connects a powerplane assembly to a power module of the VTOL aircraft, such as depicted by FIG. 22.
Figure 30:
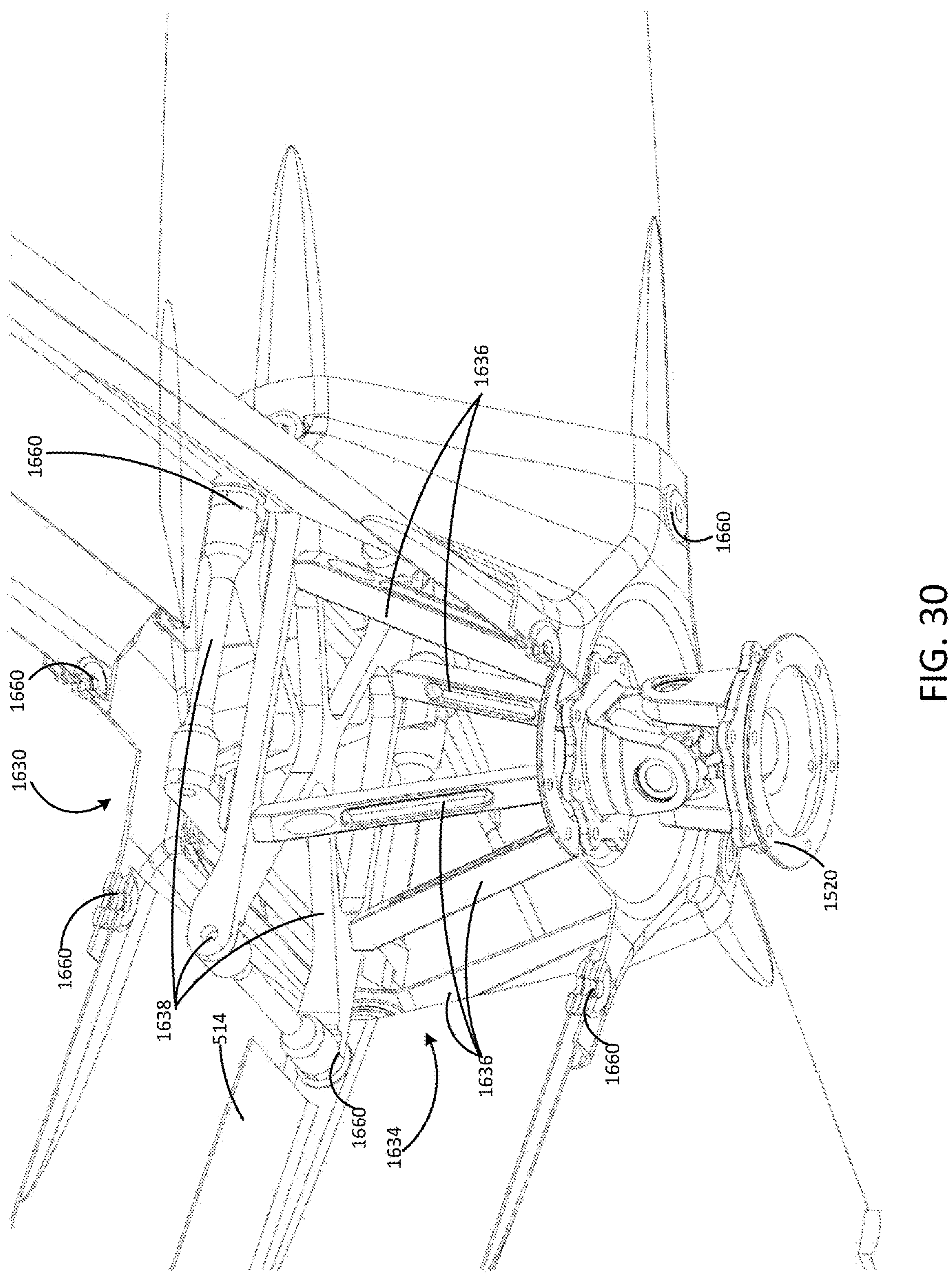
FIG. 30 depicts a perspective view of a boom mount endoskeleton that connects a powerplane assembly to a power module of the VTOL aircraft, such as depicted by FIG. 22.

FIG. 29 depicts a perspective view of boom mount 1630. In contrast with boom mount 163, boom mount 1630 is designed so that the mounting end of boom 510 slides into a respective opening in the boom mount structure, rather than over the boom mount structure as with boom mount 163. Boom mount 1630 also differs from boom mount 163 in that it consists of both an external element (exoskeleton shell 1632) and an internal element (endoskeleton assembly 1634). In the exemplary embodiment shown in FIG. 29 and FIG. 30, the exoskeleton shell 1632 is a reinforced composite laminate monocoque and the endoskeleton assembly 1634 is a collection of machined metal components, but other exoskeleton and endoskeleton materials and mechanical solutions are possible. As shown in FIG. 30, when a boom 510 is mounted to a respective opening in the boom mount 1630, fasteners (not shown) pass thru the load-bearing inserts 1660 in the boom 510 mounting end and into the endoskeleton lateral members 1638, providing an exemplary mechanical joint and a rigid powerplane structure.

Notably, endoskeleton lateral members 1638 directly connect the side fasteners of opposing booms with the shortest line of tension, while the exoskeleton shell 1632 directly connects opposing top and bottom boom fasteners, effectively joining two opposing booms into a continuous, single beam element. Similarly, the short, direct line of tension in the exoskeleton shell 1632 between adjacent boom 510 side fasteners and load-bearing inserts 1660, in combination with the stabilizing effect of endoskeleton lateral members 1638, more effectively restrains lateral movement of the cantilevered booms than boom mount 163. Other boom mount 1630 structural solutions which don't use an exoskeleton or endoskeleton are possible, including tubular spaceframe weldments and 3D printed generative design frameworks. For example, in some embodiments, boom mount 1630 can be implemented as a 3D printed frame in which the mechanical functions of the exoskeleton shell 1632 and endoskeleton assembly 1634 are combined in a unitary structure.

Figure 31:
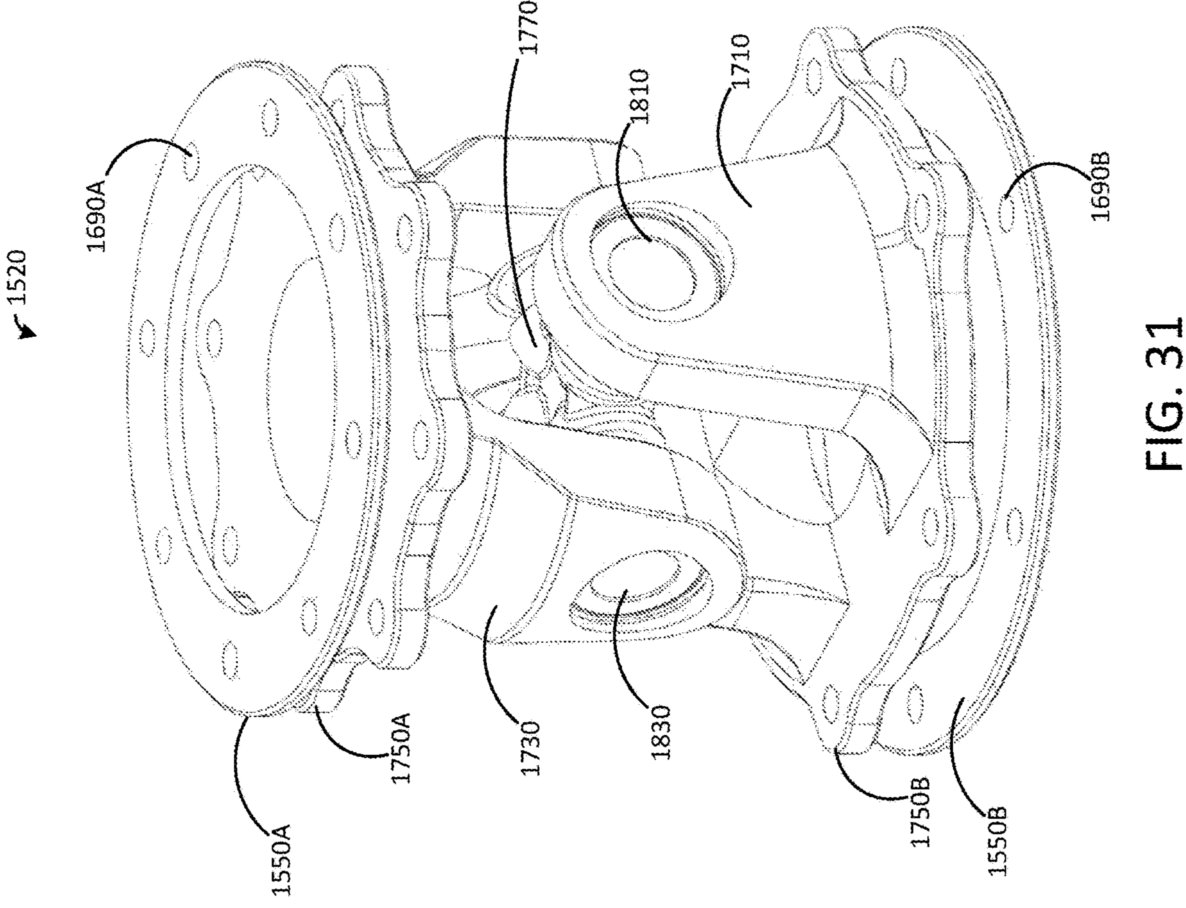
FIG. 31 depicts an embodiment of a pivotal coupling, such as depicted by FIGS. 29-30.

FIGS. 29 and 30 show an exemplary pivotal coupling 1520 mounted to the bottom of boom mount 1630. Functionally similar to pivotal coupling 152, pivotal coupling 1520 extends from the bottom of boom mount 1630 and connects the powerplane assembly 330 with fuselage 250 of aircraft 200 by means of a biaxial pivot that permits the powerplane assembly 330 to pivot about the pitch and roll axes of aircraft 200. In appearance, pivotal coupling 1520 is broadly similar to a common driveshaft universal joint assembly, and similarly consists of two yokes joined by a cross, but pivotal coupling 1520 is mechanically optimized for the unique requirements of use in aircraft 200 including tensile strength and angular misalignment capability, rather than optimizing for torque transmission as is common with a driveshaft universal joint. Compared with pivotal coupling 152, pivotal coupling 1520 is more compact, has a more direct load path with less deflection, and is easier to manufacture with less touch labor. FIG. 31 depicts a perspective view of pivotal coupling 1520, showing the upper yoke 1730 and its backing plate 1550A, the one-piece bearing cross 1770, and the lower yoke 1710 and its backing plate 1550B. As shown in FIG. 30, the upper yoke flange 1750A and its backing plate 1550A sandwich the bottom of the boom mount exoskeleton shell 1632, secured with a ring of fasteners (not shown) to form a rigid coupling. Further, four of the upper yoke flange 1750A mounting fasteners connect the yoke directly to endoskeleton lateral members 1638 by means of endoskeleton vertical members 1636, helping to transfer the fuselage 250 load to the booms 510 while also helping to vertically stiffen boom mount 1630. Likewise, the lower yoke flange 1750B and its backing plate 1550B sandwich the upper bulkhead of the powerpack assembly 320, again secured by a ring of fasteners to form a rigid coupling. Other mounting solutions appropriate for other airframe and boom mount structures such as tubular spaceframes are possible.

By this means, pivotal coupling 1520 shown in FIG. 31 functions as a biaxial connector that permits the powerplane assembly 330 to partially rotate (pivot) separately or simultaneously around the axes of pivot pin 1810 and pivot pin 1830, thereby enabling the powerplane assembly 330 to pitch and roll, separately or simultaneously, with respect to aircraft fuselage 250 as required for vehicle navigation and control, while the powerplane and aircraft fuselage remain locked together around the yaw axis and while the aircraft fuselage 250 remains in its primary horizontal or vertical orientation (depending on vehicle configuration). In other words, as previously described, differential rotor thrusting may be used to pitch the powerplane assembly 330 forward (nose down) or backward (nose up), or to roll the powerplane assembly 330 left or right, and to make these pitch and roll movements either independently or simultaneously with each other in any combination, all without the use of mechanical actuators (pneumatic, hydraulic or electric), and all while the pivoting powerplane 330 remains indexed relative to the fuselage 250 along the yaw axis and while the aircraft fuselage 250 remains in its primary horizontal or vertical orientation. Further, differential rotor torque inputs can be used to rotate the entire aircraft 200 about its yaw axis as desired.

In other embodiments, other types of biaxial or non-biaxial couplings may be used to pivotally connect the powerplane assembly 330 to the fuselage 250, including a wide range of mechanical couplings such as spherical bearings and hinges, or compliant, flexible couplings such as wire rope, webbing or reinforced rubber. Yet other types of couplings are possible in other embodiments to connect the powerplane assembly 330 to the fuselage 250 while permitting relative movement of the powerplane assembly 330 with respect to the fuselage 250 about one or more axes (e.g., the pitch and roll axes).

During operation, the flight controller 63 (FIG. 24) is configured to receive input from the sensors 69 (FIG. 24) and to control flight of the aircraft 200 based on the sensor inputs. As an example, the sensors 69 may indicate aircraft attitude and movement (e.g., airspeed), and the flight controller 63 may provide control signals to the motor controllers 65 for controlling the rotors 520 to generate the appropriate thrust for achieving a desired attitude of the powerplane assembly 330 and movement of the aircraft 200. At least some sensors 69 (e.g., a GPS sensor) may be used to sense the location of the aircraft 200, and the flight controller 63 may control movement of the aircraft 200 in order to navigate the aircraft 200 to a desired destination. At least some sensors 69, such as radar or LIDAR, may be used to sense objects external to the aircraft 200, and the flight controller 63 may use information from these types of sensors to sense and avoid collision threats.

Based on the input from the sensors 69, the thrusts generated by the rotors 520 are controlled to move the aircraft 200 as desired to a destination. As an example, thrust may be increased to lift the aircraft 200 off the ground. After taking off, differential thrusting may be used to control the direction of flight and attitude of the powerplane assembly 330. Thrusting may also be used to control the ascent and descent of the aircraft 200 as may be desired. As the attitude of the powerplane assembly 330 is changing about the pitch axis and roll axis, the fuselage 250 hangs from the pivotal coupling 1520 and maintains a vertical orientation due to gravity, independent of the movements of the powerplane assembly 330.

Figure 34:
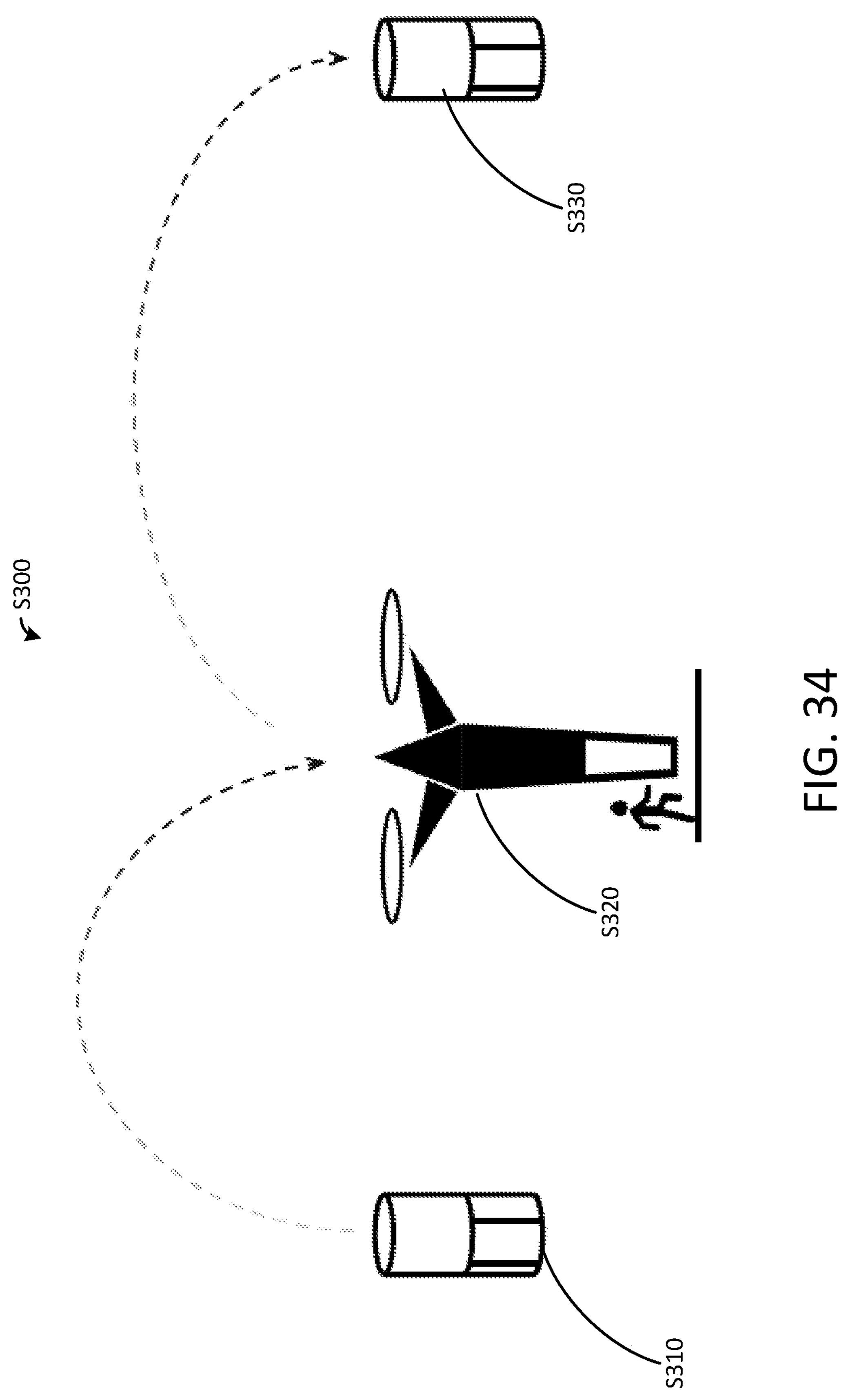
FIG. 34 illustrates yet another exemplary use of a VTOL aircraft system, according to aspects of the present disclosure.

Once the aircraft 200 reaches its destination, the flight controller 63 controls the rotors 520 so that the aircraft 200 gently lands on the docking station 900 or, in some embodiments, hovers just above ground level (FIG. 34). If an emergency condition is detected during the flight, such as a detection of a fire or failure of a critical component (e.g., one or more motors 660), the flight controller 63 may be configured to actuate the BRS 72 in order to deploy a parachute that allows the aircraft 200 to slowly and safely return to the ground. In other embodiments, other techniques and/or recovery systems for handling an emergency condition are possible, such as the flight controller 63 activating a secondary motor system to provide functionality in place of a failed motor 660.

EXAMPLE USES

As described herein, electrically powered vertical takeoff and landing (VTOL) aircraft feature the ability to take-off and land without a runway, and may have other capabilities well suited for operations in traditionally restricted urban areas.

Take-off and landing activities are an important component of safe VTOL operation in urban areas, and involve a variety of logistical considerations such as pedestrian and passenger safeguarding, obstacle-free airspace, vehicle maneuvering, vehicle noise, vehicle downwash, the local micro-climate and wind environment, etc. as well as commercial considerations such as site location, customer access, service hours, service site distribution, ground support crew requirements, business scalability, etc.

Further, many aspects of take-off and landing are coupled to vehicle design and performance. For example, high take-off mass vehicles often generate more noise and downwash than lighter vehicles, and winged vehicles may be less maneuverable than pure rotorcraft or may require a dedicated airspace zone to safely transition between vertical and horizontal flight.

The following sections describe an example embodiment VTOL aircraft 200 and a dedicated VTOL docking station 900 designed to receive aircraft 200. Together, the synergistic aircraft and VTOL docking station may be used to provide a novel 3D mobility system useful for transporting passengers or cargo in urban or suburban airspace traditionally subject to aircraft restrictions due to noise, safety or vehicle maneuverability concerns. Some embodiments of the present invention are illustrated as an example and are not limited by the figures of the accompanying drawings.

Figure 32:
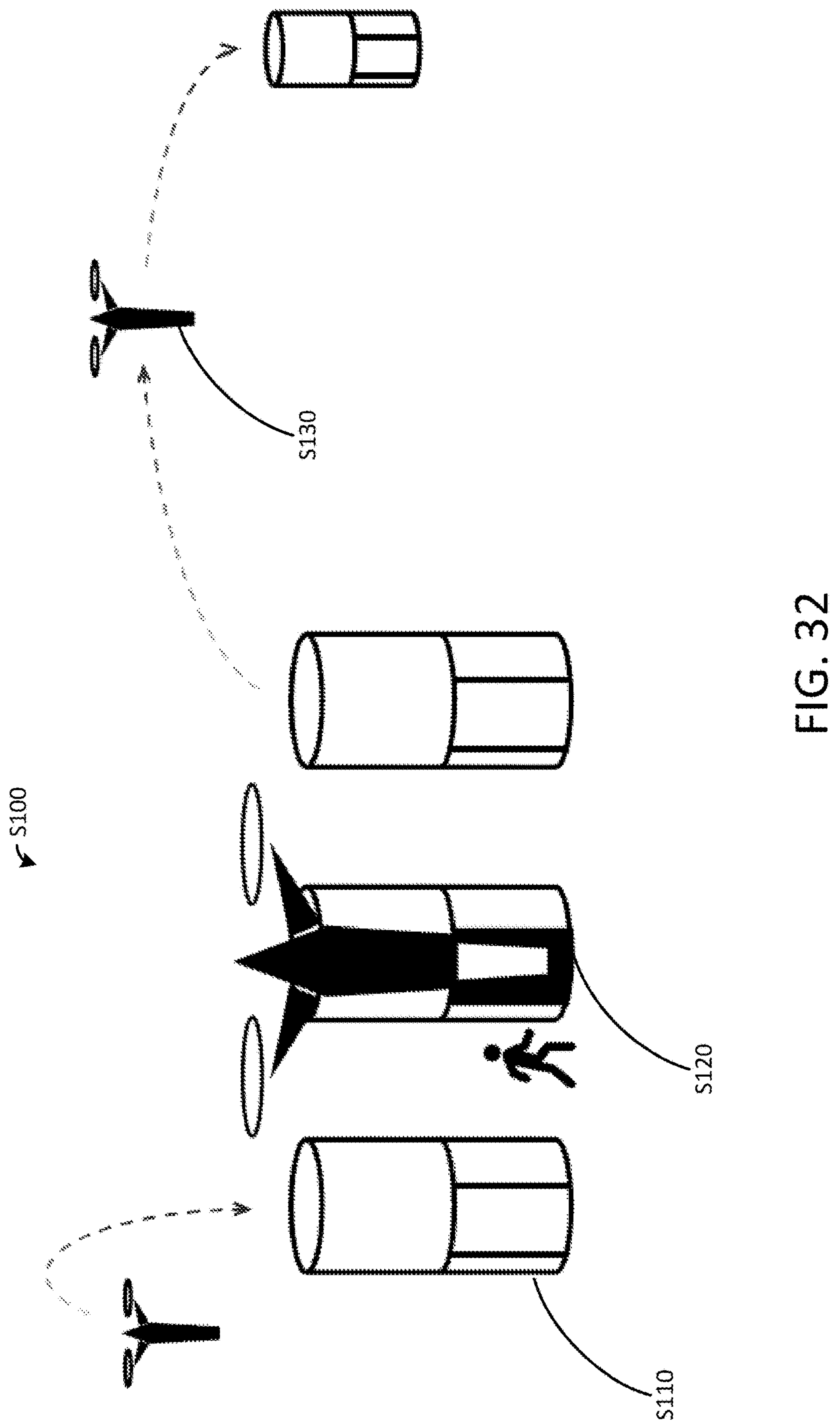
FIG. 32 illustrates an exemplary use of a VTOL aircraft system, according to aspects of the present disclosure.

FIG. 32 is a simplified, system-level illustration of a novel 3D mobility system method of operation S100 consisting of an example embodiment aircraft 200 and an example embodiment VTOL docking station 900 designed to work together as a synergistic system.

Step S110 shows a representative aircraft 200 approaching a representative VTOL docking station 900. The VTOL docking station 900 is self-enclosed and fully autonomous, with a controlled-axis automatic door that provides passenger access to the aircraft (e.g., VTOL aircraft 200) during boarding or de-boarding operations, thereby ensuring a safe, secure, unobstructed landing zone for representative aircraft 200. Similarly, nearby pedestrians are shielded and protected from the aircraft during take-off and landing operations by the enclosed VTOL docking station 900 with closed automatic door. The representative VTOL docking station 900 may be readily installed in a wide variety of locations with little site preparation and does not require a human operator. The representative VTOL docking station 900 also provides a fixed, defined landing location for autonomous aircraft 200, thereby facilitating the use of defined, pre-programmed, precision flight paths from one station to the next and reducing the need for more sophisticated navigational and sense and avoid technologies.

Step S120 shows representative aircraft 200 hanging at rest in the VTOL docking station 900, with the automatic doors on both the aircraft and VTOL docking station open for boarding. Note that representative aircraft 200 has no landing gear. Instead, the aircraft hangs from the structural booms 510 of the powerplane assembly 330, which rest on the load-bearing rim of the VTOL docking station 900. If the aircraft requires electrical charging after docking, the VTOL docking station door closes behind the previous departing passenger and remains closed until the charging operation is complete and the vehicle is ready for service.

Precision landing in the example VTOL docking station is made possible by the unique pivoting powerplane 330 technology of representative aircraft 200, which can quickly tilt in a wide range of angles (e.g., ±30 degrees) in any compass direction, enabling the aircraft to hold station above a designated grid reference such as VTOL docking station 900 even in gusty or turbulent wind conditions. As used herein “gusty, changing wind conditions” means winds of up to approximately 20 to 30 mph. Further, because the pivoting powerplane 330 is located at the upper extremity of the vertically elongated fuselage of aircraft 200, the powerplane may continue to tilt and adjust position as necessary while the fuselage 250 descends into the VTOL docking station, ensuring that the vehicle does not collide with the docking station walls and that the structural booms come to rest smoothly on the VTOL docking station rim. Also note that VTOL docking station 900 and the unique vertically elongated fuselage of representative aircraft 200 are designed to place the vehicle floor at approximately the same elevation as the ground when the vehicle is docked, enabling the passenger to effortlessly step directly into or out of the vehicle, similar to entering or exiting an elevator.

Step S130 shows the representative aircraft 200 in-flight along a pre-determined flight path between two representative VTOL docking stations 900. Note that both docking station doors are closed to prevent tampering and to secure the takeoff/landing zones, and that the unique pivoting powerplane technology of representative aircraft 200 enables it to fly an energy optimal 3D flight path with a constant heading, irrespective of changing wind conditions.

Figure 33:
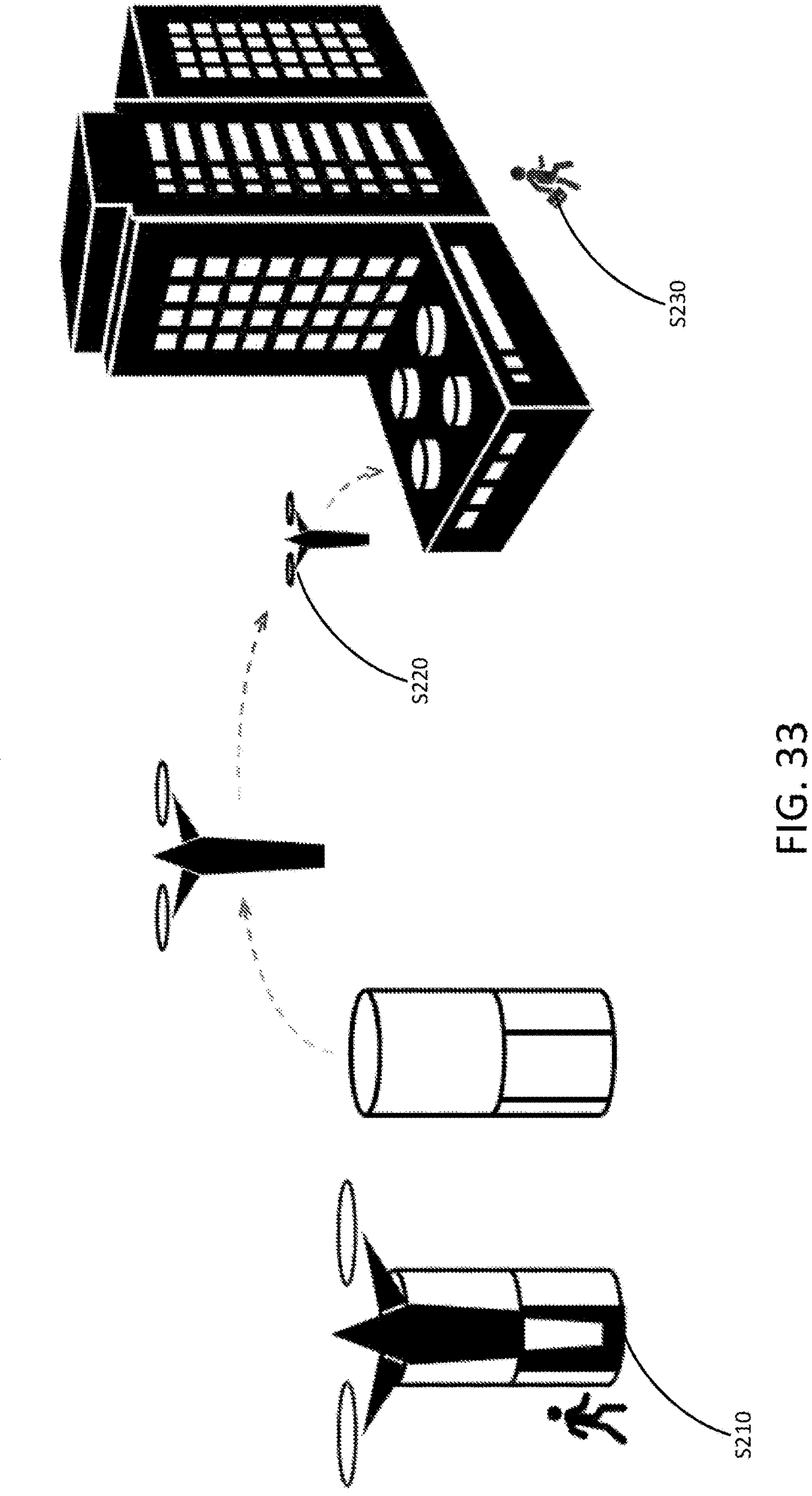
FIG. 33 illustrates another exemplary use of a VTOL aircraft system, according to aspects of the present disclosure.

FIG. 33 shows an exemplary method of operation S200 using the same example aircraft 200 and VTOL docking station 900 as discussed with respect to FIG. 32, but with the destination VTOL docking station 900 installed inside a building. In FIG. 33, the upper portion of the example VTOL docking station 900 protrudes through an opening in the roof of the building and passengers can advantageously access the vehicle directly from inside the building while the vehicle noise and downwash remain outside. Suitable locations for exemplary indoor VTOL docking stations include airports, hotels, transit terminals, shopping malls, office and residence complexes, and many other possibilities. As shown in FIG. 33, in step S210, a passenger is able to board aircraft 200 which is docked with VTOL docking station 900. Step S220 shows the aircraft 200 in flight between respective VTOL docking stations 900. Step S230 shows a passenger upon disembarking from the destination VTOL docking station 900 that is located inside the building.

FIG. 34 depicts another exemplary method of use of VTOL docking station 900 and an exemplary aircraft 200, with aircraft 200 featuring advanced navigation and sense and avoid technology. In this enhanced exemplary embodiment of a point-to-point, on-demand 3D transportation system, in step S310, an empty aircraft 200 is assigned the customer's location by a smartphone app and takes off from a VTOL docking station 900 in which it was docked. In step S320, the aircraft 200 may use a hybrid multi-modal navigation system and advanced sense and avoid capabilities (e.g., utilizing onboard sensors 69) to autonomously navigate to the customer's location. The low-inertia powerplane 330 pivots responsively to enable the aircraft 200 to hold the specified geospatial grid reference location even in variable winds. The elevated powerplane 320 minimizes downwash interaction as the aircraft 200 hovers over the designated target and begins its descent. The vehicle may utilize advanced sense and avoid technology to safely descend to a pre-determined hover altitude where the floor of the vehicle is at a specified distance above the ground. Holding station in near-ground hover, the aircraft 200 automatic door 410 opens, the customer steps up into aircraft 200, the automatic door 410 closes, and aircraft 200 ascends and navigates autonomously to a destination docking station 900 in step S330.

Notably, the enhanced, exemplary point-to-point solution described with respect to FIG. 34 is made possible by the core technologies described with respect to aircraft 200, including: (1) a low-inertia, passively pivoting powerplane (e.g., powerplane assembly 330) that enables aircraft 200 to hold 3D station above a defined grid reference even in variable winds; (2) an elevated powerplane (e.g., powerplane assembly 330) that minimizes ground-effect induced perturbations and enhances near-ground stability; (3) an elevated powerplane (powerplane assembly 330) that enables a passenger to safely enter and exit the vehicle while the rotors are turning; (4) a stable fuselage 250/cabin 310 that is isolated from powerplane movement by a biaxial pivotal coupling (e.g., pivotal coupling 1520); (5) an automatic door (e.g., door 410); and (6) a low floor height easily reachable during near-ground aircraft hover.

In summary, a novel 3D mobility system that provides customers with safe, low cost, stable, quiet, widely distributed and easily accessible 3D transportation, with a focus on relatively short, low-altitude journeys in urban or suburban environments, is disclosed herein. The embodiments disclosed herein provide for a VTOL service in which VTOL aircraft are capable of autonomous flight between docking stations and autonomous charging upon docking.

As previously noted above, the exemplary aircraft designs described herein have many advantages relative to conventional aircraft. As an example, the exemplary aircraft described herein have a relatively simple and efficient design helping to reduce manufacturing and operating costs, yet they have many safety features that prevent injury and allow reliable and effective recovery from various emergency events. Indeed, the aircraft are capable of withstanding various types of failures and protecting a passenger in the event of an electrical fire. In addition, the powerplane assembly 33 and powerplane assembly 330 are located high off the ground such that inadvertent contact between the rotors 52 or rotors 520 and people on the ground is prevented. The aircraft described herein can operate using clean energy with relatively low noise and provide VTOL capability thereby permitting use of the aircraft in urban areas where noise and access to suitable landing sites are concerns. The aircraft also has a relatively small horizontal footprint, making it suitable for use in areas with limited space, particularly in an urban environment. Various other benefits and advantages are described herein and would also be apparent to a person of ordinary skill upon reading this disclosure.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices, and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

The terms "about" and "approximately" shall generally mean an acceptable degree of error or variation for the quantity measured given the nature or precision of the measurements. Typical, exemplary degrees of error or variation are within 20 percent (%), preferably within 10%, more preferably within 5%, and still more preferably within 1% of a given value or range of values. Numerical quantities given in this description are approximate unless stated otherwise, meaning that the term "about" or "approximately" can be inferred when not expressly stated.

With reference to the use of the word(s) "comprise," "comprises," and "comprising" in the foregoing description and/or in the following claims, unless the context requires otherwise, those words are used on the basis and clear understanding that they are to be interpreted inclusively, rather than exclusively, and that each of those words is to be so interpreted in construing the foregoing description and/or the following claims.

The term "including" should be interpreted to mean "including but not limited to . . . " unless the context clearly indicate otherwise.

The term "consisting essentially of" means that, in addition to the recited elements, what is claimed may also contain other elements (steps, structures, ingredients, components, etc.) that do not adversely affect the operability of what is claimed for its intended purpose. Such addition of other elements that do not adversely affect the operability of what is claimed for its intended purpose would not constitute a material change in the basic and novel characteristics of what is claimed.

The term "adapted to" means designed or configured to accomplish the specified objective, not simply able to be made to accomplish the specified objective.

The term "capable of" means able to be made to accomplish the specified objective.

The terminology used herein is for the purpose of describing particular embodiments only and is not intended to be limiting. As used herein, the singular forms "a", "an" and "the" are intended to include the plural forms as well (i.e. "at least one"), unless the context clearly indicates otherwise.

The terms "first", "second", and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Terms such as "at least one of A and B" should be understood to mean "only A, only B, or both A and B." The same construction should be applied to longer list (e.g., "at least one of A, B, and C").

Now, therefore, the following is claimed:

1. A vertical takeoff and landing (VTOL) aircraft system, comprising:

- a VTOL aircraft comprising:
  - a fuselage comprising:
    - a passenger cabin or a cargo hold;
    - at least one aircraft battery pack;
  - a powerplane assembly positioned above the fuselage and comprising:
    - a plurality of lift-generating rotors comprising at least one rotor blade, each rotor coupled to and driven by an electric motor;
    - a plurality of booms coupled to a boom mount forming a unitized powerplane structure, wherein the electric motors are mounted to the booms;
  - a bi-axial pivotal coupling connecting the fuselage and the powerplane structure;
- a VTOL docking station comprising:
  - a self-enclosed barrier surrounding the passenger cabin or the cargo hold when the VTOL aircraft is docked;
  - a docking station frame configured to support the VTOL aircraft, the docking station frame having one or more electrical contact elements and configured to make electrical contact with complementary boom electrical contact elements of the VTOL aircraft.

2. The VTOL aircraft system of claim 1, wherein the VTOL aircraft further comprises:

- a bi-axial pivotal coupling which enables the powerplane assembly to pitch and roll independently of the fuselage; and
- a bi-axial pivotal coupling which enables the fuselage to maintain a constant attitude with respect to ground during powerplane pitch and roll, and a bi-axial pivotal coupling which enables the powerplane to pitch and roll without mechanical actuation; and
- a powerplane assembly indexed to the fuselage about a yaw axis, so that the powerplane assembly and the fuselage share a common heading; and
- a yaw axis perpendicular to a pitch axis and a roll axis.

3. The VTOL aircraft system of claim 1, wherein the VTOL aircraft further comprises:

- a plurality of motor controllers coupled to the electric motors of the plurality of rotors; and
- a flight controller configured to communicate with the plurality of motor controllers for controlling the rotor speed of the plurality of rotors, thereby enabling powerplane assembly pitch and roll by means of differential rotor thrust.

4. The VTOL aircraft system of claim 1, wherein the VTOL aircraft:

- contains at least one aircraft battery pack electrically coupled to the electric motors of the plurality of rotors and electrically coupled to boom electrical contact elements mounted to a bottom surface of the booms.

5. The VTOL aircraft system of claim 1, wherein:

- the VTOL aircraft is configured to dock with the VTOL docking station in such a way that the plurality of booms come to rest on an upper surface of the docking station frame; and
- the VTOL aircraft fuselage hangs within the self-enclosed barrier.

6. The VTOL aircraft system of claim 1, wherein further:

- the VTOL aircraft is configured to dock with the VTOL docking station in such a way that the boom electrical contact elements mounted to the booms make an electrical connection with one or more docking station electrical contact elements mounted to an upper surface of the docking station frame.

7. The VTOL aircraft system of claim 1, wherein the VTOL aircraft fuselage is vertically elongated with a height-to-width ratio greater than or equal to 3:1.

8. The VTOL aircraft system of claim 1, wherein the VTOL docking station further comprises:

- electrical charging equipment electrically coupled to one or more docking station electrical contact elements, wherein the VTOL docking station is further configured to charge the at least one aircraft battery pack after the one or more docking station electrical contact elements make electrical contact with the boom electrical contact elements.

9. The VTOL aircraft system of claim 8, wherein:

- the VTOL aircraft further comprises an aircraft charge controller electrically coupled to the at least one aircraft battery pack;
- the VTOL docking station further comprises a docking station controller in communication with the electrical charging equipment, wherein the docking station controller is configured to communicate with the aircraft charge controller to control charging of the at least one aircraft battery pack.

10. The VTOL aircraft system of claim 1, wherein the VTOL docking station further comprises:

- a self-enclosed barrier separating an interior of the VTOL docking station from an environment external to the VTOL docking station;
- a door configured to provide access to and from the interior of the VTOL docking station; and
- an access control mechanism that is configured to transition the door between a locked state and an unlocked state and to cause the door to transition between an open configuration and a closed configuration.

11. The VTOL aircraft system of claim 10, wherein the access control mechanism is configured to transition the door to the unlocked state in response to the VTOL aircraft docking with the VTOL docking station and subsequently reducing generated thrust below a predetermined threshold.

12. The VTOL aircraft system of claim 10, wherein the access control mechanism is configured to transition the door to the locked state in response to the VTOL aircraft initiating takeoff from the VTOL docking station.

13. The VTOL aircraft system of claim 10, wherein the access control mechanism is configured to transition the door to the locked state in response to the VTOL aircraft increasing generated thrust above a predetermined threshold.

14. The VTOL aircraft system of claim 10, wherein the access control mechanism is configured to wirelessly receive lock and unlock commands from a user device associated with a passenger of the VTOL aircraft.

15. The VTOL aircraft system of claim 10, wherein the VTOL docking station barrier comprises a generally cylindrical shape configured to enclose the fuselage within an interior of the VTOL docking station when the VTOL aircraft is docked with the VTOL docking station.

16. The VTOL aircraft system of claim 10, wherein the VTOL docking station is configured to be installed inside a building or other structure with one or more walls and a roof.

17. The VTOL aircraft system of claim 1, wherein the system further comprises:

a VTOL aircraft with one or more boom electrical contact elements mounted to a bottom surface of each boom of the plurality of booms;

a VTOL docking station with one or more docking station electrical contact elements mounted to an upper surface of the docking station frame;

the system configured so that the boom electrical contact elements cross the docking station electrical contact elements when the aircraft is docked, making a point contact electrical connection and thereby enabling charging of the at least one aircraft battery pack while the aircraft is docked in a variety of x, y positions and z headings within the docking station.

* * * * *